(12) United States Patent
Chen

(10) Patent No.: US 10,953,785 B2
(45) Date of Patent: Mar. 23, 2021

(54) LIGHT CONTROL SYSTEMS AND METHODS

(71) Applicant: Chia Ming Chen, Cambridge, MA (US)

(72) Inventor: Chia Ming Chen, Cambridge, MA (US)

(*) Notice: Subject to any disclaimer, the term of this patent is extended or adjusted under 35 U.S.C. 154(b) by 0 days.

(21) Appl. No.: 16/529,988

(22) Filed: Aug. 2, 2019

(65) Prior Publication Data

US 2020/0031271 A1    Jan. 30, 2020

Related U.S. Application Data

(63) Continuation of application No. 15/307,503, filed as application No. PCT/US2015/028163 on Apr. 29, 2015, now Pat. No. 10,406,967.

(Continued)

(51) Int. Cl.
*B60Q 1/20* (2006.01)
*B60Q 1/00* (2006.01)
(Continued)

(52) U.S. Cl.
CPC ........... *B60Q 1/0076* (2013.01); *B60Q 1/076* (2013.01); *B60Q 1/08* (2013.01); *B60Q 1/20* (2013.01);
(Continued)

(58) Field of Classification Search
CPC ........ B60Q 1/08; B60Q 1/0076; B60Q 1/076; B60Q 1/20; B60Q 1/245; F21S 41/675; F21S 41/635; F21S 41/14; F21S 41/16; F21S 41/13; F21S 41/143; F21S 41/657; F21V 5/007; F21V 5/008; F21V 14/02; H04B 10/116; H04N 5/332; H04W 16/28
See application file for complete search history.

(56) References Cited

U.S. PATENT DOCUMENTS 4,823,243 A * 4/1989 Weigert ............... F21S 8/00
362/281
4,843,522 A   6/1989 Rosenberg
(Continued)

FOREIGN PATENT DOCUMENTS

EP    0903608    3/1999
EP    2463751    6/2012
(Continued)

OTHER PUBLICATIONS

"Light Control Systems and Methods" Specification, Drawings, and Prosecution History, of U.S. Appl. No. 13/826,177, filed Mar. 14, 2013, now U.S. Pat. No. 9,587,804, issued Mar. 7, 2017, by Chia Ming Chen.

(Continued)

*Primary Examiner* — Bao Q Truong
(74) *Attorney, Agent, or Firm* — Onello & Mello, LLP

(57) ABSTRACT

Provided is a beam-steering mechanism, comprising a lens and a light source positioned in a focal plane of the lens. One of the light source and the lens moves relative to the other of the light source and the lens. The light source outputs a light beam at the lens which forms an illumination spot on a surface from the light beam. The illumination spot moves in a direction in response to a movement of one of the light source and the lens.

14 Claims, 62 Drawing Sheets

Related U.S. Application Data

(60) Provisional application No. 62/105,790, filed on Jan. 21, 2015, provisional application No. 62/076,695, filed on Nov. 7, 2014, provisional application No. 62/074,206, filed on Nov. 3, 2014, provisional application No. 62/061,778, filed on Oct. 9, 2014, provisional application No. 61/985,762, filed on Apr. 29, 2014.

(51) Int. Cl.
| | | |
|---|---|---|
| B60Q 1/24 | (2006.01) | |
| F21V 14/02 | (2006.01) | |
| H04N 5/33 | (2006.01) | |
| F21S 41/13 | (2018.01) | |
| F21S 41/63 | (2018.01) | |
| F21S 41/675 | (2018.01) | |
| F21S 41/16 | (2018.01) | |
| F21S 41/657 | (2018.01) | |
| F21V 5/00 | (2018.01) | |
| B60Q 1/076 | (2006.01) | |
| B60Q 1/08 | (2006.01) | |
| H04B 10/116 | (2013.01) | |
| H04W 16/28 | (2009.01) | |
| F21W 102/18 | (2018.01) | |

(52) U.S. Cl.
CPC .............. *B60Q 1/245* (2013.01); *F21S 41/13* (2018.01); *F21S 41/16* (2018.01); *F21S 41/635* (2018.01); *F21S 41/657* (2018.01); *F21S 41/675* (2018.01); *F21V 5/008* (2013.01); *F21V 14/02* (2013.01); *H04B 10/116* (2013.01); *H04N 5/332* (2013.01); *H04W 16/28* (2013.01); *B60Q 2200/38* (2013.01); *B60Q 2300/054* (2013.01); *B60Q 2300/21* (2013.01); *F21W 2102/18* (2018.01)

(56) References Cited

U.S. PATENT DOCUMENTS

| | | | |
|---|---|---|---|
| 4,894,760 A * | 1/1990 | Callahan | F21S 10/02 |
| | | | 362/293 |
| 4,985,651 A | 1/1991 | Chitayat | |
| 5,311,791 A | 5/1994 | Yanagisawa | |
| 5,915,289 A | 6/1999 | Kalze et al. | |
| 5,915,829 A | 6/1999 | Kalze et al. | |
| 5,969,868 A * | 10/1999 | Bornhorst | F21V 9/08 |
| | | | 359/589 |
| 6,499,862 B1 | 12/2002 | Weigert et al. | |
| 8,139,935 B2 | 3/2012 | Pace et al. | |
| 8,455,830 B2 | 6/2013 | Westaway | |
| 8,702,276 B2 | 4/2014 | Christoffersen | |
| 8,854,433 B1 | 10/2014 | Rafii | |
| 9,345,106 B2 | 5/2016 | Jonsson | |
| 9,587,804 B2 * | 3/2017 | Chen | F21V 14/06 |
| 10,406,967 B2 * | 9/2019 | Chen | F21S 41/16 |
| 2003/0067773 A1 | 4/2003 | Marshall et al. | |
| 2005/0018434 A1 | 1/2005 | Giuliano | |
| 2005/0029458 A1 | 2/2005 | Geng et al. | |
| 2005/0087601 A1 | 4/2005 | Gerst, III et al. | |
| 2005/0228366 A1 | 10/2005 | Kessler et al. | |
| 2006/0044800 A1 | 3/2006 | Reime | |
| 2006/0119865 A1 | 6/2006 | Hoyt et al. | |
| 2007/0023661 A1 | 2/2007 | Wagner et al. | |
| 2008/0215391 A1 | 9/2008 | Dowling et al. | |
| 2008/0256494 A1 | 10/2008 | Greenfield | |
| 2008/0292320 A1 | 11/2008 | Pederson | |
| 2008/0294017 A1 | 11/2008 | Gobeyn et al. | |
| 2008/0294315 A1 | 11/2008 | Breed | |
| 2009/0027682 A1 | 1/2009 | Hebert et al. | |
| 2009/0040299 A1 | 2/2009 | Harrison et al. | |
| 2009/0042695 A1 | 2/2009 | Chien et al. | |
| 2009/0103780 A1 | 4/2009 | Nishihara et al. | |
| 2009/0278915 A1 | 11/2009 | Kramer et al. | |
| 2010/0066821 A1 | 3/2010 | Rosener et al. | |
| 2010/0128109 A1 | 5/2010 | Banks | |
| 2010/0151946 A1 | 6/2010 | Wilson et al. | |
| 2010/0176270 A1 | 7/2010 | Lau et al. | |
| 2010/0200753 A1 | 8/2010 | Westaway | |
| 2010/0277074 A1 | 11/2010 | Van Endert et al. | |
| 2010/0309370 A1 | 12/2010 | Ueshima et al. | |
| 2011/0102763 A1 | 5/2011 | Brown et al. | |
| 2011/0103063 A1 | 5/2011 | Jurik | |
| 2011/0211754 A1 | 9/2011 | Litvak et al. | |
| 2011/0221599 A1 | 9/2011 | Hogasten | |
| 2011/0242042 A1 | 10/2011 | Xu | |
| 2011/0243380 A1 | 10/2011 | Forutanpour et al. | |
| 2011/0280018 A1 | 11/2011 | Vissenberg et al. | |
| 2011/0301934 A1 | 12/2011 | Tardif | |
| 2012/0075463 A1 | 3/2012 | Chen et al. | |
| 2012/0146903 A1 | 6/2012 | Arihara et al. | |
| 2012/0194083 A1 | 8/2012 | Henig et al. | |
| 2012/0320092 A1 | 12/2012 | Shin et al. | |
| 2013/0063042 A1 | 3/2013 | Bora et al. | |
| 2013/0101276 A1 * | 4/2013 | Keller | G02B 27/644 |
| | | | 396/55 |
| 2013/0120238 A1 * | 5/2013 | Spaulding | H05B 47/105 |
| | | | 345/156 |
| 2013/0128334 A1 | 5/2013 | Stephen | |
| 2013/0131836 A1 | 5/2013 | Katz et al. | |
| 2013/0193315 A1 | 8/2013 | Shemesh | |
| 2013/0208481 A1 | 8/2013 | Sooferian | |
| 2013/0265756 A1 | 10/2013 | Christoffersen | |
| 2013/0293722 A1 | 11/2013 | Chen | |
| 2014/0225526 A1 | 8/2014 | Jonsson | |
| 2014/0233244 A1 | 8/2014 | Jurik | |
| 2015/0002046 A1 | 1/2015 | Schlangen | |
| 2015/0002391 A1 | 1/2015 | Chen | |
| 2015/0023019 A1 | 1/2015 | Chen | |
| 2015/0049062 A1 | 2/2015 | Kim et al. | |

FOREIGN PATENT DOCUMENTS

| | | |
|---|---|---|
| GB | 2421074 | 6/2006 |
| JP | 2004303685 | 10/2004 |
| JP | 20090153583 | 7/2009 |
| JP | 2011025279 | 2/2011 |
| JP | 20110037386 | 2/2011 |
| JP | 2012059575 | 3/2012 |
| JP | 20120043722 | 3/2012 |
| KR | 19980080509 | 11/1998 |
| KR | 20040037219 | 5/2004 |
| WO | 03031923 | 4/2003 |
| WO | 2010138741 | 12/2010 |
| WO | 2010146446 | 12/2010 |
| WO | 2012001677 | 1/2012 |
| WO | 2013076606 | 5/2013 |
| WO | 2013085600 | 6/2013 |

OTHER PUBLICATIONS

"Light Control Systems and Methods" Specification, Drawings, and Prosecution History, of U.S. Appl. No. 14/048,505, filed Oct. 8, 2013, now U.S. Pat. No. 9,717,118, issued Jul. 25, 2017, by Chia Ming Chen.

"Systems and Methods for Controlling Device Operating According to Hand Gestures" Specification, Drawings, and Prosecution History, of U.S. Appl. No. 14/318,019, filed Jun. 27, 2014, now U.S. Pat. No. 9,423,879, issued on Aug. 23, 2016, by Chia Ming Chen.

"Systems and Methods for Controlling Device Operating According to Hand Gestures" Specification, Drawings, and Prosecution History, of U.S. Appl. No. 15/206,355, filed Jul. 11, 2016, by Chia Ming Chen.

Ashok, et al. "Challenge Mobile Optical Networks Through Visual MIMO" MobiCom10, Sep. 2010 pp. 1-8.

Borah et al.: A review of communication-oriented optical wireless systems. EURASIP Journal on Wireless Communications and Networking 2012, 2012:91.

(56) References Cited

OTHER PUBLICATIONS

Extended European Search Report dated Feb. 9, 2018, issued in corresponding European Application No. 15786311.9.
Extended European Search Report dated Nov. 18, 2016 issued in corresponding European Application No. 13787647.0.
International Search Report and the Written Opinion dated Oct. 8, 2015, issued in corresponding International Patent Application No. PCT/US15/28163.
International Search Report and Written Opinion dated Nov. 7, 2014, issued in corresponding International Application No. PCT/US14/44643.
International Search Report and Written Opinion dated Oct. 27, 2014, issued in corresponding International Application No. PCT/US14/46807.
International Search Report and Written Opinion dated Sep. 23, 2013, issued in corresponding International Application No. PCT/US2013/039666.
Elgala et al.: Indoor Optical Wireless Communication: Potential and State-of-the-Art. IEEE Communications Magazine, Sep. 2011, pp. 56-62.
Elgala et al.: OFDM Visible Light Wireless Communication Based on White LEDs. IEEE 2007, pp. 2185-2189.
Herbst et al.: Basics of 3D Digital Image Correlation. Dantec Dynamics Application Note—T-Q-400-Basics-3DCORR-002a-EN.
Kumar et al.: Visible Light Communication Systems Conception and VIDAS. IETE Technical Review, vol. 25 Issue 6, Nov.-Dec. 2008, pp. 359-367.
Sun: Fast Stereo Matching Using Rectangular Subregioning and 3D Maximum-Surface Techniques. International Journal of Computer Vision, vol. 46 No. 112/3, pp. 99-117, May 2002.
Wang, et al.: 12.5 Gbps Indoor Optical Wireless Communication System with Single Channel Imaging Receiver. ECOC Technical Digest 2011 OSA.
Wu, et al.: Modulation based cells distribution for visible light communication. Optics Express, vol. 20 No. 22, Oct. 2012.
"Light Control Systems and Methods" Specification, Drawings, and Prosecution History, of U.S. Appl. No. 15/307,503, filed Oct. 28, 2016, now U.S. Pat. No. 10,406,967, issued Sep. 10, 2019, by Chia Ming Chen.
Office Action dated Feb. 5, 2016 in U.S. Appl. No. 14/048,505.
Office Action dated Aug. 7, 2015 issued in U.S. Appl. No. 13/826,177.
International Preliminary Report on Patentability dated Jan. 7, 2016, issued in corresponding International Patent Application No. PCT/US2014/044643.
European Office Action dated Jun. 18, 2020 issued in corresponding European Application No. 15786311.9.

\* cited by examiner

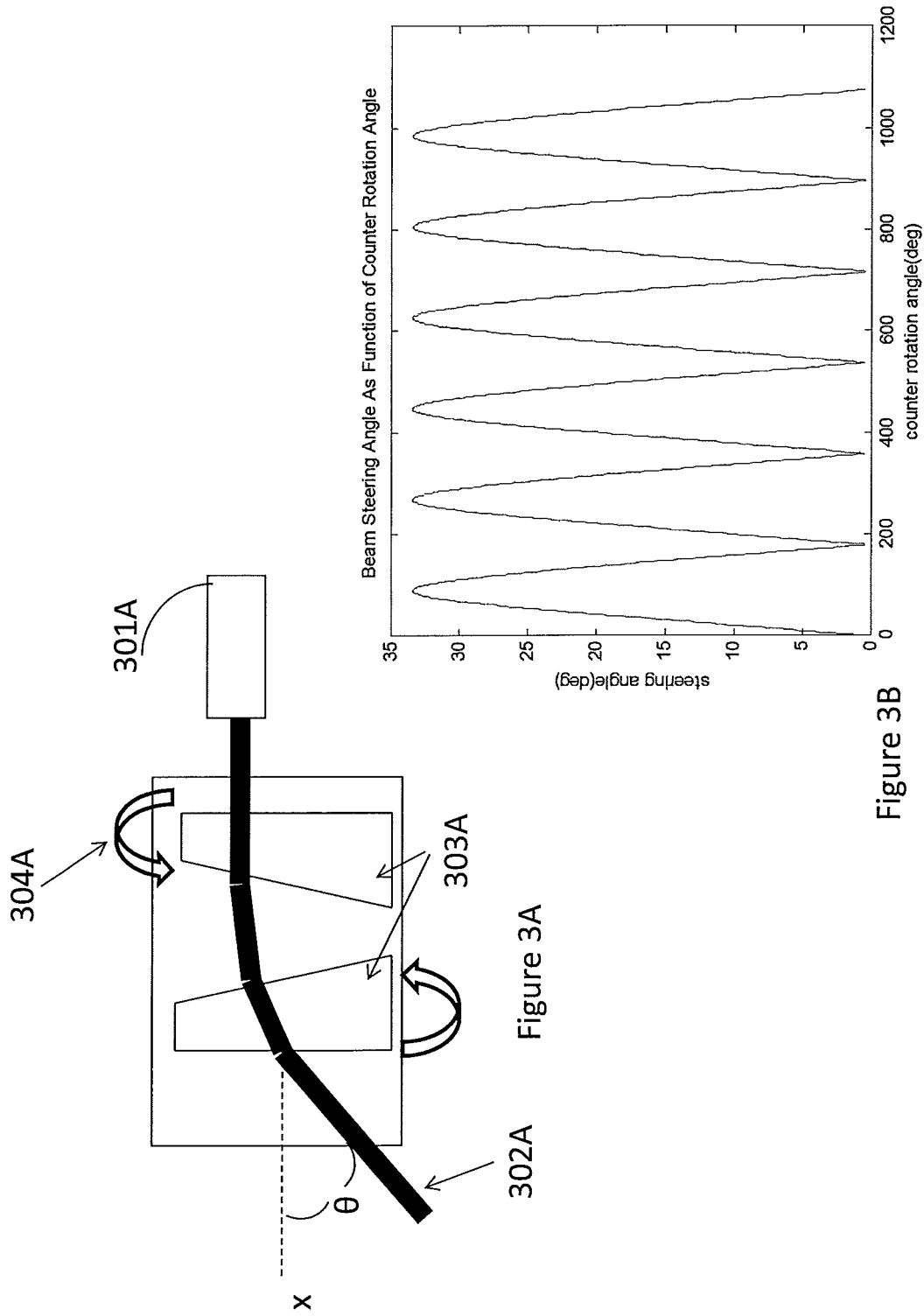

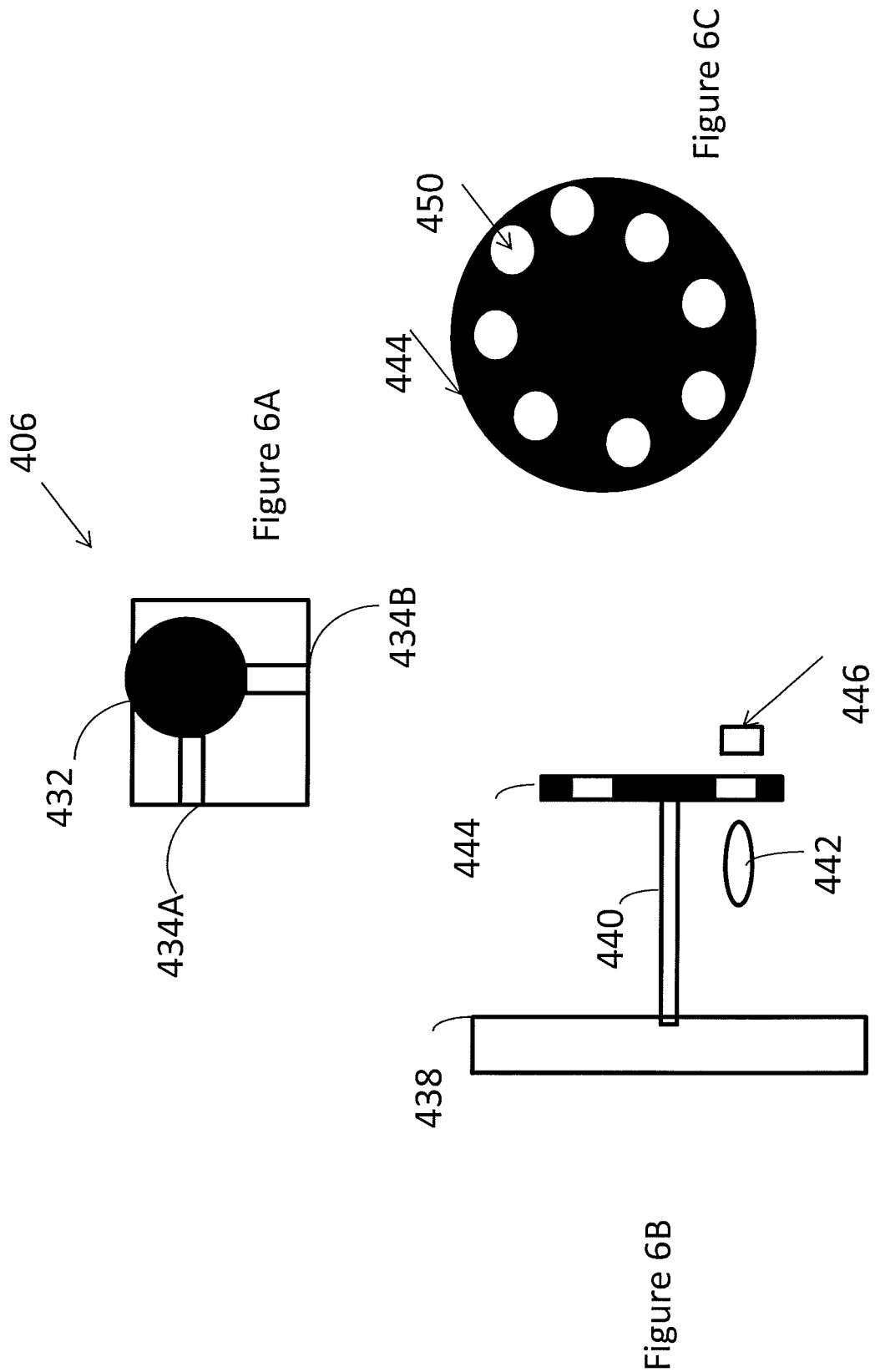

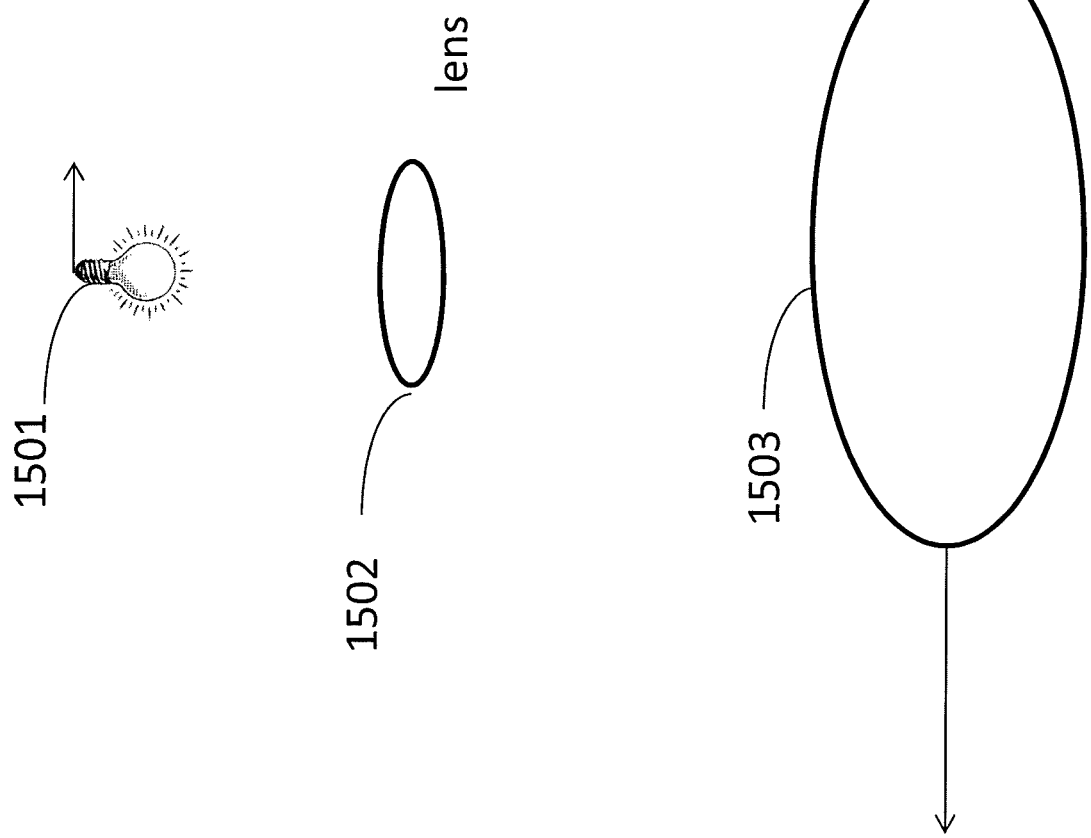

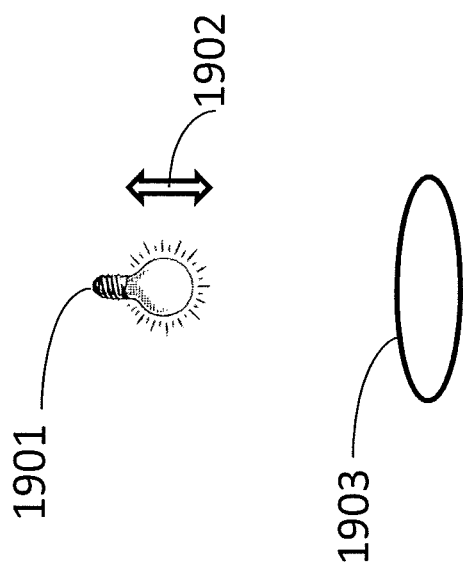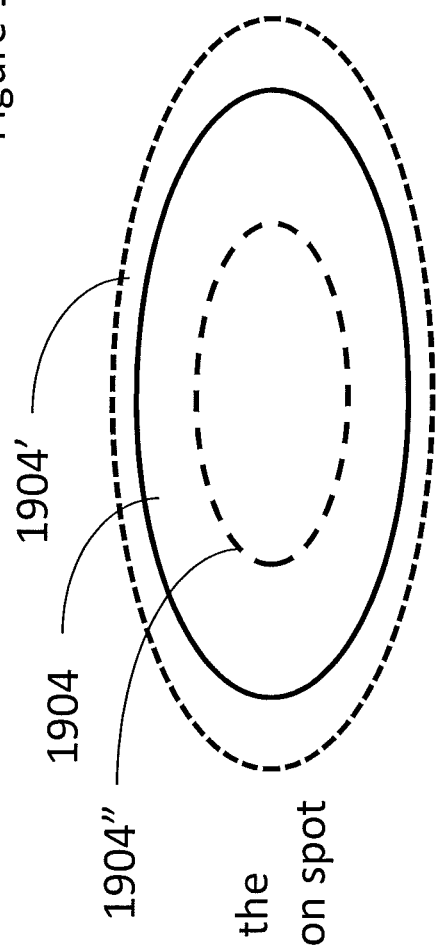
Figure 19
Changing the illumination spot

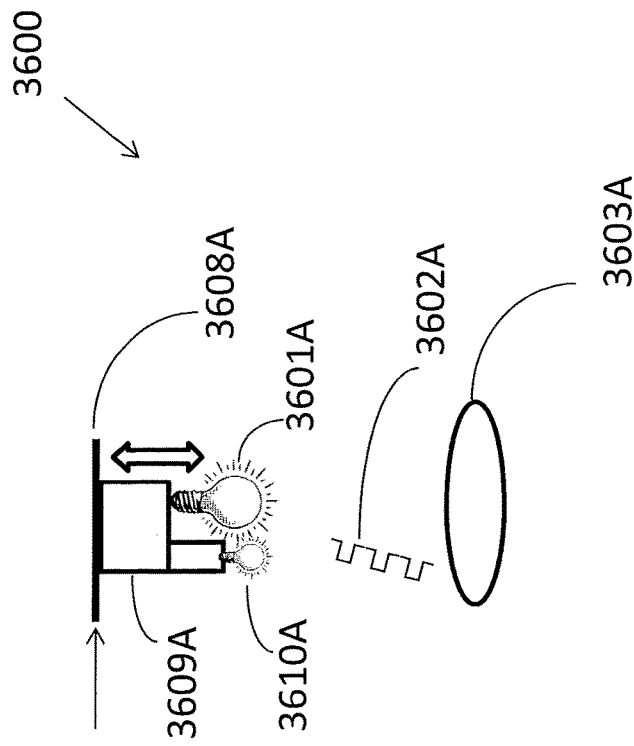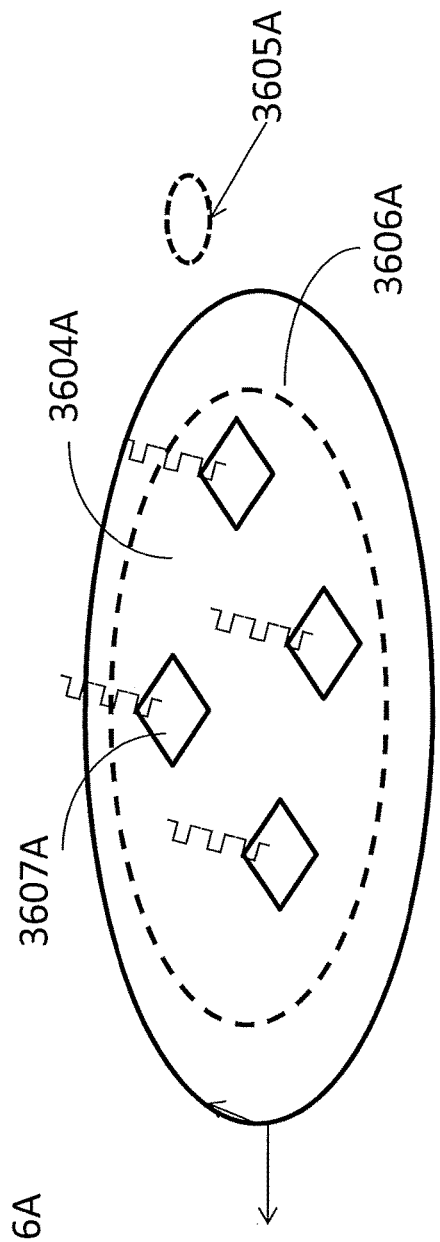
Figure 36A

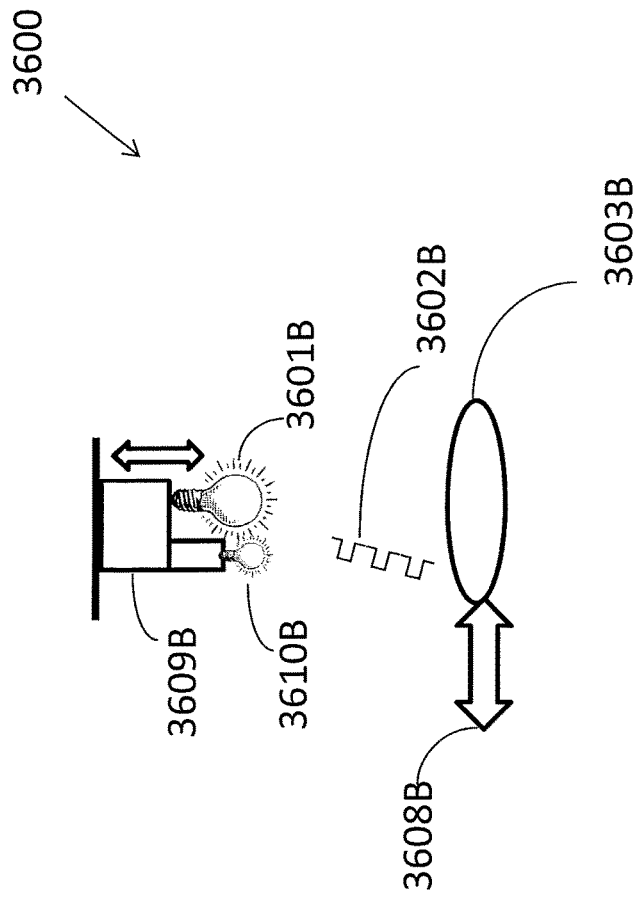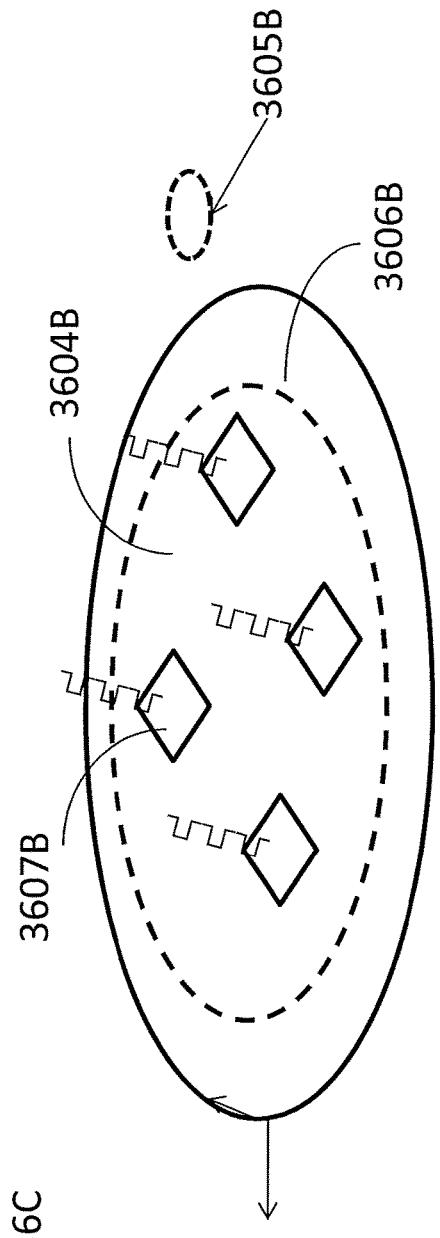
Figure 36C

LIGHT CONTROL SYSTEMS AND METHODS

RELATED APPLICATIONS

This application is a continuation application of U.S. patent application Ser. No. 15/307,503 filed on Oct. 28, 2016, which is a U.S. National Stage Application of International Application No.: PCT/US2015/028163, filed on Apr. 29, 2015, which claims the benefit of U.S. Provisional Patent Application No. 62/105,790 filed Jan. 21, 2015, U.S. Provisional Patent Application No. 62/076,695 filed on Nov. 7, 2014, U.S. Provisional Patent Application No. 62/074,206 filed on Nov. 3, 2014, U.S. Provisional Patent Application No. 62/061,778 filed on Oct. 9, 2014, and U.S. Provisional Patent Application No. 61/985,762 filed on Apr. 29, 2014, the content of each of which is incorporated herein by reference in its entirety.

This application is related to U.S. Provisional Patent Application No. 61/846,738 filed on Jul. 16, 2013, U.S. patent application Ser. No. 14/048,505 filed on Oct. 8, 2013, U.S. patent application Ser. No. 13/826,177 filed on Mar. 14, 2013 and published as US2013/0293722, PCT Patent Application No. PCT/US2013/039666 filed on May 6, 2013, published as PCT Publication No. WO2013169635, U.S. Provisional Patent Application No. 61/643,535 filed on May 7, 2012, U.S. Provisional Patent Application No. 61/684,336 filed on Aug. 17, 2012, U.S. Provisional Patent Application No. 61/760,966 filed on Feb. 5, 2013, U.S. Provisional Patent Application No. 61/840,791 filed on Jun. 28, 2013, U.S. Provisional Patent Application No. 61/696,518 filed on Sep. 4, 2012, U.S. Provisional Patent Application No. 61/840,791 filed on Jun. 28, 2013, U.S. patent application Ser. No. 14/318,019 on Jun. 27, 2014 and published as US2015/0002391, U.S. Provisional Patent Application No. 61/846,738 filed on Jul. 16, 2013, U.S. patent application Ser. No. 14/048,505 filed Oct. 8, 2013, and published as US2015/0002391A1, PCT/US14/044643 filed on Jun. 27, 2014, PCT/US14/046807 filed on Jul. 16, 2014, the content of each of which is incorporated herein by reference in its entirety.

TECHNICAL FIELD

The present inventive concepts generally relate to the field of light-emitting devices, and more particularly, to systems and methods for employing and controlling the output of one or more light-emitting devices.

BACKGROUND

A typical light source such as a lamp or the like emits electromagnetic radiation in the visible spectrum. Light sources are well-known for providing a large illumination angle (120°-180° cone angle). In addition, the brightest light spot provided by an emitting light source is typically positioned generally directly below the light source, which has the shortest distance to the source. The bright spot is fixed. Thus, in order to take advantage of the brightest region of the light spot, a user must physically move his position relative to the bright spot.

SUMMARY

In one aspect, provided is a light-emitting device control system, comprising: a light source module that outputs a beam of light at a first surface location; a beam steering mechanism, the light source module coupled to the beam steering mechanism for directing the beam of light at the first surface location, wherein an illumination region is formed at the first surface location in response to the directed beam of light; a control module that detects a signal corresponding to a hand gesture, the control module positioned at a separate location than the light source module and the beam steering mechanism, and communicating with the light source module via a network; and a control spot generator that generates a control spot at a second surface location, the control module detecting a presence of a hand forming the hand gesture at the control spot, and wherein the beam steering mechanism moves the illumination region in response to the hand gesture at the control spot.

In some embodiments, the light-emitting device control system further comprises a first Wi-Fi transmitter/receiver in communication with the control module and a second Wi-Fi transmitter/receiver in communication with at least one of the light source module and the beam steering mechanism, the first and second Wi-Fi transmitter/receivers communicating with each other via the network.

In some embodiments, the light-emitting device control system further comprises a beam steering mechanism coupled to the control spot generator and the control module for moving the control spot and the field of view of the camera in the control module.

In some embodiments, the light-emitting device control system further comprises a two-dimension position sensitive detector (PSD) module in communication with the control module for determining a position of the hand gesture.

In some embodiments, the control module comprises at least one of a tracking and control sensor that detects a presence of the hand forming the hand gesture at the control spot; and a camera that tracks a motion of the hand gesture and recognizes the hand gesture.

In some embodiments, the tracking and control sensor comprises a thermal imager having a linear or area focal plane array (FPA), and wherein the tracking and control system further comprises a scan mirror for the linear array.

In some embodiments, the tracking and control sensor includes a lens that transmits both visible and thermal light, a thermal detector or array, and a visible FPA coupled to the thermal detector or array, the visible FPA positioned between the thermal detector or array and the lens.

In some embodiments, the tracking and control sensor comprises a thermal sensor and a visible camera for capturing an image of a hand making the hand gesture and recognizing the hand gesture, and the thermal sensor comprises a lens and a thermal detector or a detector focal plane array.

In some embodiments, the tracking and control sensor comprises two thermal cameras separated by a distance.

In some embodiments, at least one of the thermal cameras has a linear or area focal plane array (FPA), and the tracking and control system further comprises a scan mirror for the linear array.

In some embodiments, the tracking and control sensor comprises two visible cameras separated by a distance.

In some embodiments, at least one of the visible cameras has a linear or area focal plane array (FPA), and the tracking and control system further comprises a scan mirror for the linear array.

In some embodiments, the control module processes distance information related to the hand gesture and a background for separating the hand gesture image data from image data of the background.

In some embodiments, the control module comprises a microphone that detects a voice signal, and the beam steering mechanism moves the illumination region in response to the voice signal.

In some embodiments, the control spot generator comprises a plurality of light emitting diodes (LEDs), each LED constructed and arranged to emit light at a different wavelength.

In some embodiments, the control module is positioned on a wall surface.

In another aspect, provided is a light-emitting device control system, comprising: a light source module that outputs a beam of light at a first surface location; a beam steering mechanism, the light source module coupled to the beam steering mechanism for directing the beam of light at the first surface location, wherein an illumination region is formed at the first surface location in response to the directed beam of light; and a mobile device that remotely controls the light source module and the beam steering module.

In some embodiments, the mobile device includes a display that displays control panel, the control panel including an illumination spot position panel and a light level adjustment bar, wherein in the position panel, the illumination region is displayed, and can be moved to one or more different positions at the display, and wherein the light adjustment bar allows the user to change the light level by sliding on the bar.

In some embodiments, the mobile device includes a first Wi-Fi transmitter/receiver in communication with the control module and wherein a second Wi-Fi transmitter/receiver is in communication with at least one of the light source module and the beam steering mechanism, the first and second Wi-Fi transmitter/receivers communicating with each other via the network.

In another aspect, provided is a method of controlling a light-emitting device, comprising: outputting a beam of light at a first surface location; generating a control spot at a second surface location that is different from the first surface location, the illumination region positioned at a first surface location; determining a hand gesture at the control spot; and moving the illumination region in response to the hand gesture in communication with the control spot at the second surface location.

In another aspect, provided is a light-emitting device control system, comprising: a light source that generates a beam of light; and a beam steering mechanism that comprises two optical elements that rotate relative to each other for refracting the beam of light and directing the beam of light at a surface location, wherein an illumination region is formed at the first surface location in response to the directed beam of light, wherein the beam steering mechanism comprises two refracted wedge prisms that rotate relative to each other, and wherein a deviation angle of the light beam from a horizontal axis is obtained by rotating the two wedge prisms relative to each other, and an azimuth angle of the light beam is obtained by rotating both wedge prisms in the same direction.

In some embodiments, the surface location includes a road surface.

In some embodiments, the light-emitting device control system further comprises a vehicle headlight that generates a beam of light that illuminates the surface location, and wherein the beam of light of the light source is directed by the beam steering mechanism at the surface location illuminated by the beam of light of the vehicle headlight.

In some embodiments, the beam of light of the light source is directed by the beam steering mechanism at a different surface location than the surface location illuminated by the beam of light of the vehicle headlight.

In some embodiments, the system further comprises a switch for changing a state of the system between a scanning mode and a non-scanning mode.

In some embodiments, the system further comprises an input device controller that controls a movement of the beam steering mechanism and a potentiometer that adjusts a brightness of the beam of light.

In some embodiments, at least one of the input device controller and the potentiometer are coupled to a steering wheel of a vehicle.

In some embodiments, at least one of the input device controller and the potentiometer are coupled to a headwear.

In some embodiments, the input device controller receives inputs from an electronic tablet, touchpad, mouse, or other peripheral device.

In some embodiments, the electronic tablet senses a position of a touch object.

In some embodiments, the system can be controlled manually.

In some embodiments, the optical elements include wedge prisms.

In some embodiments, the optical elements include a first scan mirror that rotates about a first axis and a second scan mirror that rotates about a second axis that is orthogonal to the first axis.

In some embodiments, the optical elements include a lens mounted on a set of guided rails. The lens moves in a plane resulted by the motion of the guided rails.

In some embodiments, wherein beam steering is performed manually.

In some embodiments, wherein the system is constructed and arranged as a vehicle lamp.

In some embodiments, the light-emitting device control system of claim 1, further comprises a processor that performs a calculation to determine an amount of beam steering is needed and send the calculation result to the beam steering mechanism to perform a beam steering motion.

In another aspect, provided is a flashlight, comprising: a light source that generates a beam of light; a beam steering mechanism that directs the beam of light at a target to form an illumination region at the target; and an input device controller that controls the beam steering mechanism to direct the beam of light at the target.

In some embodiments, the flashlight further comprises a potentiometer that adjusts a brightness of the beam of light.

In some embodiments, the flashlight further comprises a hand-held housing, wherein the light source and the beam steering mechanism are inside the housing, and the input device controller is coupled to an exterior of the housing.

In some embodiments, the input device controller includes a mouse or a touchpad, and wherein a hand when contacting the mouse or the touchpad controls the beam steering mechanism.

In another aspect, provided is a fog penetrating device, comprising: a focus optic comprising of a lens, lens housing, and a multi-facet mirror; a light source that generates a shortwave infrared (SWIR) beam for penetrating fog; a focal plane array (FPA) device that operates in a shortwave infrared frequency spectrum, and an FPA that operates in the thermal spectrum for sensing heat signature of target.

In some embodiments, the fog penetrating device further comprises a filter wheel in front of the FPA device from removing a back scattering background.

In some embodiments, a beam steering mechanism steers the field of view of the sensor to increase its coverage.

In another aspect, a light-emitting device control system comprises a light source that generates a beam of light; a beam steering mechanism that comprises a lens such as a Fresnel lens for directing the beam of light at a surface location, and a set of guided rails that moves the light source relative to the lens or the lens relative to the light source; and a beam size adjustment mechanism that moves the light source along or parallel the optical axis of the lens.

In another aspect, provided is a light-emitting device control system, comprising: at least one light source; a movable first rail, the light source coupled to the first rail; a second rail, the first rail and the light source movable along the second rail in a first direction; a pair of parallel third rails, the first rail, the second rail, and the light source movable along the third rails in a second direction that is orthogonal to the first and second directions, wherein a spot formed by the light source is adjustable according to at least a movement of at least one of the first rail and the second rail in at least one of the first direction and the second direction.

In some embodiments, the light-emitting device control system further comprises a Fresnel lens.

In another aspect, provided is a light-emitting device control system, comprising: a light source that generates a beam of light; a first rail extending in a first direction, the light source coupled to the first rail and movable along the first rail in the first direction; a pair of second rails extending in a second direction perpendicular to the first direction; a lens positioned on the pair of the second rails, and movable along the second rails; a pair of parallel third rails perpendicular to each of the first rail and the pair of second rails, the second rails and the lens movable in the third direction along the third rails, wherein a spot size formed by the light source is adjustable according to a movement of the light source in the first direction relative to the lens, and wherein the spot is steerable by at least a movement of the lens along the second and third rail directions. The lens moves along the second and third rail to steer the beam, the first rail is not attached to the second rail.

In some embodiments, the light-emitting device control system further comprises a Fresnel lens for directing the beam of light at a target in response to a movement of at least one of the third rail and second rails relative to the Fresnel lens.

In some embodiments, the Fresnel lens moves along the second and third rails.

In another aspect, provided is a light-emitting device control system, comprising: a plurality of light sources that each generates a beam of light; a switch that activates at least one of the light sources at a time; a Fresnel lens that provides beam steering of the beams of light of the light sources; a set of guided rails that move the Fresnel lens in a plane parallel to the light source mounting plate; and a vertical rail that moves the light source plate toward and away from the focus of the lens.

In another aspect, provided is a touchpad controller, comprising: a beam size controller that controls a size of a beam of light; a dimmer that controls an intensity or brightness of the beam of light; and a touchpad beam steering controller that controls a direction of the beam of light.

In another aspect, provided is a light-emitting device control system, comprising an illumination light source module that outputs a beam of light at a first surface location; a beam steering mechanism, the light source module coupled to the beam steering mechanism for directing the beam of light at the first surface location, wherein an illumination region is formed at the first surface location in response to the directed beam of light, the beam steering mechanism including a Fresnel lens; a vertical guided rail on which the illumination light and control light are mounted. The movement of the guide allows the beam size of the illumination spot to be adjusted; a control module that detects a signal corresponding to a hand gesture, the control module positioned at a separate location than the light source module and the beam steering mechanism, and communicating with the light source module via a network; and a control spot generator that generates a control spot at a second surface location that is external to the first surface location, the control module detecting a presence of a hand forming the hand gesture at the control spot, and wherein the beam steering mechanism moves the illumination region in response to the hand gesture at the control spot.

In some embodiments, the beam steering mechanism comprises a guided rail system and a Fresnel lens.

In some embodiments, the light-emitting device control system further comprises a thermal sensor and a pair of cameras proximal the light source module, wherein the thermal sensor provides a field of view, which is moved by the beam steering mechanism for tracking the hand gesture, and the camera provides a field of view for following the illumination spot. The thermal sensor is used to detect the hand thermal signal in the control spot. The cameras are used to recognize hand gesture in the control spot.

In another aspect, provided is a device, comprising: a beam steering mechanism; comprising, a lens; and a set of guided rails, the guided rails including vertical guided rails, the planar motion of the guided rails allowing beam steering, and a vertical motion of the vertical guided rails allowing a beam size adjustment for an illumination spot.

In another aspect, provided is a heating control system for allowing thermal radiation to be steered from one place to another, comprising a heater for generating thermal radiation, an IR Fresnel lens for concentrating light in a thermal heating spot, a vertical guided rail for adjusting the thermal heating spot of the heater, a set of guided planar motion rails for beam steering the thermal radiation spot, a fan for removing heat from the IR Fresnel lens; and a non-contact controller that uses a hand gesture for steering the heating spot.

In some embodiments, the heating control system further comprises a contact controller such as a touchpad to steer the thermal heating spot.

In another aspect, provided is a non-contact switching mechanism utilizing color combination for switching code, comprising: a multi-channel thermal sensor for hand thermal signature detection; and a control spot generator that illuminates the field of views (FOVs) of the multi-channel thermal sensor; a beam splitter that aligns the FOVs of the thermal sensor to the illumination cones of the control spot generator; and a processor for comparing the stored color code with the input color code.

In another aspect, provided is a beam-steering mechanism, comprising: a lens; and at least one light source positioned in a focal plane of the lens. One of the at least one light source and the lens moves relative to the other of the at least one light source and the lens. The at least one light source outputs a light beam at the lens which forms an illumination spot on a surface from the light beam. The illumination spot moves in a direction in response to a movement of one of the at least one light source and the lens.

In some embodiments, the lens is stationary and the at least one light source moves relative to the stationary lens, and the illumination spot moves in a direction that is opposite a direction of movement of the at least one light source.

In some embodiments, the beam steering mechanism further comprises a first rail, a second rail perpendicular to the first rail, the at least one light source positioned on at least one of the first rail and the second rail, and at least one motor that moves the at least one light source along the at least one of the first rail and the second rail.

In some embodiments, the at least one light source is stationary and the lens moves relative to the at least one light source, and wherein the illumination spot moves in a same direction as a direction of movement of the lens.

In some embodiments, the beam steering mechanism further comprises a first rail, a second rail perpendicular to the first rail, the lens positioned on at least one of the first rail and the second rail, and at least one motor that moves the lens along the at least one of the first rail and the second rail.

In some embodiments, the at least one light source moves away from or toward the focus of the lens, which changes a size of the illumination spot.

In some embodiments, the lens includes a Fresnel lens.

In another aspect, provided is a beam steering mechanism, comprising: a lens; a light source module positioned in a focal plane of the lens; and a guided rail system, comprising a vertical rail, at least one inner rail, and at least one outer rail, wherein one of the lens and the light source module is mounted to the guided rail system, and wherein the light source outputs a light beam at the lens which forms an illumination spot on a surface from the light beam.

In some embodiments, the light source module is mounted on the vertical rail, which moves the light source module toward or away from the lens to adjust the size of the illumination spot.

In some embodiments, the vertical rail and the light source are mounted on the inner rail, and move together along the inner rail.

In some embodiments, the at least one inner rail is mounted on two outer rails, and the light source module, the vertical rail, and the inner rail move along the two outer rails.

In some embodiments, the light source module is mounted on the vertical rail, and moves vertically, and wherein the lens is mounted on the at least one inner rail which moves the lens in a direction orthogonal to the vertical direction.

In some embodiments, the inner rail and the lens are mounted on the outer rails which move the lens and the inner rails along the two outer rails in a horizontal direction.

In some embodiments, the beam steering mechanism further comprises a contact controller or hand gesture controller that controls at least one of the light source module and the guided rail system.

In some embodiments, the contact controller has a beam steering controller for controlling the beam steering of the light, a dimmer for controlling the light level, and a beam size controller for adjusting the size of the beam.

In some embodiments, the lens is a Fresnel lens, and the light source module is mounted on the guided rail system above the Fresnel lens.

In some embodiments, a transmitter beam spot, the illumination spot, and a control spot are formed at the surface, wherein the control spot controls the illumination and transmitter spots by hand gestures or contact controllers.

In some embodiments, the light source module includes an illumination light source and a Li-Fi transmitter light source for generating beams of light that form both the illumination spot and the transmitter beam spot.

In some embodiments, the transmitter light beam includes a LiFi communication light beam and wherein the illumination light beam and LiFi communication light beam are separated in an optical spectrum but co-located spatially in the same spot, wherein the illumination beam is in visible spectrum and the LiFi communication light beam is in IR spectrum, wherein when the illumination light source is used for both illumination and LiFi communications, there is only one light beam in the spot.

In some embodiments, a size of the transmitter beam spot is increased to accommodate multiple users to share a same Li-Fi network by moving the light source module along the vertical rail.

In some embodiments, the lens includes a Fresnel lens array, the guided rail system comprises an array of guided rail systems and track rails, and the light source module comprises a plurality of light sources mounted on the guide rail systems, which in turn are mounted on the track rails.

In another aspect, provided is a track light system, comprising a non-motorized track light array comprising a plurality of light sources positioned on a plurality of rails; at least one motorized track rail adjacent the non-motorized track light array; and a steering car that moves along the at least one motorized track rail for steering individual light sources of the track light array.

In another aspect, provided is a vehicle light beam steering system comprising a light source; a beam steering mechanism that directs a light beam from the light source at a surface; an input device controller that receives external inputs for beam steering control; a potentiometer for adjusting a light level; and a processor that performs a calculation to determine the amount of beam steering is needed and sends a signal to the beam steering mechanism to perform a beam steering motion according to the calculation.

In another aspect, provided is a beam steering mechanism, comprising a pair of Fresnel prisms constructed and arranged to counter rotate relative to each other, wherein a light beam received by the prisms is directed in an azimuth direction according to the counter-rotation and co-rotation of the two prisms.

In another aspect, provided is a beam steering mechanism including: a lens; an array of light sources above the lens; a plate on which the light sources are mounted, wherein a light source distribution from the light sources allows for an illumination of different regions at a target surface, or from different positions of a focal plane with respect to the lens with no need for movement, and wherein activating the light sources one at a time, one region can be illuminated in the target surface at a time.

In some embodiments, the light source array moves on a vertical rail while the lens can move laterally on a guided rail system permitting beam steering and beam size adjustment.

In another aspect, provided is a fog penetrating sensor, comprising: a pyramid mirror; an shortwave infrared (SWIR) LED light source; a SWIR focal plane array (FPA); a focus and defocus wheel to eliminate background; an uncooled thermal FPA; an aperture lens that is shared by the light source, the SWIR channel, and the uncooled thermal channel at a foci of the lens, the share aperture lens allowing illuminating and imaging of the same target area simultaneously permitting more efficient use of illumination light, the longer wavelength SWIR light is scattered less by aerosols such as fog, therefore, sees further permitting active imaging of the target by the SWIR channel and passive imaging of the target by the thermal channel; and a beam steering mechanism that steer the illumination light to the target and imaging light from the target allowing scanning of the target scene.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 3A is a view of a beam steering mechanism, in accordance with other embodiments;

FIG. 3B is a graph illustrating a feature of the beam steering mechanism of FIG. 3A;

FIG. 6A is a view of a mouse controller, in accordance with some embodiments.

FIG. 6B is a view of an encoder of the mouse controller of FIG. 6A;

FIG. 6C is a view of an optical encoding disk of the encoder of FIGS. 6A and 6B.

FIGS. 15-19 are views of various beam steering configurations, in accordance with some embodiments;

FIGS. 36, 36A, 36B, and 36C are views of a light system, in accordance with some embodiments;

DETAILED DESCRIPTION OF EMBODIMENTS

Figure 1:
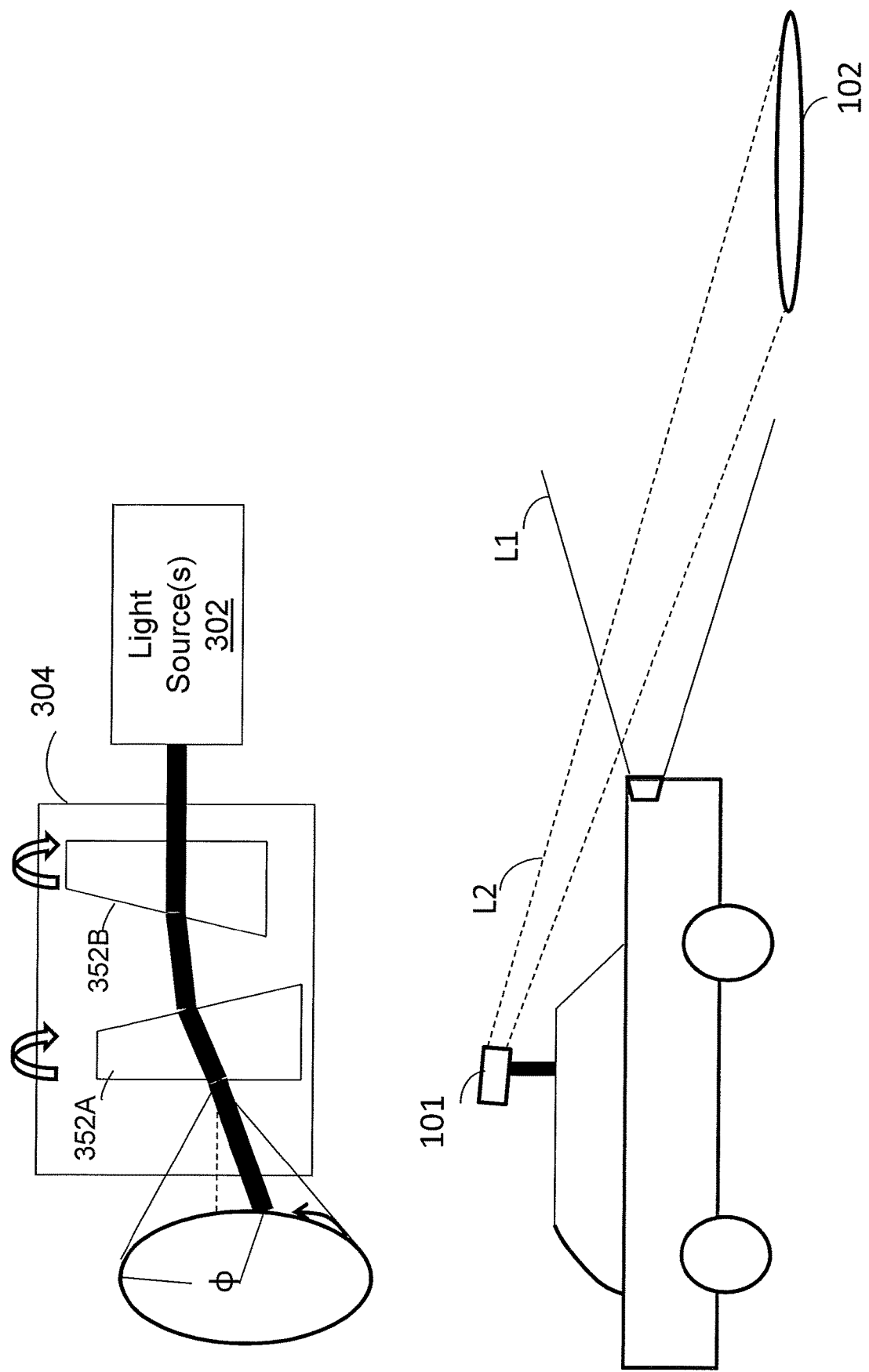
FIGS. 1 and 2 are views of a light-emitting device control system positioned on a vehicle, in accordance with some embodiments.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Referring to PCT Application No. PCT/US2013/039666, filed May 6, 2013, published as PCT Publication No. WO2013169635 incorporated by reference above, an LED lamp or related light source can output light that can be directed by a beam steering mechanism to form an illumination region at a surface. The beam steering mechanism includes a pair of counter rotating wedges that rotate relative to each other, permitting a light beam to be output in any direction. This configuration permits the beam steering mechanism to be implemented in small configurations. In some embodiments, as described herein with respect to FIGS. 21-24, a beam steering mechanism can be implemented including a lens and a light source on a guided rail system, but is not limited thereto.

Figure 2:
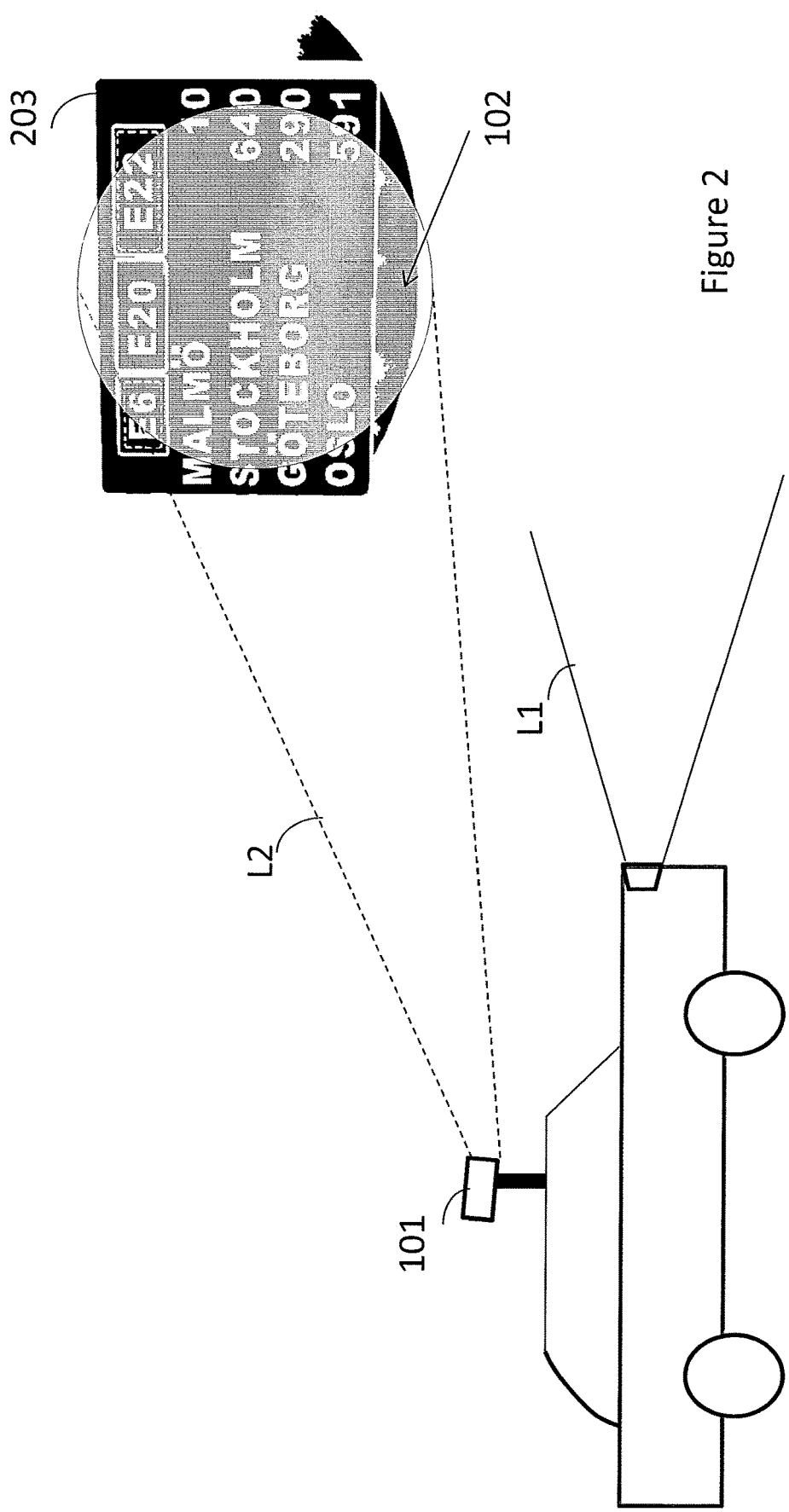
Figure 3:
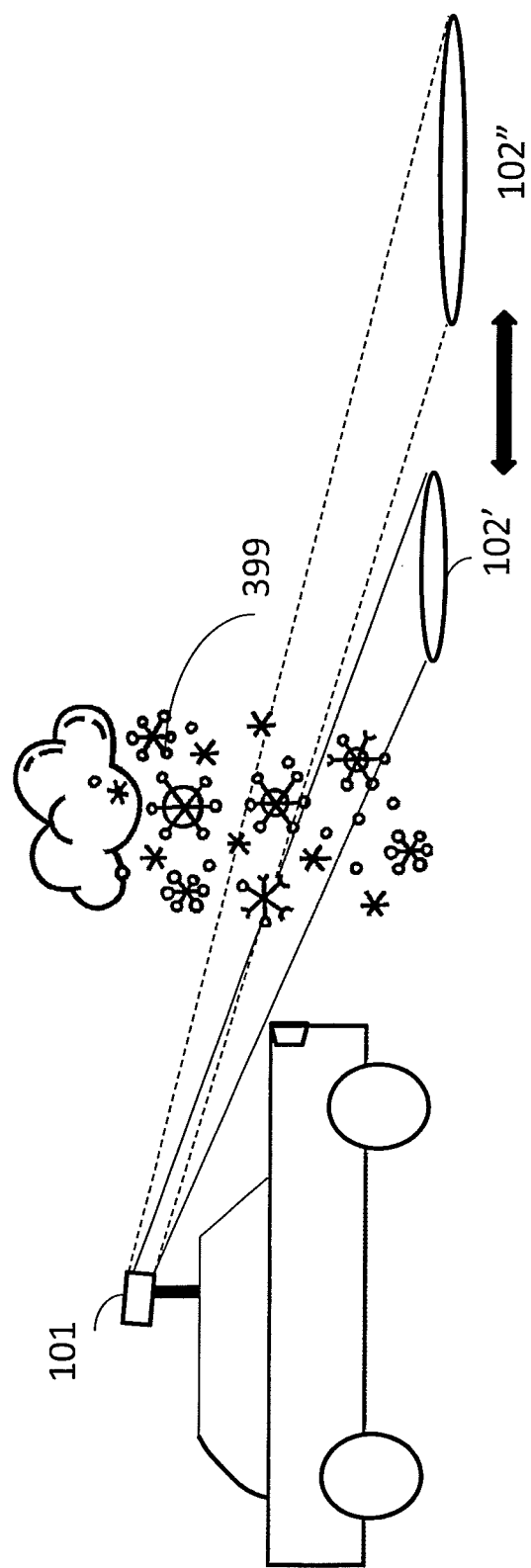
FIG. 3 is a view of a light-emitting device control system positioned on a vehicle and configured for a scanning mode, in accordance with some embodiments.

As shown in FIGS. 1-3, one application of a beam steering mechanism, for example, can be as part of a light-emitting device control system 101 mounted to a vehicle. The light-emitting device control system 101 can include a light source 302 and a beam steering mechanism 304, for example, similar to or the same as those described in to PCT Publication No. WO2013169635 incorporated by reference above. The beam steering mechanism 304 can receive and redirect light from the light source 302, for example, a lamp, LED, and so on, to a surface location to form an illumination region having a control spot. As described above, the beam steering mechanism 304 can include wedge prisms 352A, 352B that can rotate relative to each other, permitting the beam steering mechanism 304 to be implemented in small configurations.

The beam steering mechanism 304 can operate in two steps. In a first step, a deviation angle θ of a received light beam relative to a horizontal axis x can be obtained by rotating the two wedge prisms 352A, 352B relative to each other, i.e., counter-rotating. For example, the first wedge prism 352A can rotate in a first direction of rotation and the second wedge prism 352B can rotate in a second, opposite, direction of rotation with respect to the first direction of rotation. In a second step, an azimuth angle φ of the light beam can be obtained by rotating both wedge prisms 352A, 352B in the same direction. Thus, by relative rotation and co-rotation of the prisms 352A, 352B, respectively, a light beam can be output in any direction.

Accordingly, a light beam L2 generated from the light source of the control system 101, e.g., LED lamp, can be directed by the beam steering mechanism to form an illumination spot 102 on a road surface, which can enhance or complement the light L1 output by a headlight or other light source, especially in environments where there is poor visibility.

As shown in FIG. 2, the beam steering mechanism of the control system 101 can be controlled to direct the LED lamp upward, laterally, and/or other direction along and/or between an X, Y, and/or Z axis. The light beam L2 generated from the light source at the control system 101 can therefore form an illumination region 102 at a traffic sign 203, street sign, or other object other than a road surface. This feature permits vehicle operators, for example, those with limited or poor eyesight to steer the beam output from the light source to a comfortable distance for better viewing of the road surface, front vehicles, or other objects. As shown in FIG. 2, a light beam L2 generated from the light source of the control system 101 does not need to intersect, augment, or otherwise illuminate a same surface as light beam L1 output from the headlight as with the example of FIG. 1. Instead, light beam L2 can be output in a different direction than the headlight light beam L1, and illuminate a different surface. In other embodiments, as shown in FIG. 1, the light beam L2 can intersect, overlap, and/or augment the light beam L1 output from the headlight. In some embodiments, as shown in FIG. 3, the light-emitting device control system 101 can be configured to operate in a scanning mode. Referring again to the beam steering mechanism 304 in FIG. 1, when the pair of optical elements, for example, counter rotating wedges 303A in FIG. 3A, counter rotate 304A at the same or similar angle, the light beam 302A is output at an angle θ from its original direction, e.g., along the x-axis. The angle θ can range from 0 degrees to a maximum angle as the counter rotation angle increases from 0° to 90°. Angle θ can return to 0 degrees from the maximum angle as the counter rotation angle of the two wedge increases from 90° to 180°. In the scanning mode, the two wedges 303A counter rotate continuously, whereby the angle θ oscillates between 0 and a maximum predetermined angle continuously. Recall that co-rotation of wedges causes the output beam to rotate in the azimuth direction. In the scanning mode, there is only counter-rotation and no co-rotation of the wedges. Therefore, the output beam only moves back and forth in a straight line when the wedges counter-rotating continuously as illustrated by the motion of the illumination spot 102 in FIG. 3.

The scanning mode can be also obtained by performing other beam steering techniques, for example, described in PCT Publication No. WO2013169635 and U.S. patent No. 62/061,778, each incorporated herein by reference in its entirety. In some embodiments, a beam steering mechanism includes a lens as described in greater detail with respect to FIGS. 15 through 24. For example, a light beam output from the light source may move back and forth continuously by continuously moving either a lens or a light source back and forth along a rail of a guild rail system, for example, to scan a surface region receiving the light, shown in FIG. 3 by a scanned region between locations 102' and 102". This is useful in situations where poor visibility might otherwise occur, such as heavy snow or rain 399, because the scanning operation can increase the scene contrast for a driver operating a vehicle at which the light-emitting device control system 101 is positioned.

Figure 4:
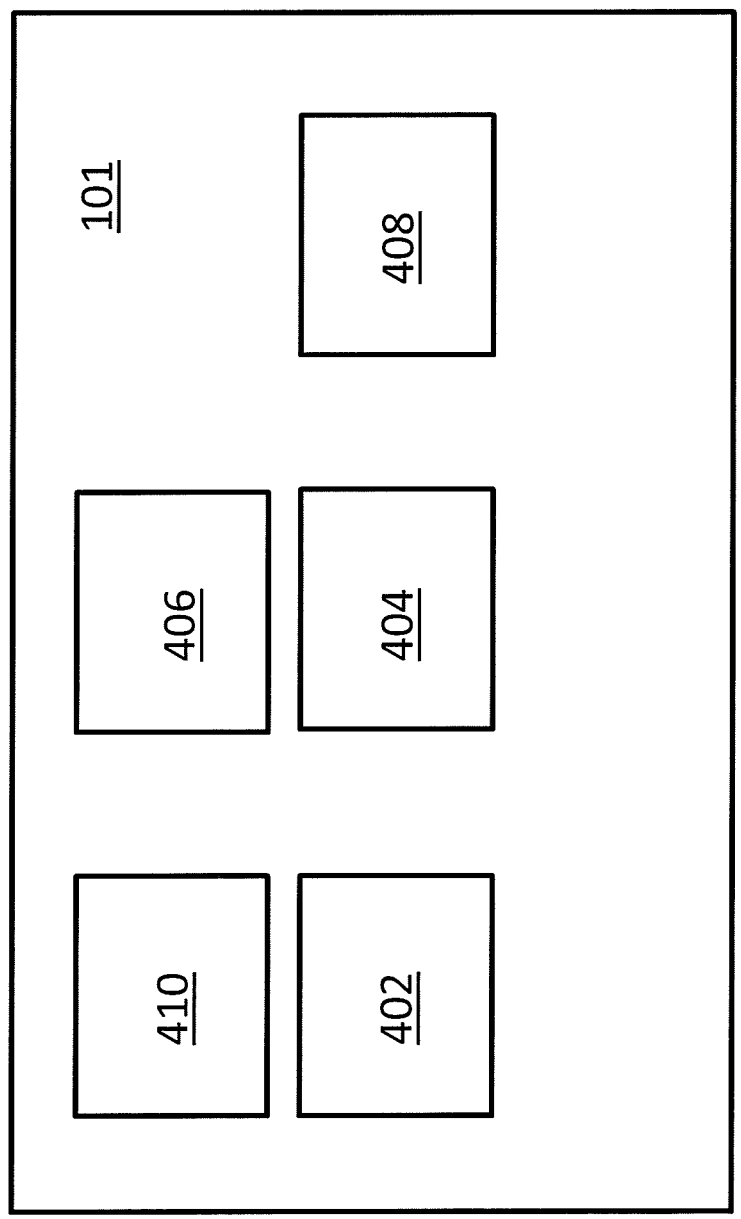
FIG. 4 is a block diagram of a light-emitting device control system, in accordance with some embodiments.

FIG. 4 is a block diagram of a light-emitting device control system 400, in accordance with some embodiments. The light-emitting device control system 400 can be the same as or similar to the control system 101 of FIGS. 1-3, but is not limited thereto. The light-emitting device control system 400 can be used in applications other than vehicle lamp beam steering.

Figure 6:
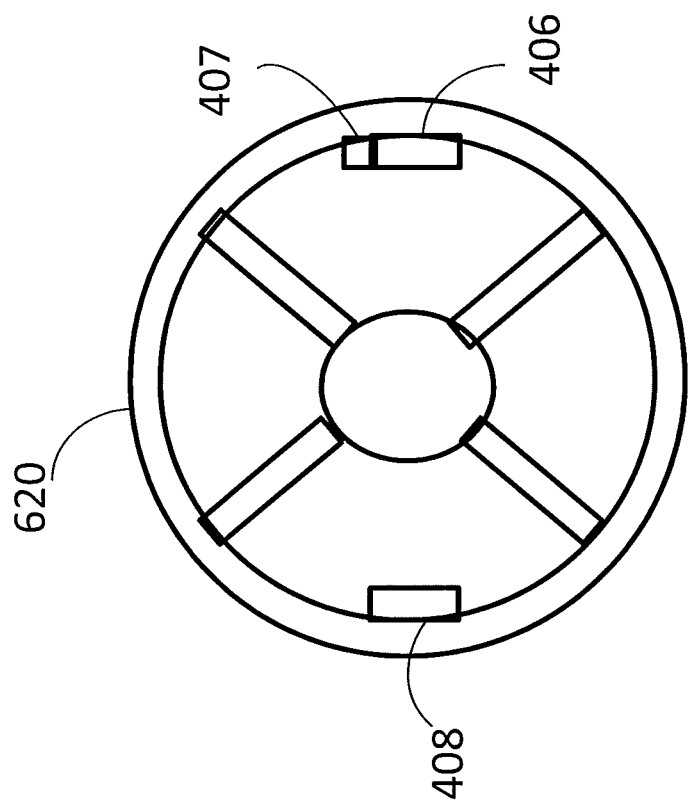
FIG. 6 is a view of a mouse controller and potentiometer of a light-emitting device control system mounted on a steering wheel, in accordance with some embodiments.

In some embodiments, as shown in the block diagram of FIG. 4, a light-emitting device control system 400 comprises a light source such as a vehicle beam steering LED lamp 402, a beam steering mechanism 404, a input device controller 406 for beam steering control, a potentiometer 408 for adjusting light level, and a processor 410 for processing data related to the other elements of the system 101. At least one or more of the vehicle beam steering LED lamp 402, beam steering mechanism 404, input device controller 406, potentiometer 408, and processor 410 can be provided under a same housing, which in turn can be mounted to a vehicle or other object. For example, the lamp 402 and beam steering mechanism 404 can be under the same housing and mounted to a vehicle or other object, for example, mounted on top of the vehicle, in front of the vehicle, a side of the vehicle, or other location of the vehicle. The input device controller 406 and potentiometer 408 can be at a separate location, for example, at a steering wheel as shown in FIG. 6.

The LED lamp 402 can be similar to or the same as a light source described herein, for example, light source module illustrated in PCT Publication No. WO2013169635 incorporated by reference above. For example, the LED lamp 402 can be constructed and arranged as a narrow beam LED, comprising a compound LED chip, narrow-beam optics, a lens, a heat sink for dissipating heat, or a combination thereof.

The beam steering mechanism 404 can be the same as or similar to a beam steering mechanism described herein, for example, directing a light beam from the light source 402 at a surface. In some embodiments, two motors are needed for beam steering using counter rotating wedges. In some embodiments, three motors are needed for beam steering using counter rotating wedges. In some embodiments, the beam steering mechanism 404 can be of a gimbal type, for example, described in PCT Publication No. WO2013169635 incorporated by reference above. In some embodiments, beam steering mechanism 404 can be a moving lens type, for example, described in FIGS. 21-24 herein.

Figure 5B:
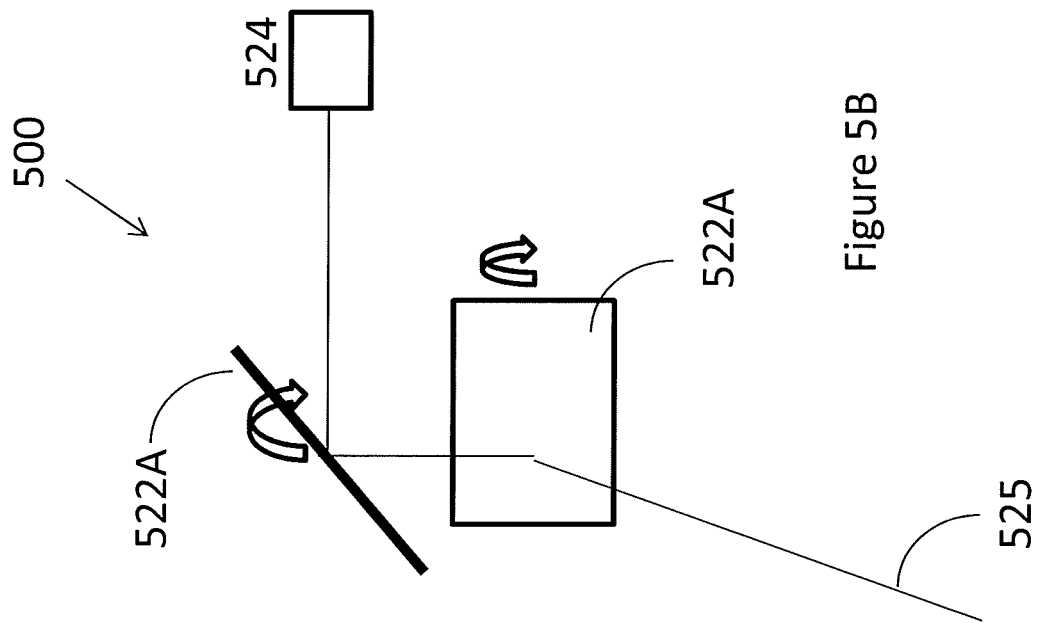
FIGS. 5A and 5B are illustrations of a beam steering mechanism comprising two orthogonal scan mirrors.
Figure 5A:
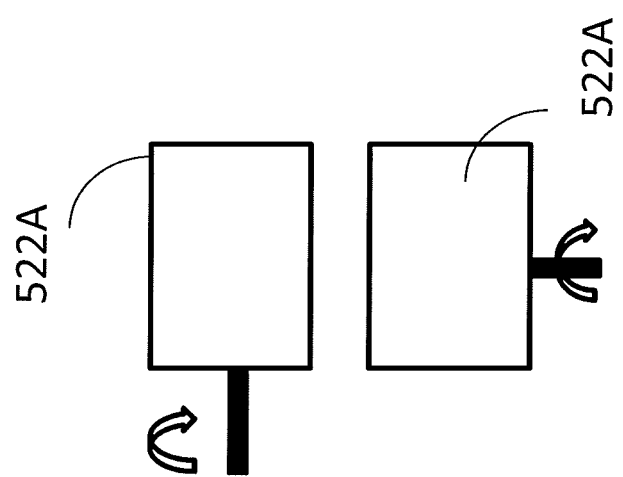

In some embodiments, as shown in FIGS. 5A and 5B, a beam steering mechanism 500 can comprise two scan mirrors 522A, B with orthogonal rotation axes. For example, one scan mirror 522B can rotate about the x-axis while scan mirror 522B can rotate about the y-axis. A light beam output from a light source 524, e.g., an LED lamp, to the beam steering mechanism can be steered in any direction, for example, 525, within the scan ranges of the mirrors 522A, B.

Returning to FIG. 4, the input device controller 406 and potentiometer 408 can be mounted on a steering wheel 620 of a vehicle, for example, as illustrated in FIG. 6. In other embodiments, the input device controller 406 and potentiometer 408 can be mounted at other locations of the vehicle.

A vehicle driver can control a movement of the beam steering mechanism 404 from the input device controller 406 at the steering wheel 620. The driver can also adjust the beam strength and/or other beam-related parameter by the potentiometer 408.

FIGS. 6A-C are illustrations of an input device controller 406, in accordance with some embodiments. The input device controller 406 can receive and process external inputs from a mouse, smart tablet, stylus, joystick, touchpad, or other input device known to those of ordinary skill in the art. In embodiments where the input device controller 406 is a mouse controller, the mouse controller can comprise a trackball 432 and two encoders 434A, 434B (generally, 434). Encoder 434A can process data related to a counter rotation of a beam steering mechanism 404 while encoder 434B processes data related to a co-rotation of the beam steering mechanism 404. The encoder data can include encoder angles which are converted into counter-rotation and co-rotation angles in the processor 410. The processor 410 then outputs the values to the beam steering mechanism 404, which can rotate or otherwise move in response to the angle data.

Figure 28:
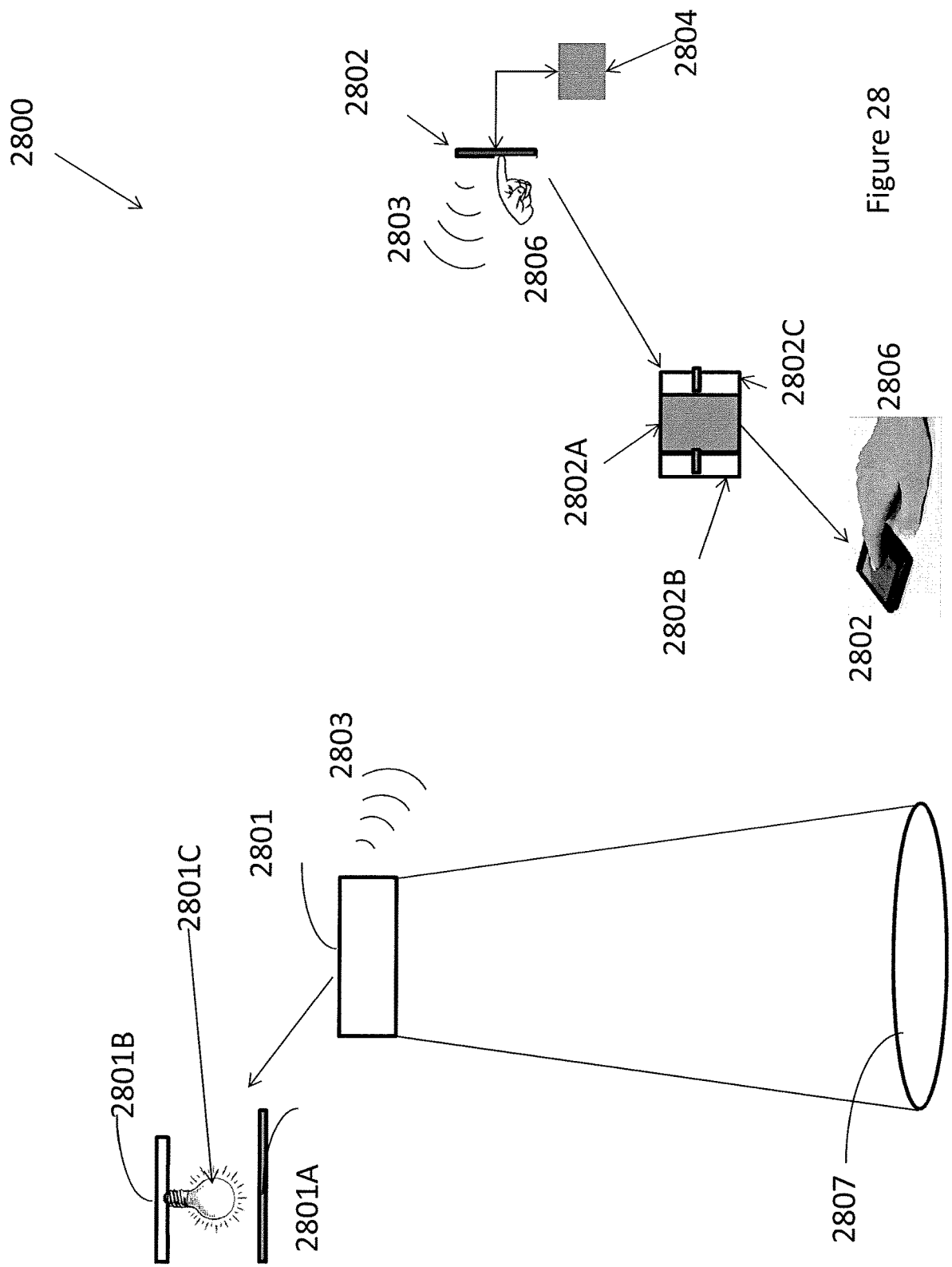
FIG. 28 is a view of a touchpad controller that controls a beam steering mechanism, in accordance with some embodiments.

Each encoder 434 may include a roller that communicates with the ball 432 by friction. When a vehicle driver or other user rolls the mouse ball 432, at least one encoder roller 434 also rotates. In addition to a roller 438, the encoder 434 can comprise an optical encoding disk 444, one or two photodetectors 446, and one or two LEDs 442. When the trackball 432 engages with a roller 438, the roller 438 moves and the optical encoding disk 444 rotates, causing the light holes 450 to be alternately obstructed from LED 442 with respect to the photo detector 446. An example of the mechanics of the mouse 406 can be found in U.S. Pat. No. 5,912,661, incorporated by reference herein in its entirety. In some embodiments, a joystick controller (not shown) can replace the input device controller 406. In some embodiments, as shown in FIG. 28, a touchpad screen or other electronic device having a display, processor, and memory, can be used to control a beam steering mechanism 404.

Figure 7:
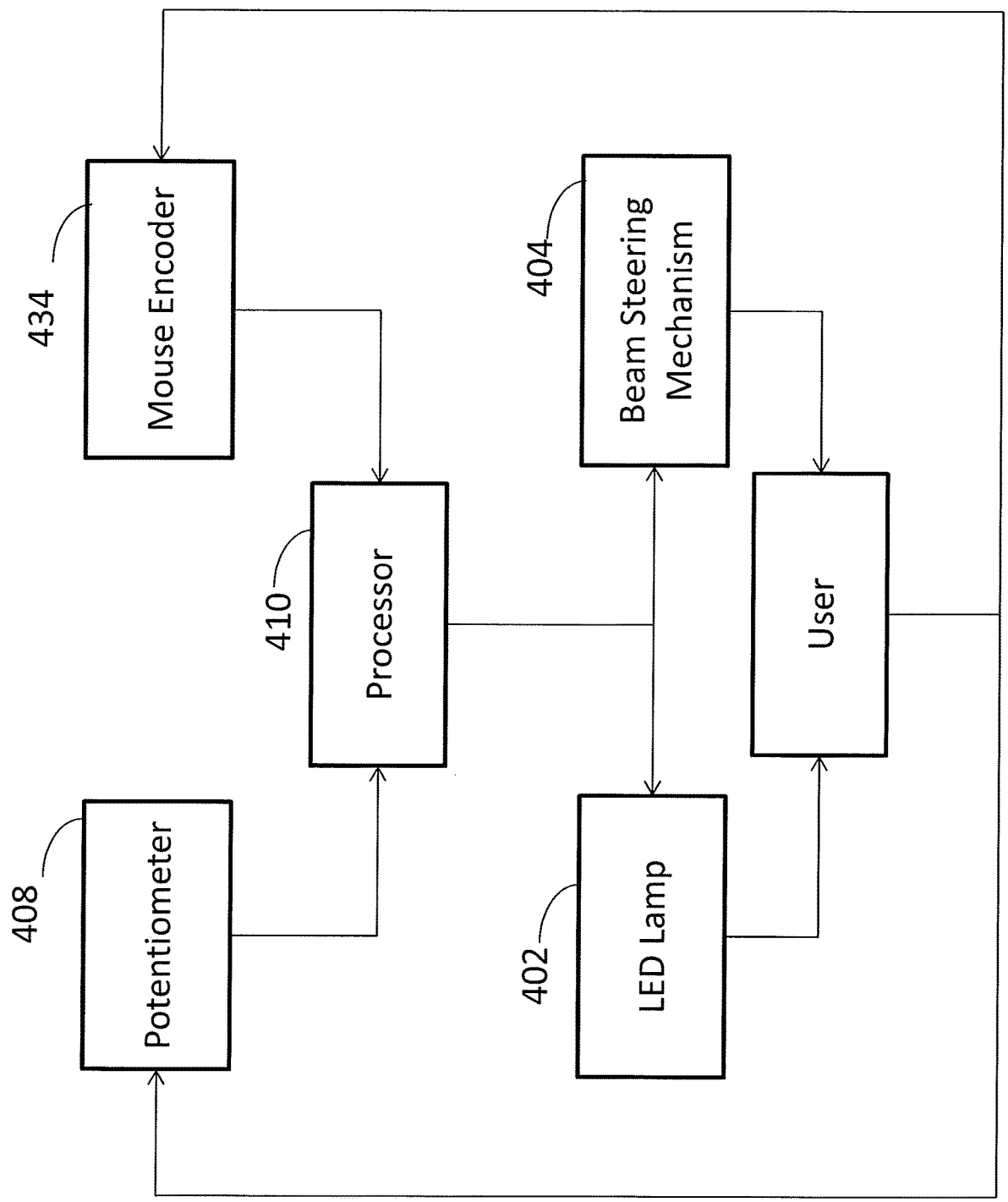
FIG. 7 is a flow diagram of a vehicle beam steering concept, in accordance with some embodiments.

FIG. 7 is a flow diagram illustrating a vehicle beam steering lamp operation concept. During operation, a user such as a vehicle driver can move a mouse, for example, as shown in FIG. 6A-6C, rotates a mouse trackball 432, which in turn rotates the rollers 438 of the encoders 434. Other peripheral devices can alternatively be used, such as a touchscreen on a smart device, a joystick, and so on. The processor 410 performs a calculation to determine the amount of beam steering is needed and sends the signal to the beam steering mechanism 404 to perform a beam steering motion. The driver checks the beam spot position by visually observing the location of the illuminated surface. If the target position has not been reached, the user can determine whether more rotations of the trackball 432 are needed. The operation may continue until the beam of light is steered at a desired target position. The driver can also adjust the brightness of the beam using a potentiometer 408. The potentiometer 408 can adjust the LED current through an LED driver. In the scanning operation described herein with reference to FIG. 3, the driver does not have to control a beam position; the beam can continuously move back and forth in a scanning motion. In some embodiments, the system 101 includes an analog or mode digital switch 407 (FIG. 6) for changing a state of the system 101 between a scanning mode and a non-scanning mode. The switch 407 can be configured to send a signal to the scanning mirrors 422 shown in FIG. 5 or the scanning wedges 352 shown in FIG. 1 for controlling a movement of these scanning elements. As shown in FIG. 6, the switch 407 can be an analog switch that is located at a steering wheel or other location so that a user can manually change between a scanning mode and non-scanning mode. In other embodiments, a digital switch, or a software application executed at the processor 410 or other processor or the like, can be implemented for automatically switching between a scanning mode and a non-scanning mode.

Figure 8:
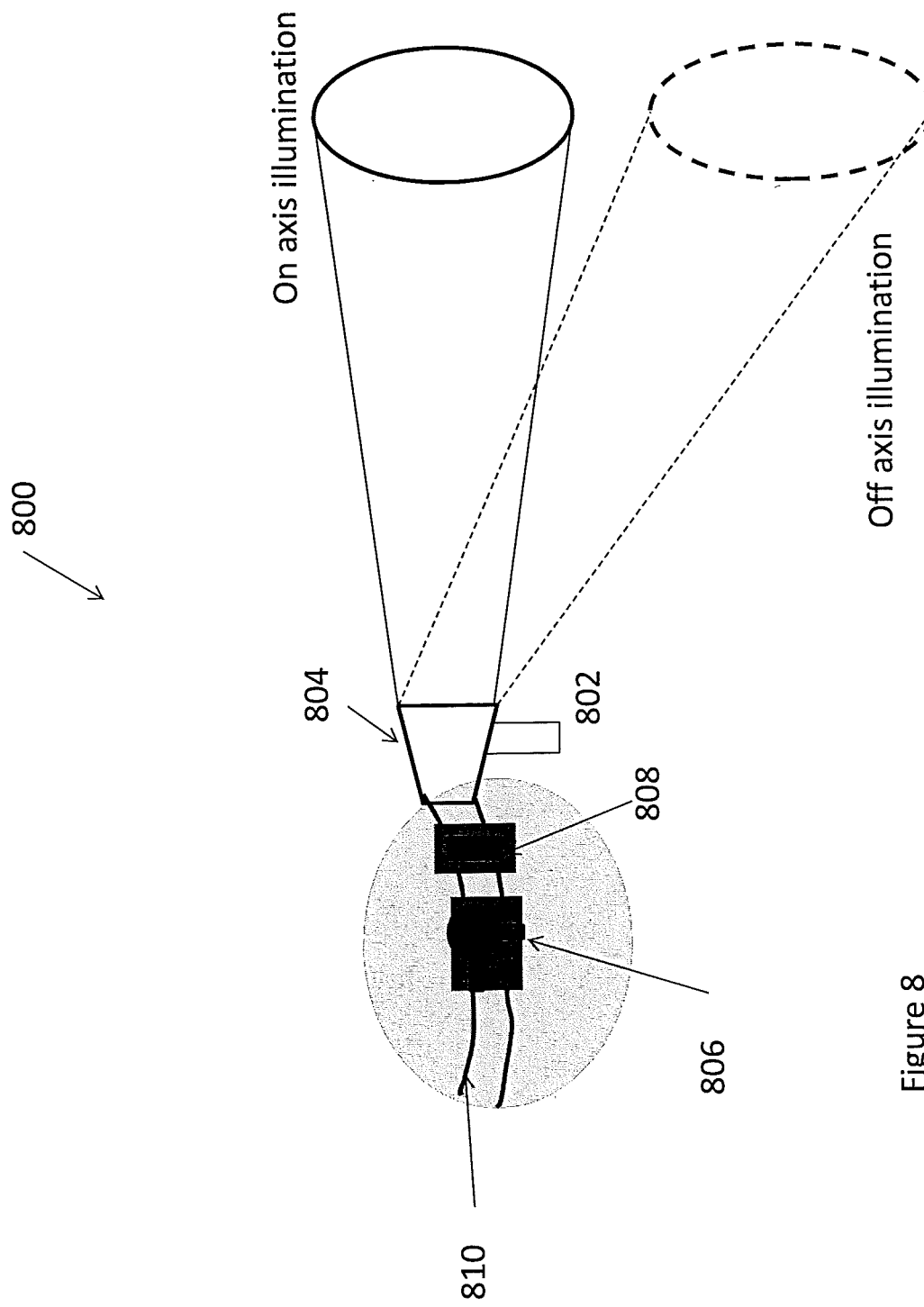
FIG. 8 is a view of a beam steering headlamp, in accordance with some embodiments.

FIG. 8 is a view of a beam steering headlamp 800 in accordance with an embodiment. The headlamp 800 can include a beam steering mechanism 804 which can be the same as or similar to a beam steering mechanism described herein. Details are therefore not repeatedly for brevity.

The headlamp 800 also includes a light source 802 such as an LED lamp, a input device controller 806 for beam steering control, and/or a potentiometer 808 for adjusting a light level, brightness, or related light-related parameter, which can likewise be the same as or similar to corresponding devices herein. The light source 802, the beam steering mechanism 804, the input device controller 806, and/or the potentiometer 808 can be coupled to a headband, hat, or related headwear 810 for positioning on a user's head. For example, the headlamp can be used by doctors, artists, craft men, miners, car mechanics, or other users for performing a variety of operations that include the use of light. For example, the headlamp beam steering assembly 804 can be mounted on the forehead of a user while an input device controller 806 is on the side of the user's head. The potentiometer 808 can be attached next to the input device controller 806. In other embodiments, the input device controller 806 and the potentiometer 808 are positioned separate from the headwear 810, for example, another part of the body, or a separate location from the body.

In embodiments where the LED lamp beam steering assembly 804 includes two wedges, for example, similar or the same as wedges 352A, B of FIG. 1 and in PCT Publication No. WO2013169635 incorporated by reference above, which can be rotated by two or more motors for performing a beam steering operation. During operation, a user, for example, a wearer of the headwear 810, can rotate a trackball or the like in the input device controller 806 to control a direction of a light beam generated at the light source 802 to a desired position. This feature is beneficial for a wearer who is unable to move the head and therefore unable to direct a light beam generated by the LED lamp beam steering assembly at a target, or can only move the head with difficulty, for example, an auto mechanic working underneath a car. The wearer of the beam steering headlamp 800 can overcome this problem by steering a light beam without moving his/her head, for example, by moving the mouse trackball or the like with a hand, which in turn controls the beam steering mechanism 804 to direct the light beam at a desired location. In some embodiments, a speech recognition device, for example, described in US Patent Application Publication No. 2015/0023019 incorporated by reference herein in its entirety, can be employed instead of a mouse controller to control the beam steering mechanism, which may be beneficial where the wearer cannot move the head or the hand. For example, speech recognition systems can be added to a control system. In other embodiments, a microphone used to detect sounds, in particular, voice signals, is attached to the control module in a light emitting control system. In some embodiments, a collected voice signal can be output to a processor (not shown), such as a digital signal processor (DSP) and processed by a speech recognition processor or the like. A command signal can be generated in response to the processing of the voice signal.

Figure 9:
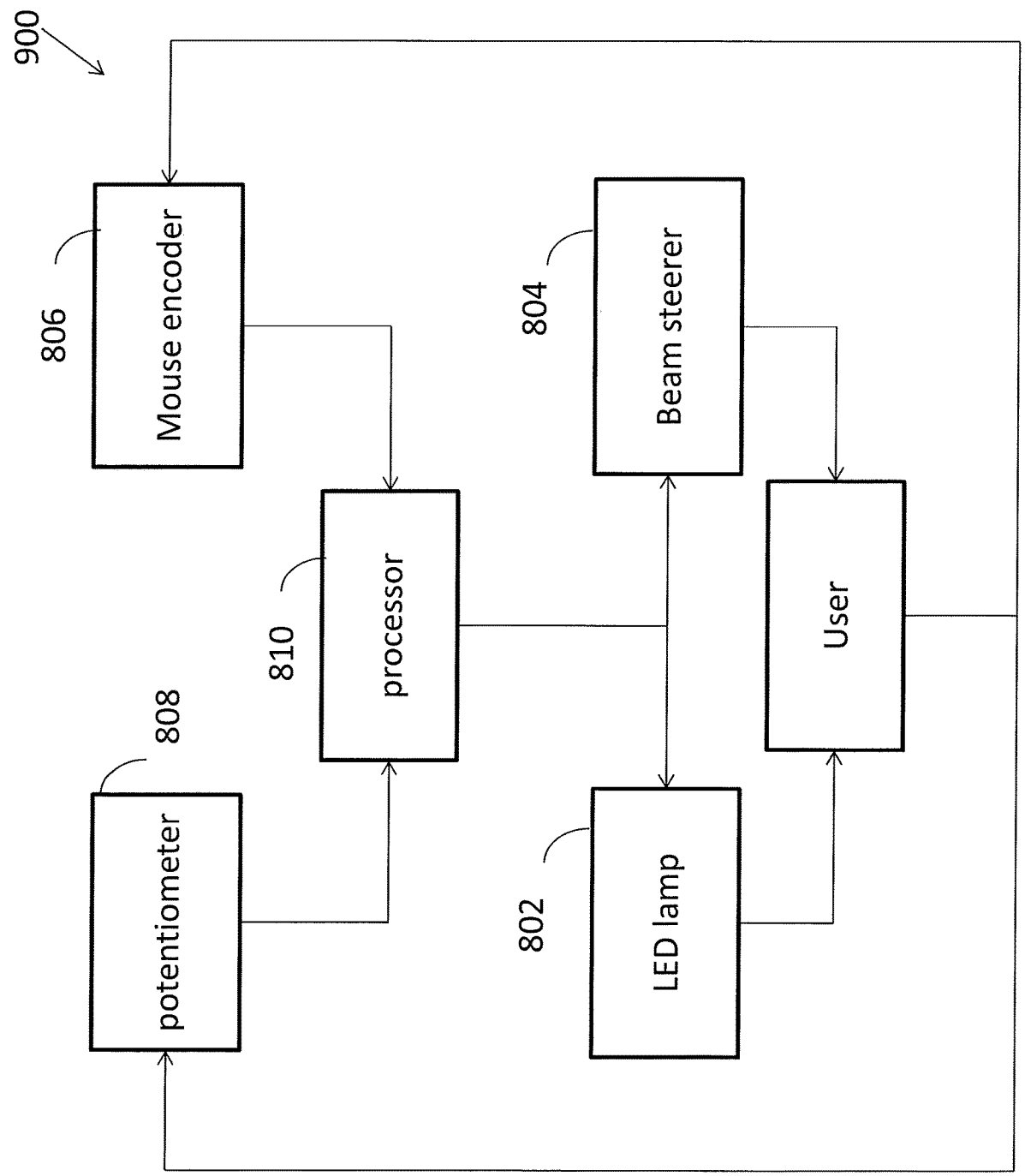
FIG. 9 is a flow diagram of a beam steering headlamp concept, in accordance with some embodiments.

FIG. 9 is a flow diagram 900 illustrating a beam steering headlamp concept, in accordance with some embodiments. In describing the operation concept, reference is made to elements of FIG. 8. During operation, a user such as a headlamp wearer may rotate a trackball or the like of a mouse controller 806 or move an icon on a touchscreen such as a smartphone screen or the like, similar to other embodiments herein. The processor 810, which can be located at the headlamp, or at a separate location than the headlamp, can perform a calculation to determine the amount of beam steering is needed and send the calculation result to the beam steering mechanism 804 to perform a beam steering motion. The user checks the beam spot position by visually observing the location of the illuminated surface. If the target position has not been reached, the user can determine whether more rotations of the trackball are needed. The process may continue until the beam of light is steered at a desired target position. The user can adjust the brightness of the beam using a potentiometer 808. The potentiometer can adjust the LED current through an LED driver in communication with the lamp 802.

Figures 44A, 44B:
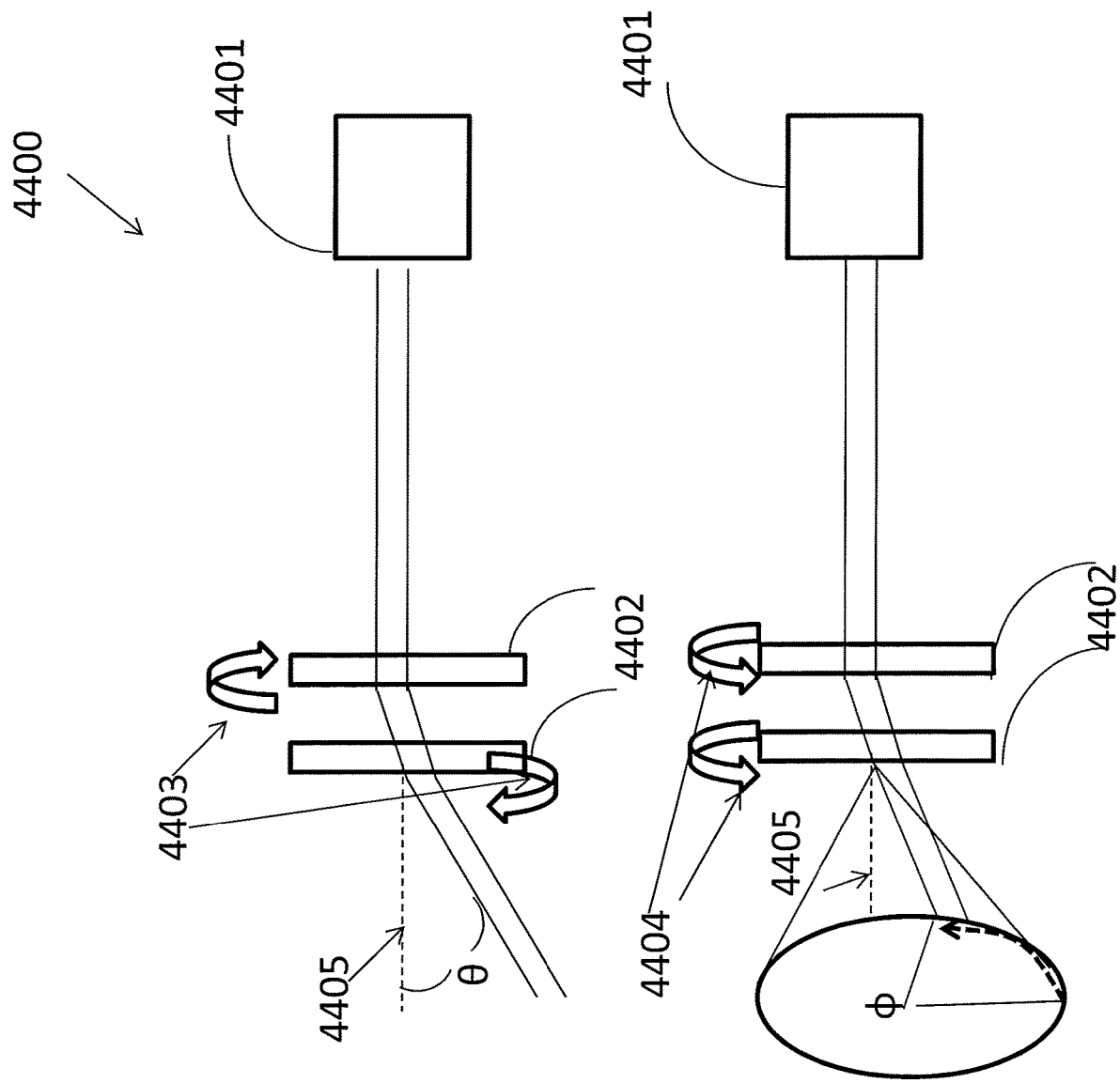
FIGS. 44A and B are views of a beam steering mechanism, in accordance with some embodiments.

In some embodiments, beam steering of the headlamp can be performed manually. In some embodiments, the beam steering mechanism can be a lens mounted on a set of guided rails in a plane perpendicular to the optical axis of the light source as described in FIG. 23 and FIG. 24 herein. Here, the rails do not include motors and their controllers. In these embodiments, to steer the beam, an operator can simply move the lens along the two guided rails manually. In some embodiments, as shown in FIGS. 44A and 44b, a beam steering mechanism 4400 can include a pair of counter rotating Fresnel prisms 4403. To direct a light beam to a desired direction, the user can rotate the two Fresnel prisms in opposite directions to steer the beam off the optical axis of the Fresnel prisms to obtain a deviation angle first, then rotate the two Fresnel prisms together to steer the beam in the azimuth direction at the fixed deviation angle to its final direction.

Figure 10:
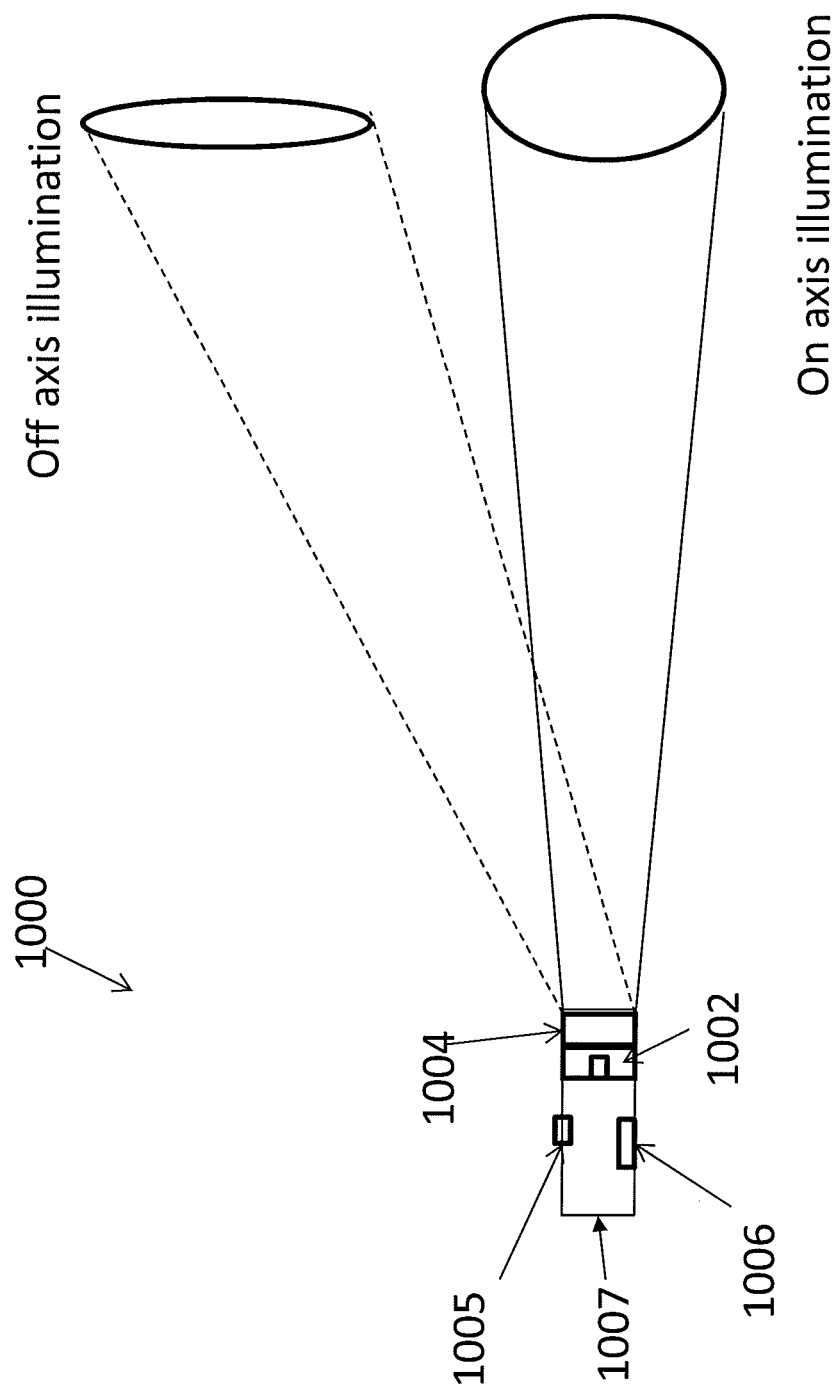
FIG. 10 is a view of a beam steering flashlight, in accordance with some embodiments.

FIG. 10 is a view of a beam steering flashlight 1000 in accordance with an embodiment. The beam steering flashlight 1000 can include a light source 1002, a beam steering mechanism 1004, an input device controller 1006, and/or a potentiometer 1005, similar to those counterpart elements of embodiments described at least one of FIG. 1-9, or in other embodiments, except that some or all of the light source 1002, the beam steering mechanism 1004, the input device controller 1006, and/or a potentiometer (not shown), are positioned inside, or on, a flashlight housing. For example, the input device controller 1006 can be attached to the side of the flashlight as illustrated in FIG. 10. Beam steering can be performed by the user by rolling a trackball, moving an icon on a touchscreen, or the like in communication with the input device controller 1006. The operation concept is the same or similar as that of the beam steering headlamp in FIG. 9.

Driving at night in a thick fog is very hazardous. Drivers may have limited visibility because dense fog scatters and attenuates most of the light from vehicles.

Figure 11:
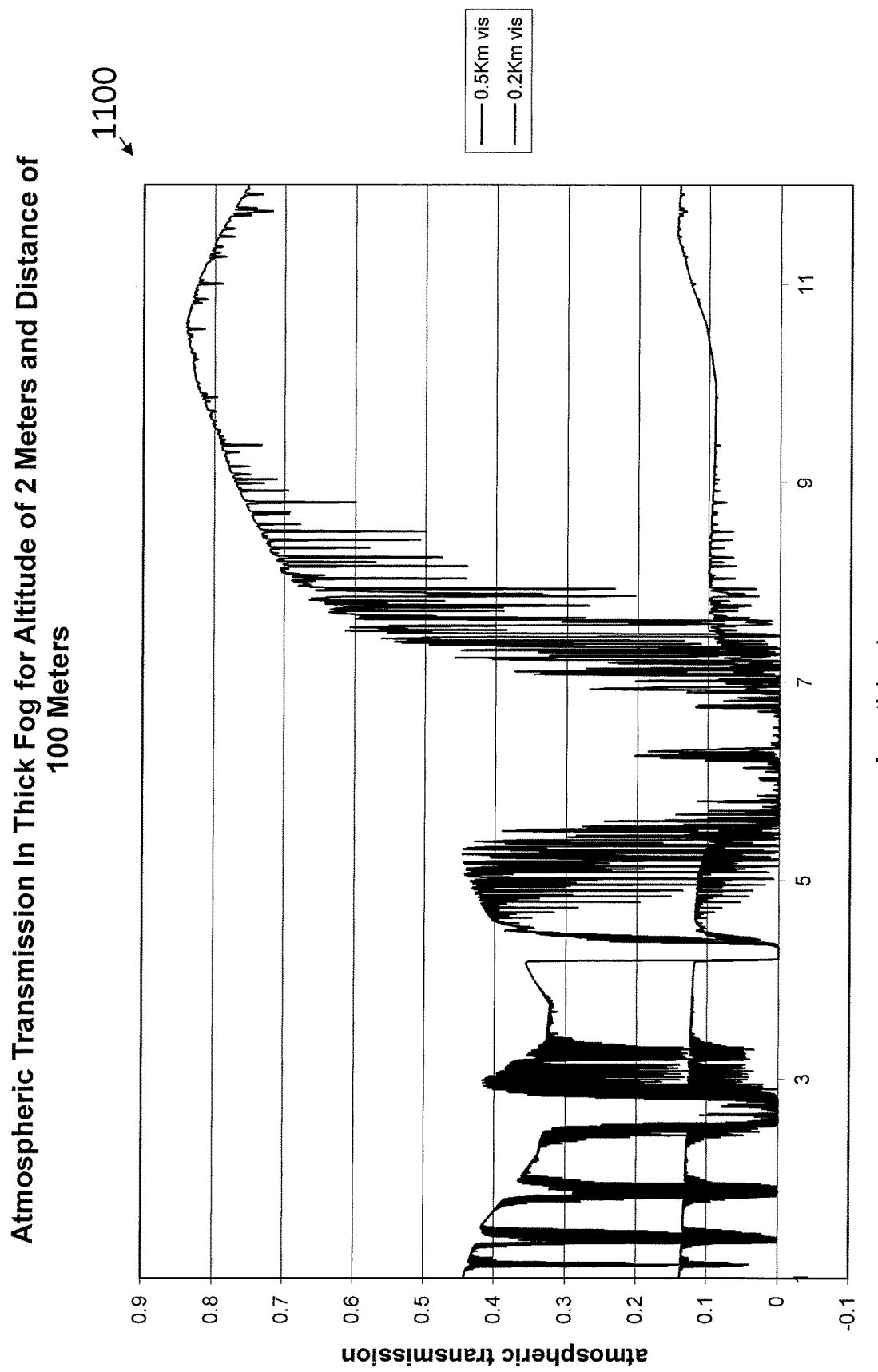
FIG. 11 is a graph illustrating an atmospheric transmission spectrum for heavy fog.

FIG. 11 is a graph illustrating the atmospheric transmission spectral for heavy fog at 0.5 km and 0.2 km visibilities. Atmospheric software MODTRAN or the like can be used to generate the transmission. The thickness of the atmosphere used in the simulation is 100 meters. The altitude is 2 meters.

The electromagnetic wave spectrum, for example, shown in FIG. 11, is divided into different bands: ultraviolet (UV, 0.1-0.4 µm), visible (0.4-0.75 µm), near infrared (NIR)

(0.75-1.4 μm), short wave infrared (SWIR, 1.4-3 μm), mid-wave infrared (MWIR) (3-8 μm), and long wave infrared (LWIR) (8-15 μm). It is well known to those of ordinary skill in the art that the atmosphere permits transmission of a portion of the electromagnetic wave spectrum and absorbs the rest. The atmospheric spectral bands with high transmission are called atmospheric transmission windows.

As illustrated in the graph 1100 of FIG. 11, the atmospheric transmission drops quickly across the spectrum. The NIR and SWIR bands drop form roughly 40% to 13% in their atmospheric transmission windows. The two SWIR atmospheric windows are 1.5-1.8 μm and 2.0-2.6 μm. The LWIR drops from roughly 76% to 14% in its atmospheric transmission window 8-15 μm.

A LWIR camera or the like can be used to pick up a thermal signal from a vehicle exhaust pipe or other emission component which can be processed in a manner that improves a driver's visibility. However, the exhaust pipes of some vehicles, such as a large truck, are typically located in front of the truck. Thus, the back of the vehicle is at ambient temperature, rendering an LWIR ineffective. The thermal contrast is very low, and even lower through thick fog. The red light from the rear lights of a vehicle in front of the driver is scattered by thick fog due to its short wavelength. Light scattering is inversely proportional to wavelength to the fourth power. In the two SWIR atmospheric windows 1.5-1.8 μm and 2.0-2.6 μm, respectively, scattering can be at least 16 times less in the SWIR than the visible range. SWIR light penetrates thick fog much better than the visible light. A light source at SWIR therefore can be used to illuminate the target. A camera at the corresponding SWIR bandpass can be used for imaging the target.

Figure 12:
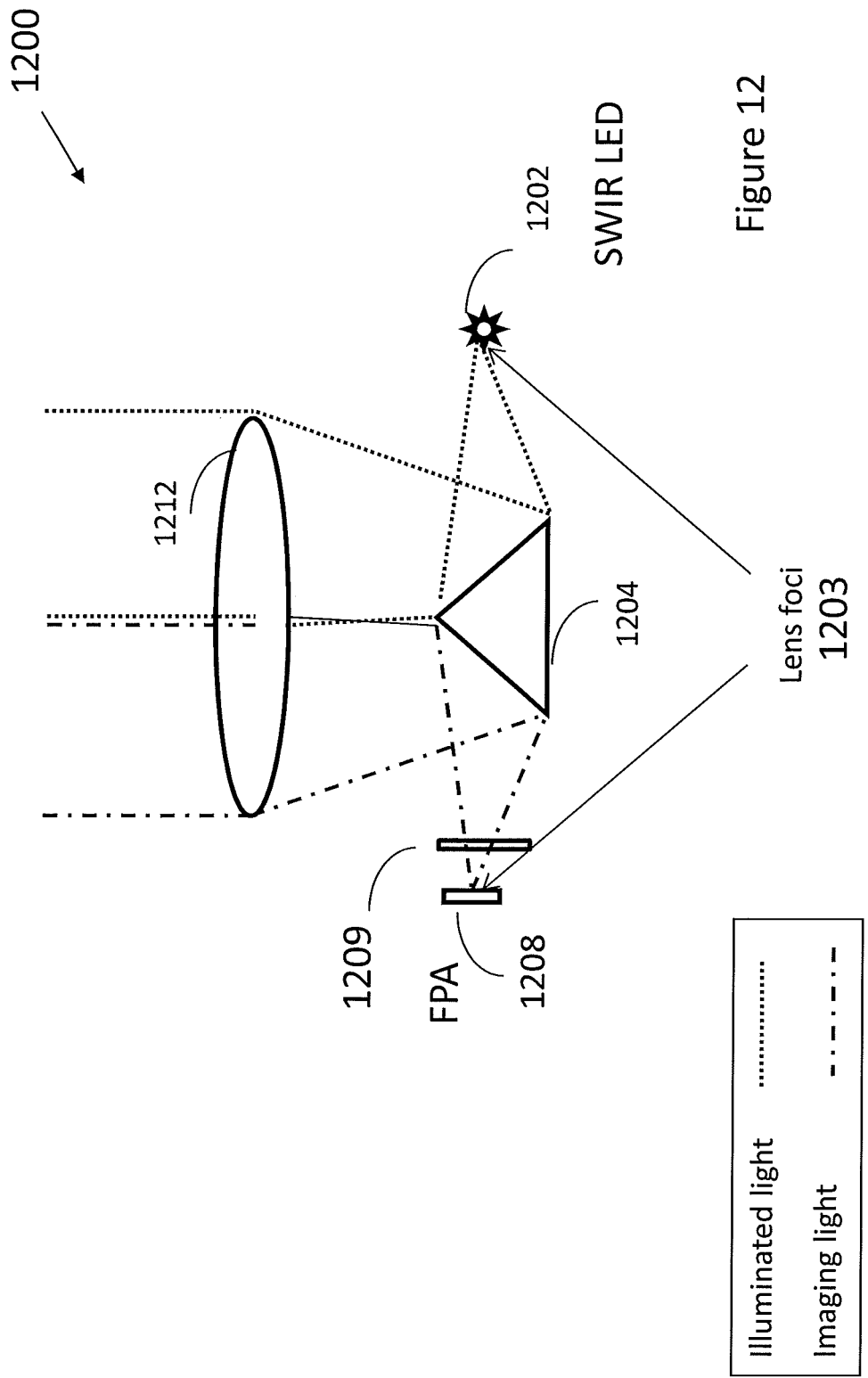
FIG. 12 is a side view of a fog penetrating sensor, in accordance with some embodiments.
Figure 13:
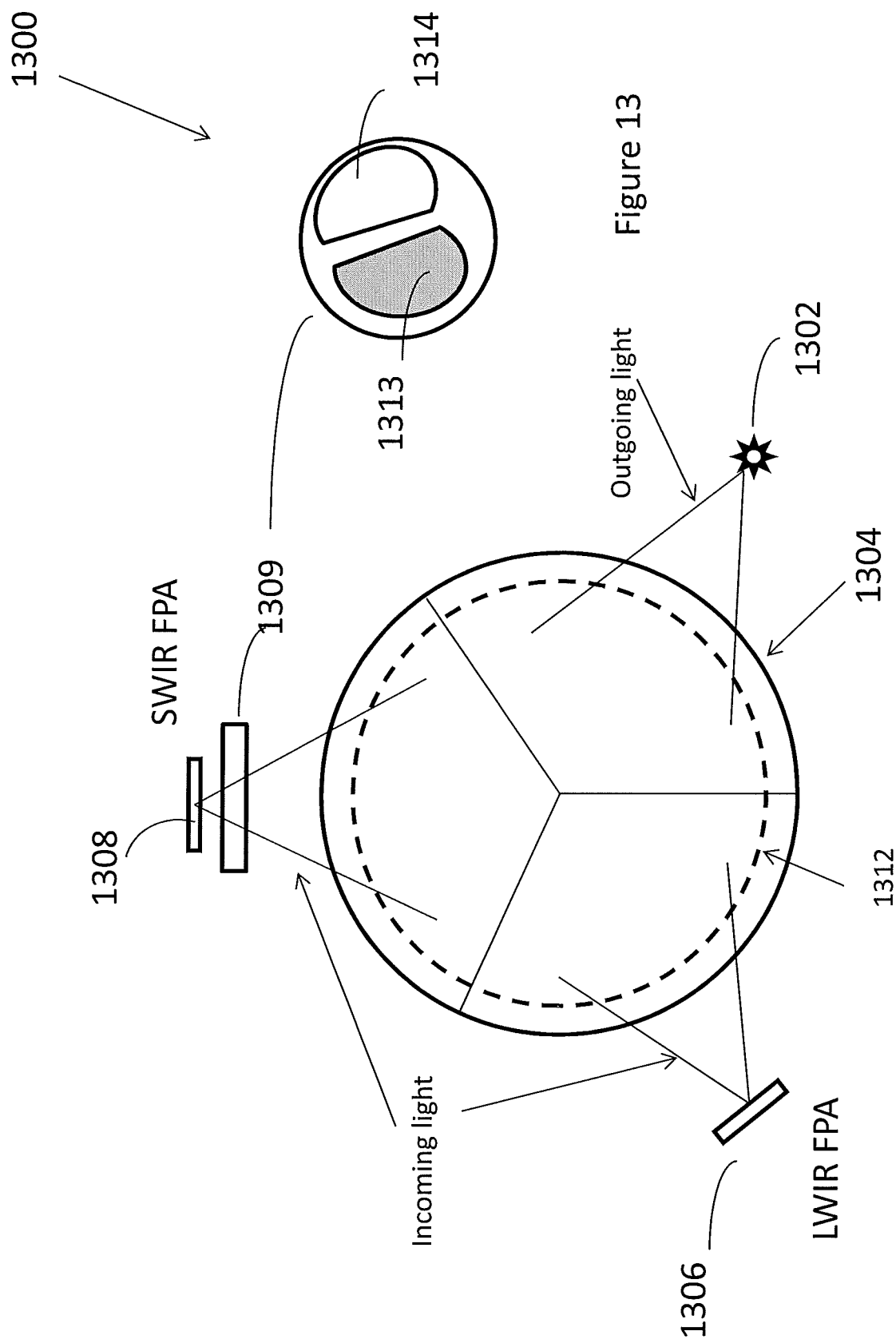
FIG. 13 is a top view of a fog penetrating sensor, in accordance with some embodiments.
Figure 14:
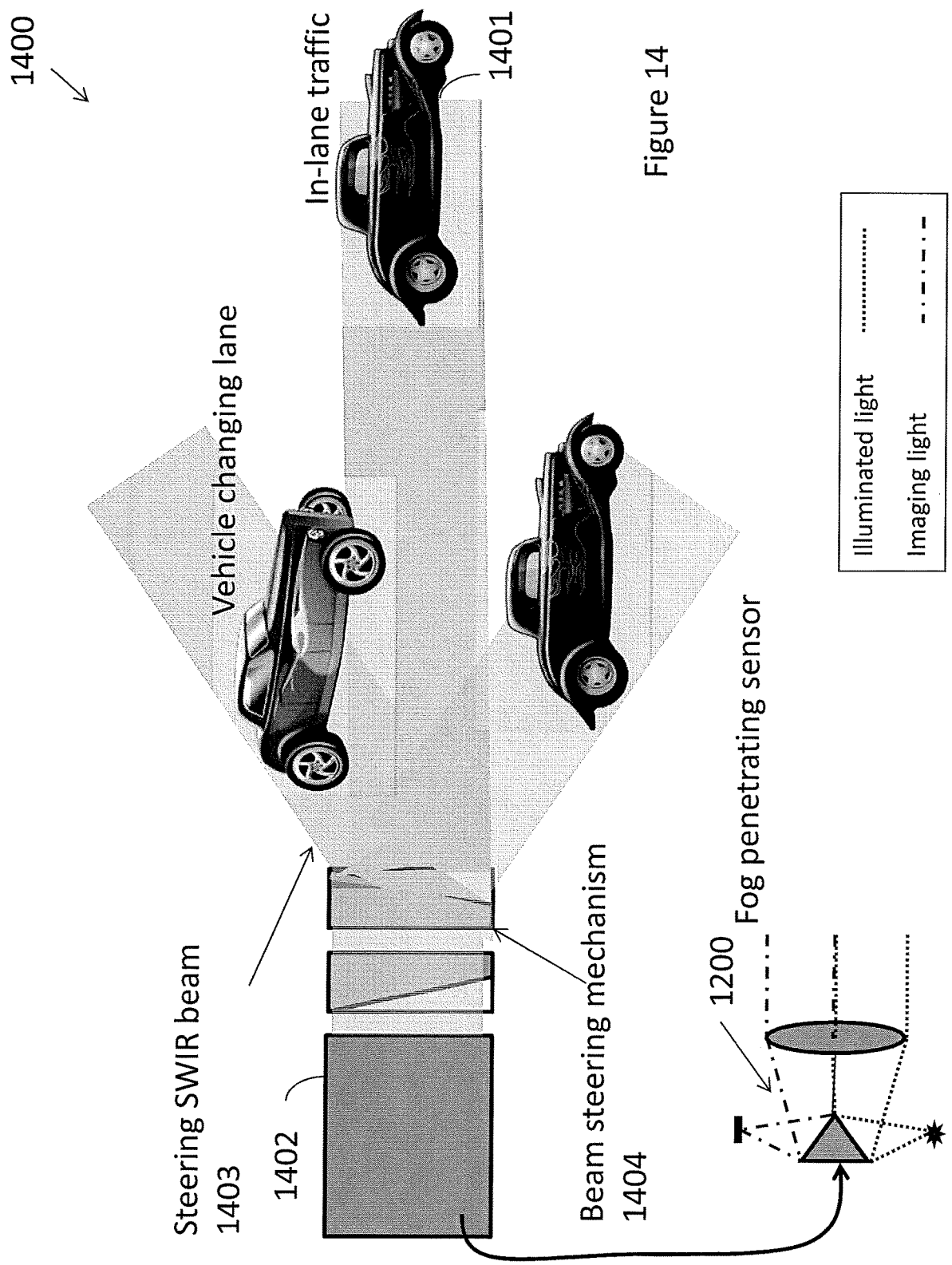
FIG. 14 is a view of a fog penetrating system controlling a shortwave infrared (SWIR) beam, in accordance with some embodiments.

FIG. 12 is a side view of a fog penetrating sensor 1200, in accordance with some embodiments. FIG. 13 is a top view of a fog penetrating sensor 1300, in accordance with some embodiments. FIG. 14 is a view of a fog penetrating system 1400 controlling a shortwave infrared (SWIR) beam, in accordance with some embodiments.

One or more of the fog penetrating sensors 1200, 1300, 1400, can include one or more elements of a flashlight camera, for example, described in PCT Publication No. WO2013169635 incorporated by reference above. In some embodiment, a visible LED source in a flashlight camera of PCT Publication No. WO2013169635 incorporated by reference above can be replaced by a SWIR LED source 1202, 1302, or 1402. In other embodiments, the visible LED can be replaced by a SWIR laser 1202, 1302, or 1402. In some embodiments, the visible FPA can be replaced by a SWIR FPA 1208, 1308 as shown in FIG. 12 and FIG. 13, respectively. In some embodiments, other components of the fog penetrating sensors 1200, 1300, 1400 in FIGS. 12, 13, and 14, respectively, are similar to or the same as that of the flashlight camera in PCT Publication No. WO2013169635, or other illustrations and corresponding descriptions herein. In some embodiments, other components can be different.

In particular, shown in FIG. 12, the sensor 1200 comprises an aperture lens 1212, a pyramid mirror 1204, one or more light sources 1202, FPAs 1208, each operating in a different light wave spectrum, and filter wheels 1209 with filters at various spectral bands. For example, foregoing elements can include one or more of an shortwave infrared (SWIR) LED light source; a SWIR focal plane array (FPA); a focus and defocus wheel to eliminate background; an uncooled thermal FPA; and an aperture lens that is shared by the light source, the SWIR channel, and the uncooled thermal channel at a foci of the lens. The share aperture lens allowing illuminating and imaging of the same target area simultaneously permitting more efficient use of illumination light, the longer wavelength SWIR light is scattered less by aerosols such as fog, therefore, sees further permitting active imaging of the target by the SWIR channel and passive imaging of the target by the thermal channel. A beam steering mechanism, for example, described herein, can steer the illumination light to the target and imaging light from the target allowing scanning of the target scene.

In some embodiments, referring to FIG. 13, a filter wheel 1309 may include a blank filter 1313 and an empty slot 1314 can be inserted in front of the SWIR FPA 1308 as shown in FIG. 13. In some embodiments, the blank filter can include a BK7 glass or the like. In some embodiments, the blank filter can be a high refractive index SWIR material. Scattering is high even in SWIR band in thick fog, for example, shown in the graph of FIG. 11. Most of the scattering is due to back scattering of the illumination beam near the sensor. This back scattering background is not in focused while the target is. The blank filter defocuses the target. By taking a defocused image with a blank filter and a focused image without filter in some embodiment, one can remove this back scattering background by subtracting the defocused image from the focused image. This will further enhance the image quality on top of the penetrability of the SWIR light.

Referring again to a multispectral flashlight camera, the flashlight camera may include a camera aperture lens is shared by illumination sources and imaging detector arrays at the foci 1203 of the lens through aperture splitting using a pyramid mirror. These detector arrays are called focal plane arrays (FPAs) because they share the same aperture and have the same focal lengths, the illumination area is the image of the FPAs. Therefore, the camera sees only the illumination area, and therefore the entire, full image will be illuminated. Because aperture splitting can accommodate multiple sources and FPAs, a multispectral flashlight camera can be constructed. A multispectral flashlight camera allows the user to access images of the same scene at different spectral bands. It can be used for material detection such as detection of home-made explosives (HME). A long wave infrared (LWIR) channel can be used to perform a variety of applications, for example, related to disturbed earth detection for buried improvised explosive devices (IEDs). It can also be used for vehicle and industrial inspection. Here, only an imaging area is illuminated. Thus, the illumination is very efficient. Because both the SWIR and LWIR FPAs are looking at the same imaging region, in some embodiments SWIR image and LWIR image can be fused together. The fused image will enhance the driver's vision in thick fog. In some embodiments, the fog penetrating sensor, for example, shown in FIG. 14, can be installed on vehicles to aid drivers during inclement weather, for example, fog. In some embodiments, a penetrating sensor 1200, 1300, 1400 can be installed on a ship for navigation through dense fog. In some embodiments, a penetrating sensor 1200, 1300, 1400 can be installed on a train for operator viewing during thick fog. In some embodiments, a penetrating sensor, for example, sensor 1200, 1300, 1400 of FIGS. 12-14, respectively, can be installed on an aircraft for landing and taking off during heavy fog, or related weather condition where visibility by the human eye is poor. The inventive concepts are not limited to their application on cars, trucks, airplanes, ships, and trains. Accordingly, other embodiments can equally apply with respect to any transportation vehicle or the like.

To enhance the capability of a penetrating sensor 1200, 1300, 1400, in some embodiments, a counter-rotating beam steering mechanism 1404 can be place in front of a camera, for example, shown at FIG. 14. The field of view (FOV) of the camera can be scanned left to right and right to left continuously. This will allow the driver to spot changing lane vehicles in front of him/her so that he/she can respond quickly as illustrated in FIG. 14. It also allows the driver to see people crossing street at his/her blind spot. Furthermore, it allows the driver to spot animals crossing the road at night or in poor visibility. In some embodiments, the material of the wedge prisms in the beam steering mechanism includes Cleartran™ material. In some embodiments, the material of the wedge prisms can include other materials transmit infrared light.

As described herein, a beam steering mechanism can include a gimbal or, or a gimbal mirror, a pair of counter rotation wedge prisms. However, counter rotating wedge prisms may be limited by aperture size. In order to have a large steering angle, the wedge angle of the wedge prisms must be large. Using a large aperture for lighting application, the thickness of the wedge prisms increases quickly. The system becomes bulky and weighty. In addition, wedge prisms have high loss for large input angle light rays. Furthermore, large wedge prisms are difficult to make and expensive. Two axis gimbals used for beam steering in lighting application can be very bulky and expensive. A gimbal needs to be rotationally symmetric. In order to have their load not affect the stability, the moment of inertial of the gimbal must be much greater than that of the load. This means the gimbal must be heavy. A gimbal mirror needs to be large in order to capture all the light at large gimbal angles. This makes the system very bulky. In order to have good stability, the gimbal needs to be heavy. Thus, using gimbal, gimbal mirror, or counter rotation wedge prisms for beam steering in lighting applications is not economically possible for the masses.

Embodiments include the use of a lens-based method for beam steering and may overcome the foregoing limitations. A Fresnel lens made from plastic can be used. It is very inexpensive, thin, light weight, and can be made to large size, and suitable for lighting applications. To perform beam steering, a set of guided rails may extend in along an x and y axis, and can be constructed and arranged to move either the lens or the light source. The rails can be constructed to be inexpensive due to the materials forming the rails and the lack of complexity of the rails. Thus, inexpensive steerable light can be constructed. If the light source is mounted on a vertical rail to move relative to the lens, the illumination spot size can be adjusted. The benefits of this type of beam steering mechanism go beyond illumination. If an optical wireless communications transmitter is mounted in this system or if the illumination light is used as a transmitter, a user can steer his illumination and transmitter light to his/her desired location and watch gigabit video on his laptop or mobile devices. The beam size adjustment feature allow user to increase the transmitter beam spot size so that multiple users can share gigabit data. When the user does not want to share, he/she can simply decrease the transmitter beam spot size.

Figure 16A:
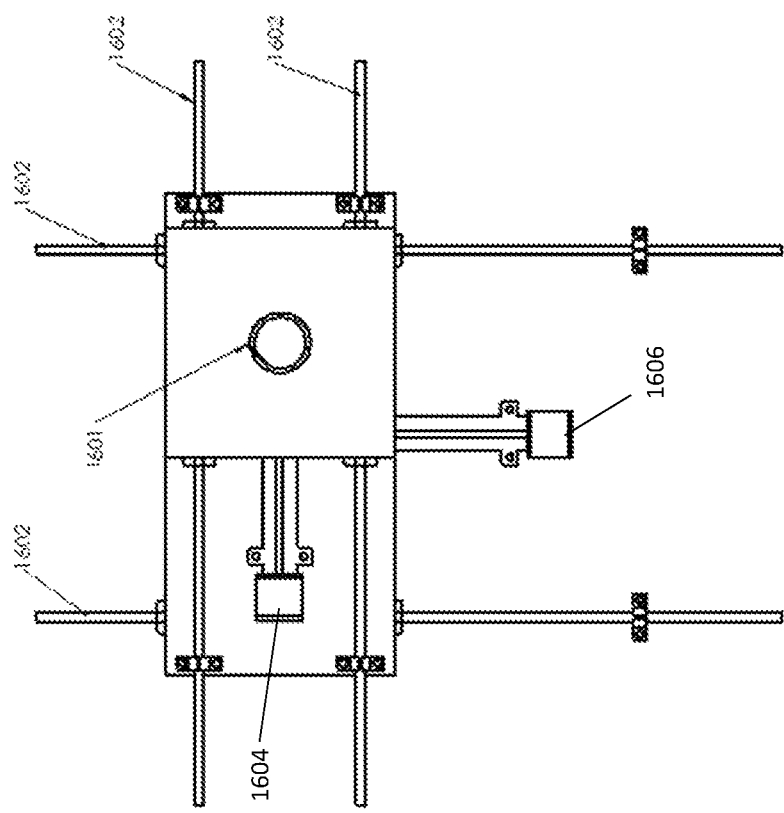
FIG. 16A is a top view of the beam steering configuration of FIG. 16.
Figure 17A:
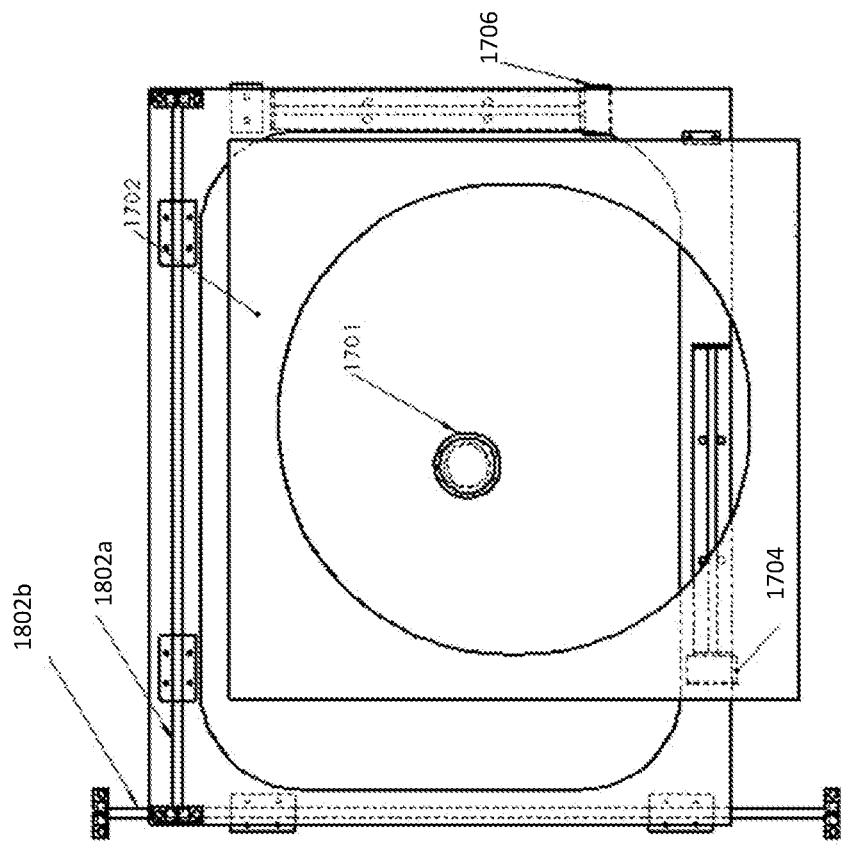
FIG. 17A is a top view of the beam steering configuration of FIG. 17.
Figure 18:
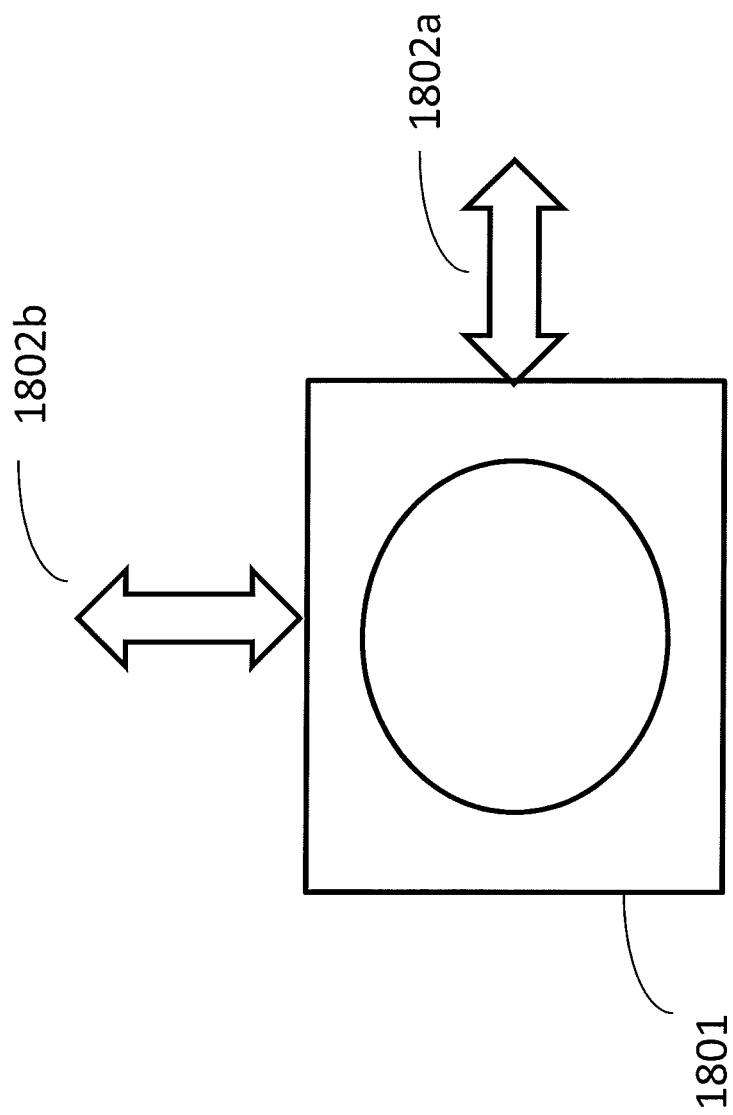
Figure 20:
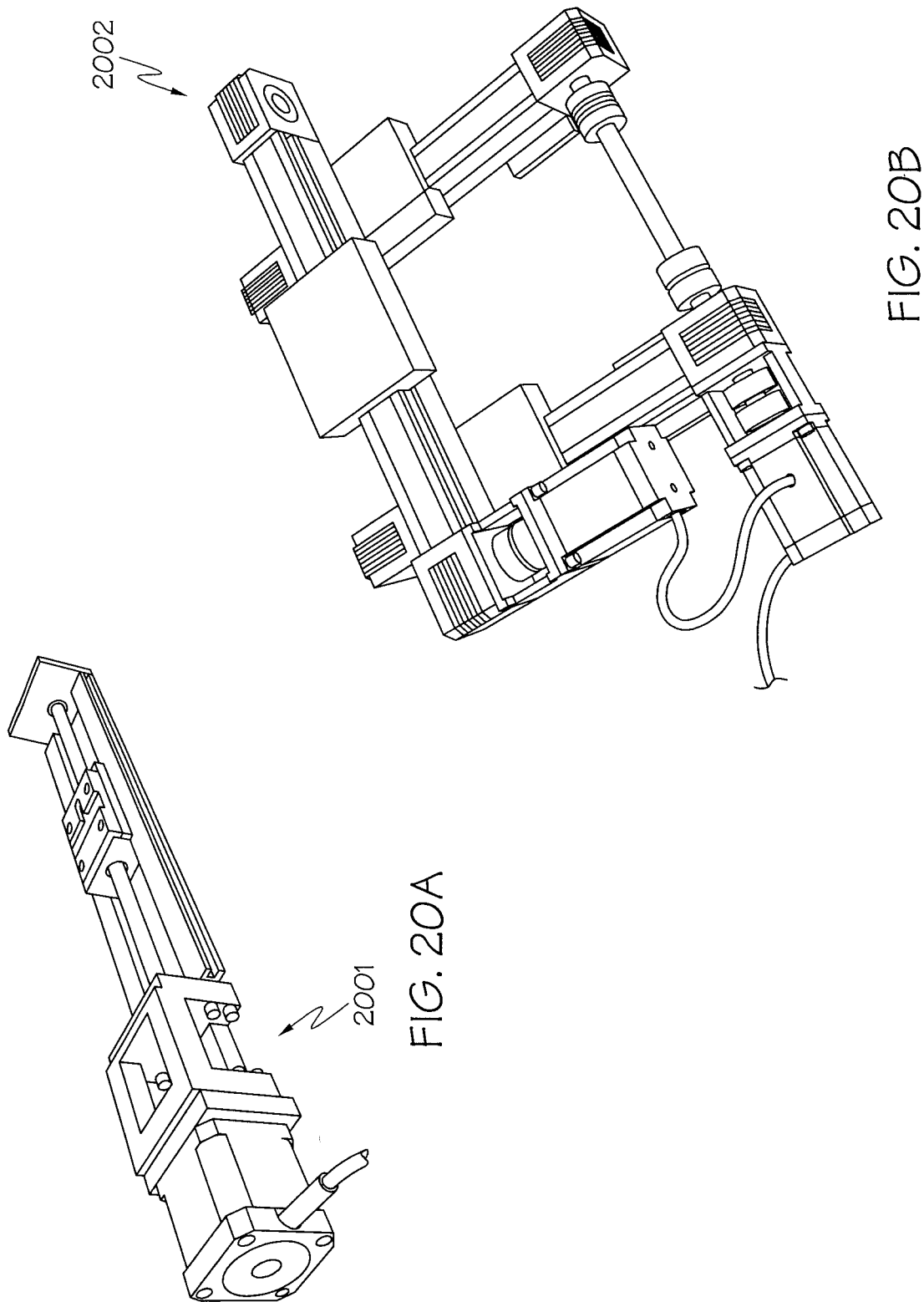
FIGS. 20A and 20B are perspective views of a guided rail system for planar motion and a linear guided rail, respectively, in accordance with some embodiments.

In some embodiments, as illustrated in FIG. 15, beam steering can be accomplished by moving a light source 1501 in the focal plane of a lens 1502. In some embodiment, lens 1502 can be a single lens. In other embodiment, lens 1502 can be system of lenses. Here, the lens 1502 is stationary, and the light source 1501 moves relative to the stationary lens 1502. As shown FIG. 15, when the light source moves in one direction, e.g., to the right, the illumination spot 1503 moves in the opposite direction, e.g., to the left. In some embodiments, as shown in FIG. 16, the movement of the light source at the focal plane is achieved by a pair of motorized rails 1602 oriented to move the light source 1601 in a perpendicular direction relative to each other. In other words, the rails may include a first rail and a second rail perpendicular to the first rail. The motorized linear rails can include one or more motors known to those of ordinary skill in the art. In FIG. 16, the light source 1601 is positioned on at least one of the first rail and the second rail. At least one motor that moves the light source along the at least one of the first rail and the second rail. For example, as shown in FIG. 16A, first and second horizontal rails 1602 are motorized by motor 1604, and first and second vertical rails 1602 are motorized by motor 1606. Another embodiment of two motors operating to move a light source similar to motors 1604, 1606 is illustrated in FIG. 20B. In FIG. 18, the lens is positioned on at least one of the first rail and the second rail. In other embodiments, as shown in FIG. 17, instead of moving the light source relative to a stationary lens, the lens 1702 can move relative to the stationary light source 1701. Here, the illumination spot 1703 moves in the same direction as the lens. In some embodiments, the movement of a lens, for example, lens 1801 shown in FIG. 18, can be accomplished by a pair of motorized guided rails 1802 a, b oriented orthogonally. For example, as shown in FIG. 17A the horizontal rails 1802a are motorized by motor 1704, and the vertical rails 1802b are motorized by motor 1706 for moving the light lens 1702.

In some embodiments, as shown in FIG. 19, the light source 1901 can be moved away from or toward the focus of the lens 1903, which is preferably stationary. For example, the light source 1901 moves in a vertical direction, or up and down, relative to the lens 1903, which extends a direction that is perpendicular relative to the lens. As a result, the illumination spot 1904 changes in size, for example, increased 1904' or decreased 1904" in circumference or area. Its size is the smallest when the light source is at the focus, small dotted circle. When the light source moves away from the focus in a direction 1902, the illumination spot size grows larger, larger dotted circle. In some embodiments, the lens can be moved in the horizontal plane to steer the light beam for a light source at any location along the lens focal length direction.

A lens shown in FIGS. 15-19 can be any type known to those of ordinary skill in the art. In some embodiments, one or more beam steering mechanisms herein can include a Fresnel lens or the like. The Fresnel lens can be fabricated of plastic or related polymer material. It can be formed to be very light and of any size.

The concept of a lens-light source beam steering mechanism in accordance with some embodiments is described at least with reference to FIGS. 15-19. Additional details are illustrated at FIGS. 21-24, where the lens-light source beam steering mechanism comprises a lens, light source module, and a guided rail system, which may be similar to that of an overhead crane or the like.

FIGS. 20A and 20B are images of a guided rail system 2002 for planar motion and a linear guided rail 2001, respectively in accordance with some embodiments. The guided rail includes two rails that extend in directions orthogonal to each other. At each rail is a motor, a rail, a mount for carrying the device, and a belt or a screw to move the mount. The guided rail system 2002 and/or linear guided rail 2001 can be implemented in beam steering mechanisms described in one or more embodiments, for example, described herein.

Figure 21:
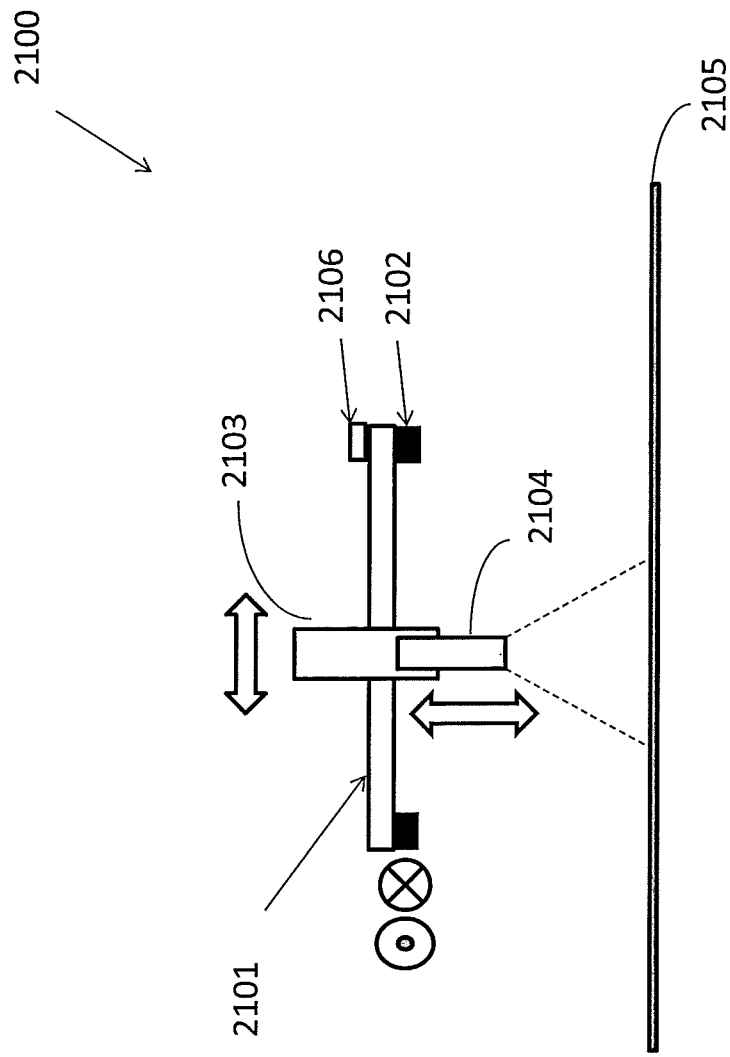
FIG. 21 is a side view of a beam steering mechanism moving a light source, in accordance with some embodiments.

FIG. 21 is a side view of a beam steering mechanism 2100 which moves a light source module 2104, in accordance with some embodiments. The beam steering mechanism 2100 includes a guided rail system 2100 comprising a vertical rail 2103, an inner rail 2101, and one or two outer rails 2102. The light source module 2104 is mounted on the vertical rail 2103. The vertical guided rail 2103 can move the light source module 2104 to adjust the size of the illumination spot. The vertical rail 2103 and the light source 2104 can be mounted on the inner rail 2101 of the guided rail mechanism, and move together along the inner rail 2101. In some embodiments, the inner rail 2101 is mounted on two outer rails 2102. The light source module 2104, the vertical rail 2103, and the inner rail 2101 can be moved along the two outer rails 2102. Here, the inner rail 2101 is perpendicular to the outer rails 2102. Both inner and outer rails are parallel to the lens 2105. Beam steering is achieved by moving the light source 2104 module along the inner 2101 and outer rails 2102 in some embodiments. The two orthogonal motions (shown by vertical and horizontal arrows) allow the illumination spot to be steered to any location. More specifically, the arrows indicate the motions of the rails. In some embodiment, a direction indicator such as a compass 2106 can be attached to one of the horizontal rails 2101. This enables the user to determine the absolute directions of beam steering when multiple steerable lights are installed oriented in various directions.

Figure 22:
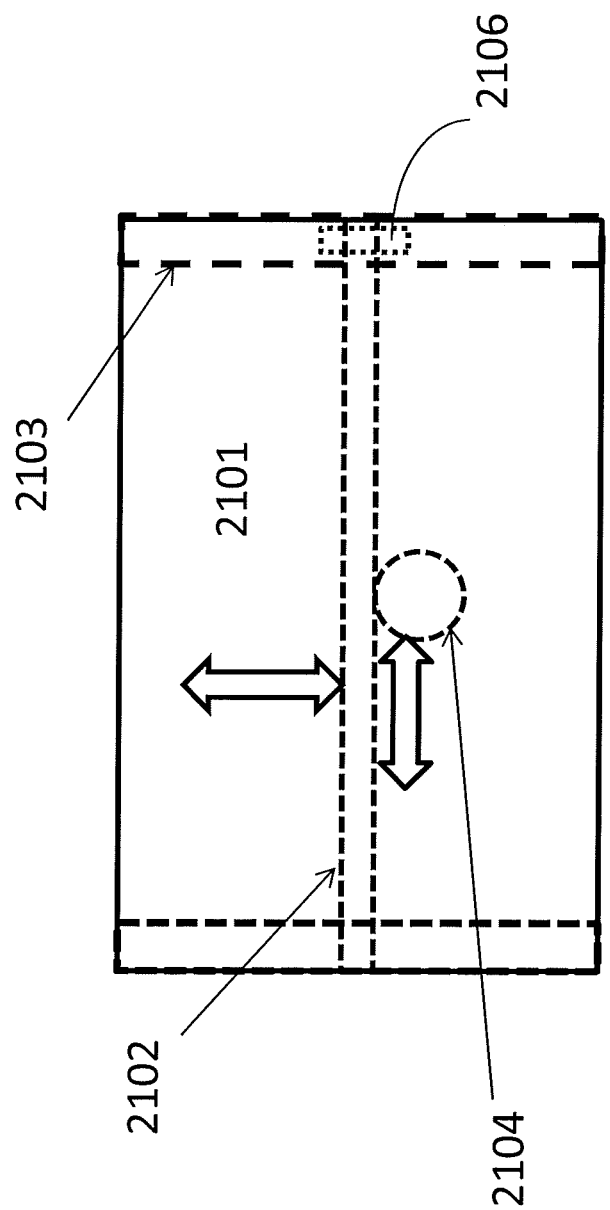
FIG. 22 is a top view of the lens moving beam steering mechanism of FIG. 21.

FIG. 22 shows a top view of the light source moving beam steering mechanism 2100 of FIG. 21. The lens 2101, projection of the both inner 2102 and outer 2103 rails, and projection of the light source module 2104 in motion onto the lens are shown.

Figure 23:
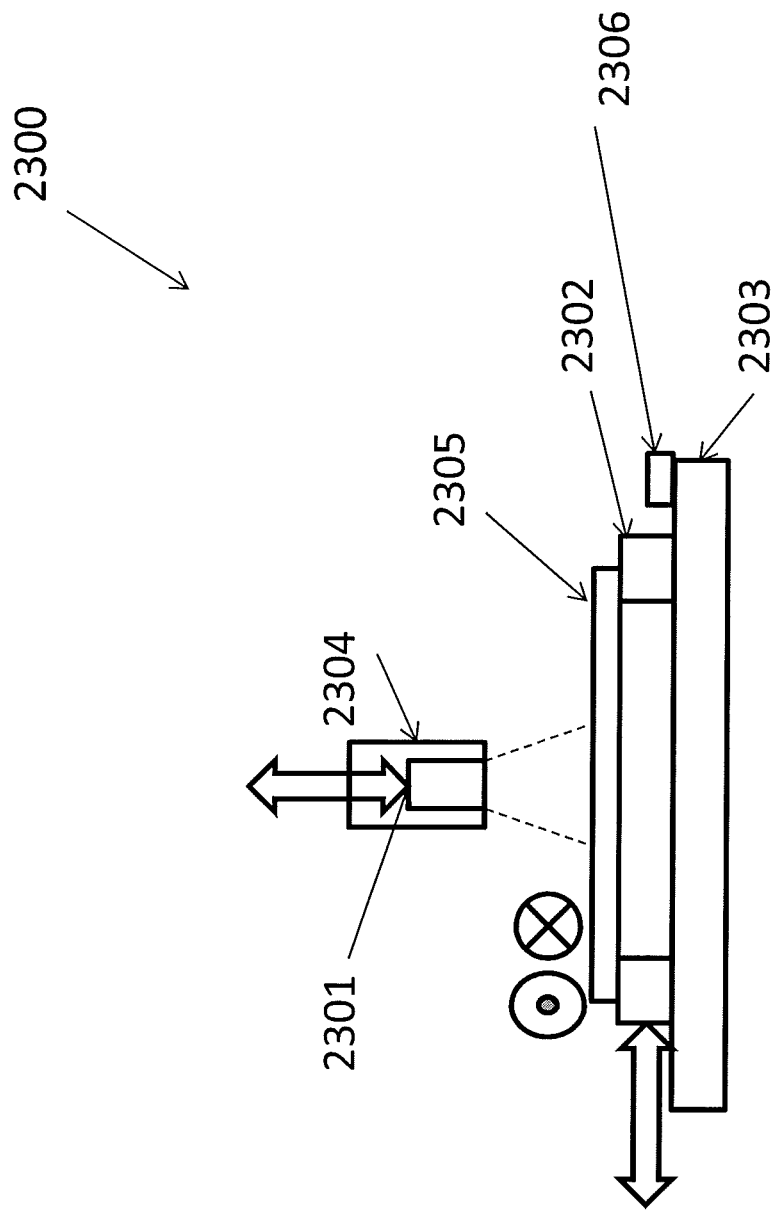
FIG. 23 is a side view of a beam steering mechanism moving a lens, in accordance with some embodiments.
Figure 24:
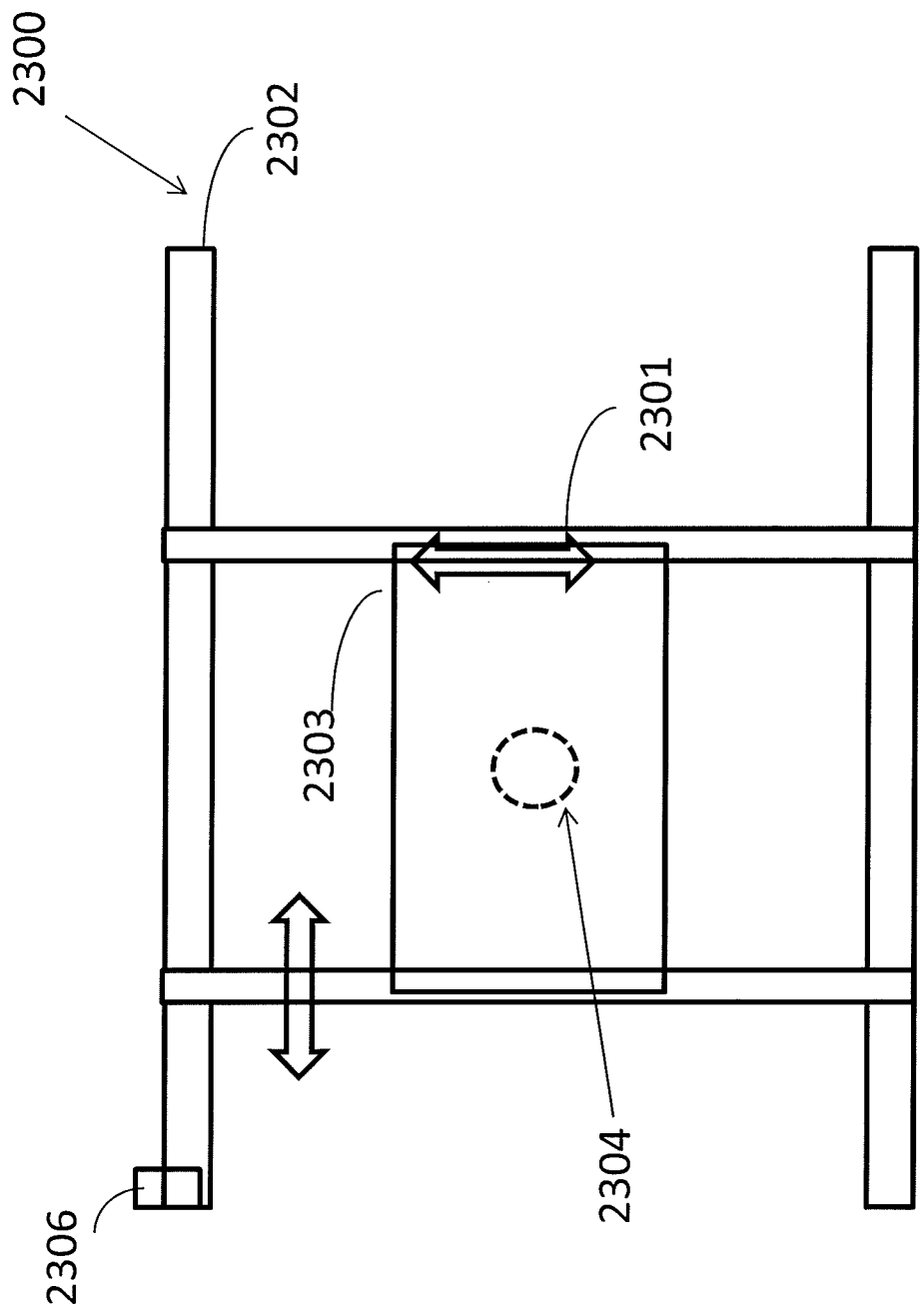
FIG. 24 is a top view of the lens moving beam steering mechanism of FIG. 23.

FIG. 23 is a side view of a lens moving beams steering mechanism 2300, in accordance with some embodiments. FIG. 24 is a top view of the lens moving beam steering mechanism 2300 of FIG. 23. In embodiments that include the movement of a lens 2305 for beam steering, as shown in FIG. 23, the guided system comprises of a vertical rail 2304 for adjusting illumination spot size, two inner rails 2302, and two outer rails 2303 in some embodiments. The light source module 2301 is mounted to the vertical rail 2304, and can move up and down in a first direction, for example, vertically, but is otherwise stationary with respect to other directions, for example, no horizontal movement. The vertical rail 2304 is mounted to a fixed mounting fixture. The lens 2305 can mounted on the two inner rails 2302 which can move the lens 2305 along the two inner rails 2302. The inner rails 2302 extend in a second direction relative to the first direction, i.e., in and out of the page at FIG. 23. The inner rails 2302 and the lens 2305 are mounted on two outer rails 2303 which can also move the lens 2305 and the inner rails 2302 along the two outer rails 2303 in the third direction, e.g., horizontal direction shown in FIG. 23. The lens 2305 and both inner 2302 and outer rails 2303 are perpendicular to the optical axis of the light source 2301. The inner rails 2302 and/or outer rails 2303 can include a motor. In some embodiment, the rails can be moved manually. In other embodiments, motorized mechanisms are not needed. Beam steering is done manually. By moving the lens 2305 along the inner 2302 and outer rails 2303, beam steering of the illumination spot is obtained in some embodiments. The lens, both inner and outer rails, and the projection of the light source onto the lens are shown in FIG. 24. As was done in FIG. 21 and FIG. 22, a compass 2306 or related indicator can be attached to one of the horizontal rails enabling users to obtain absolute beam steering direction.

In some embodiments, the lens used for beam steering can be a Fresnel lens or the like, but not limited thereto. Accordingly, in other embodiments, any other lens can be used for beam steering. In some embodiment, lens beam steering mechanism of FIGS. 23 and 24 can be placed directly below a downlight. This allows a user to beam steer his/her downlight. Since downlights are used in many indoor places, this application will benefit many users.

Figure 25:
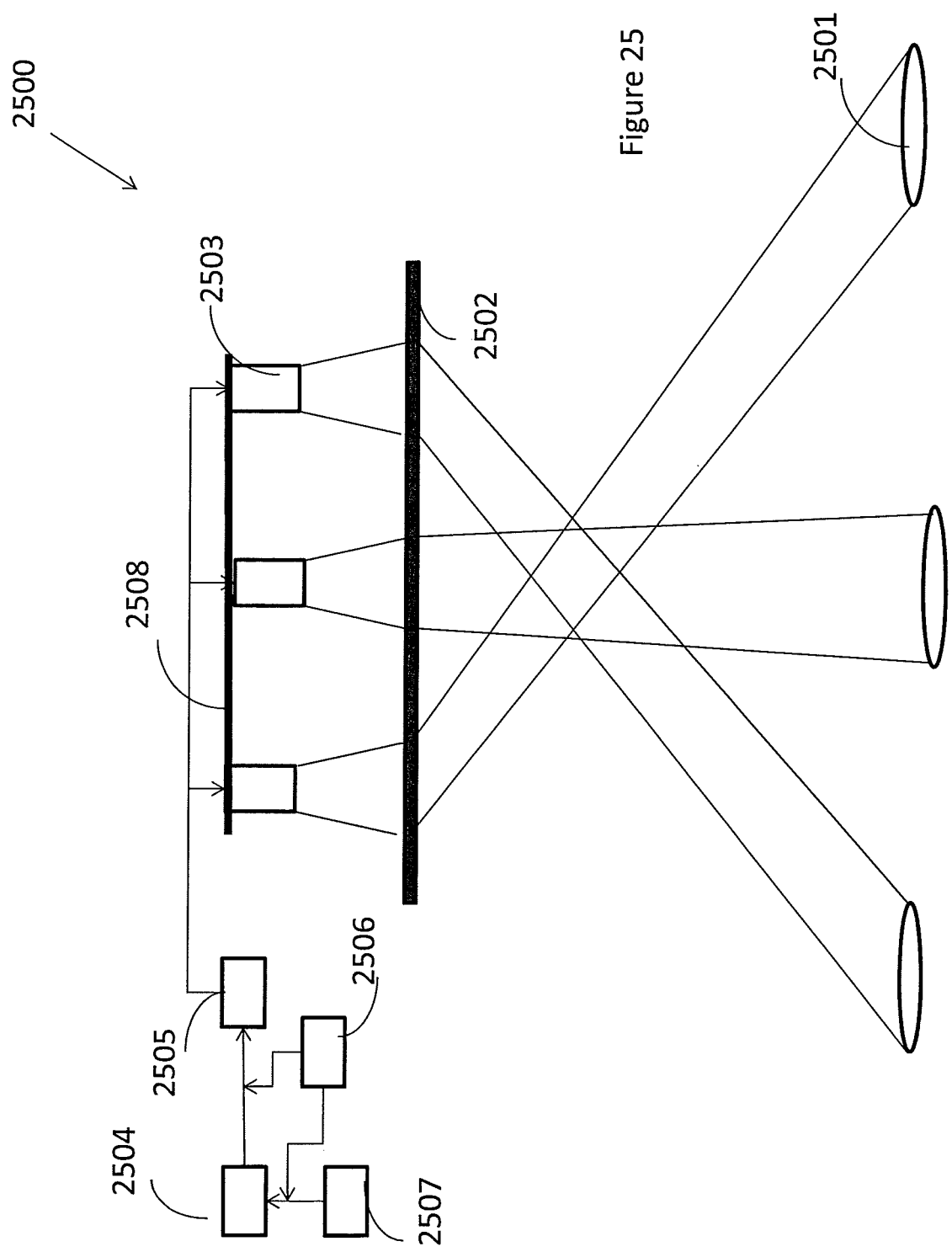
FIGS. 25-27 are views of multi-spot light generation systems, in accordance with some embodiments.

In the beam steering mechanisms described above, the guided rail system is constructed and arranged to move either a lens, e.g., Fresnel lens, or the light source a large distance in order to cover an entire desirable range for the illumination spot resulting from the light beam generated by the light source. In some embodiment, multiple light sources can be mounted above the lens staring at different regions of the lens. As shown in FIG. 25, a beam steering mechanism 2500 may include an array of light sources 2503 mounted on a plate 2508 above a lens 2502. The light source distribution allows for the illumination of different regions 2501 at the target surface, or from different positions of the focal plane with no need for movement. By activating the light sources 2503 sequentially, or one at a time, one region can be illuminated in the target surface at a time in some embodiment. Switching from one light to another allows the user to select a region of interest to illuminate in the target area. In essence, this is beam steering not continuously but discretely. As illustrated in FIG. 25, the light sources are connected to a switch whose circuit switches on one light at a time. The switch 2505 is connected to a light source driver 2504 which can vary the input current to the respective light source. Both are connected to a controller 2506 which allows the user to select which light to turn on. The driver 2504 is also connected to a power source 2507.

Figure 26:
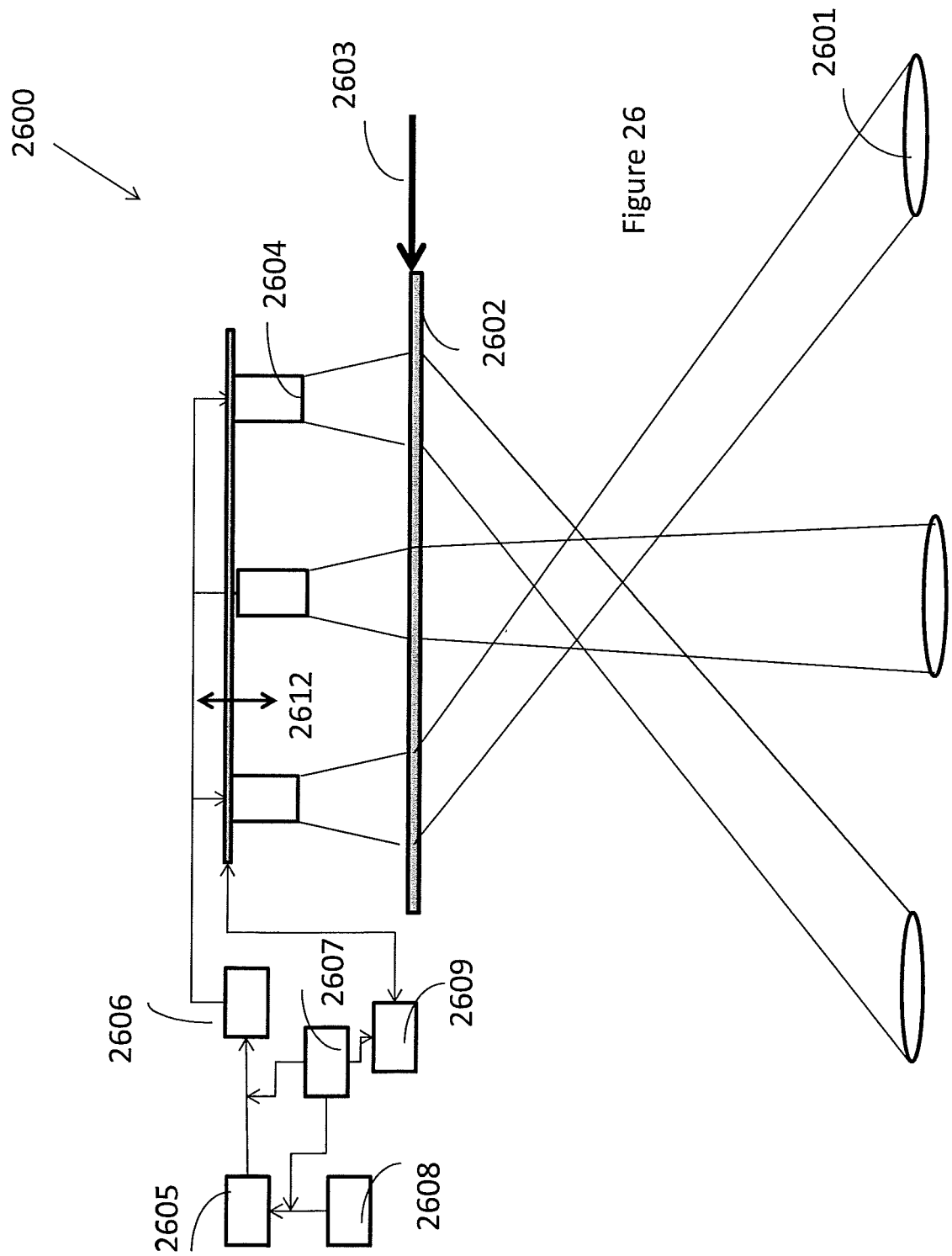

FIG. 26 includes a beam steering mechanism 2600 that includes a mechanism 2603 for providing lateral motion to the lens 2602. By adding a lateral motion mechanism 2603 to the lens 2602 as illustrated in FIG. 26, one can steer the selected light 2604 continuously in its vicinity in some embodiment. This allows beam steering of all light sources 2604 to cover the whole target area. Because the beam steering required is only in the vicinity of the selected light source 2604, the range of the lens motion is small. This will allow the size reduction of the lighting system. By adding a vertical motion mechanism 2612, one can adjust the size of the illumination spot 2601 in some embodiment. The lateral and vertical motion mechanisms 2603, 2612 can comprise guided rails, for example, illustrated in FIGS. 21-24 in some embodiments. The controlling circuitry is similar to that of FIG. 25 except that a motion control 2609 may be also provided.

Figure 27:
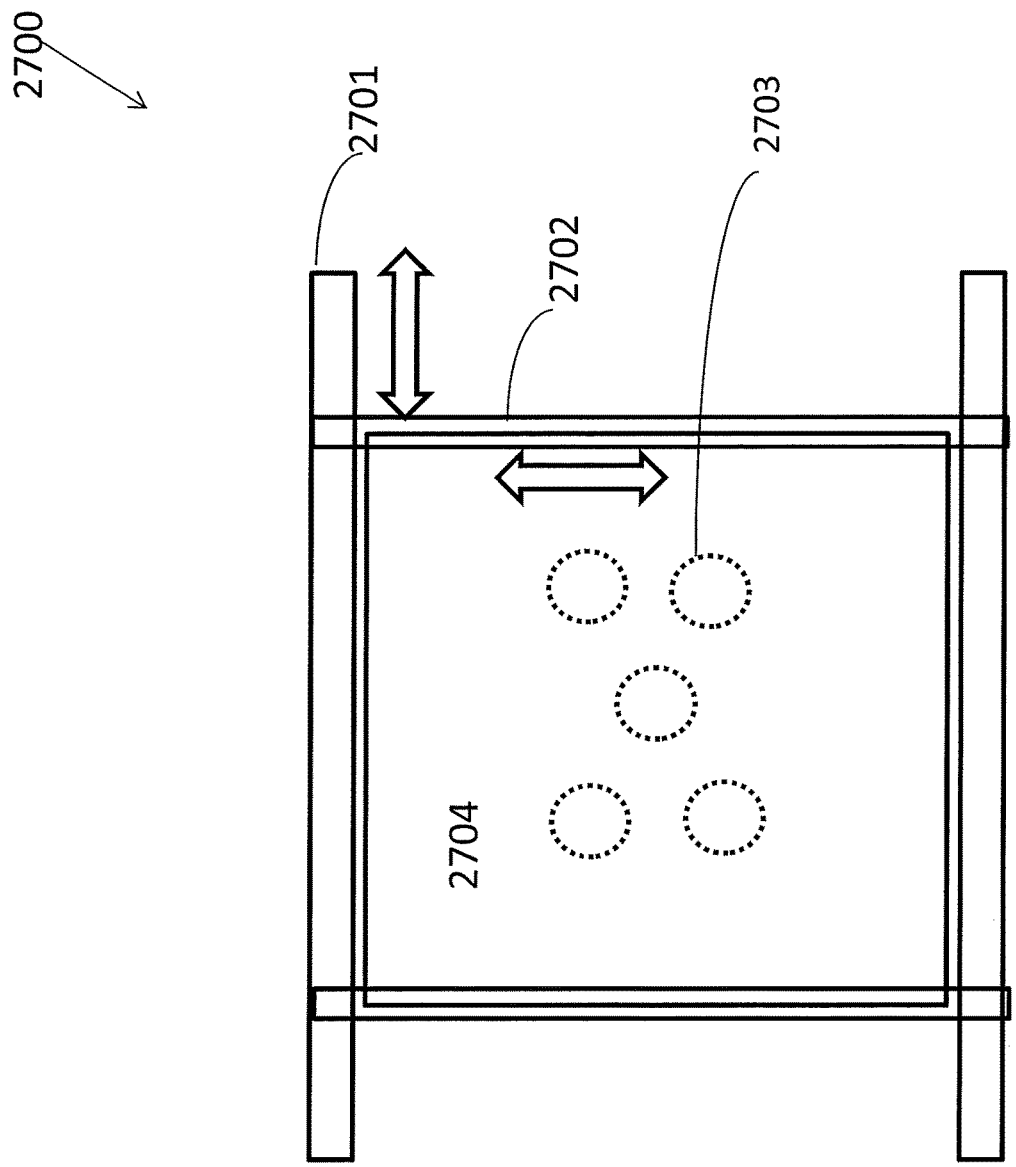

FIG. 27 is the top view of this multi-source steerable light system 2700. The lens 2704, guided rails 2702 and 2701, and the projection of the light sources 2703 onto the lens are illustrated. One or more of these elements can be the same as or similar to comparable elements in other embodiments, for example, described herein.

In FIG. 28, a system 2800 includes a steerable light source module 2801 with a beam steering mechanism 2801B can be controlled by a contact controller 2802, in some embodiments. The contact controller 2802 can be a touchpad type of device or the like, which can sense the position of a contact object such as the user's finger, in some embodiments. Other touchpad controllers can be used in other embodiments. The controller has three separate control components: the beam steering controller 2802A for controlling the beam steering of the light, the dimmer 2802C for controlling the light level, and the beam size controller 2802B for adjusting the size of the beam. The beam steering controller 2802A includes a touchpad device or like that senses the position of one or more touch objects. The touch object can be the user's finger 2806. The dimmer 2802C can be a touchpad using one dimension positions to adjust the light level. It can be also any other dimmer. The beam size controller 2802B can be a touchpad using one dimension positions for beam size adjustment. Calibration between touchpad positions of the beam steering controller 2802A and the beam steering positions of the guided rails can be made prior to the product's release in some embodiment. The calibration coefficients can be obtained by measuring motion ranges of the beam steering controller and the guided rails. The calibration coefficients are the two scaling factors of the two apparatus. The calibration coefficients can be stored in the processor. The position of the finger on the touchpad can be translated into the direction of the steered beam by applying the calibration coefficients to the finger position in the processor 2804. An amount of beam steering needed can be calculated and sent to the beam steering mechanism 2801B. By moving the finger 2806 to different positions on the touchpad 2802, the beam steering mechanism 2801B, can steer the illumination spot 2807 to various positions, or regions. The beam size controller 2802B can be part of a touchpad or other electronic device. Because the beam size is adjusted by changing the distance of the light source 2801C from the lens 2801A, only one dimension motion is sensed by the touchpad. The dimmer 2802C can be either a touchpad type or any other type known to those of ordinary skill in the art.

Figure 29:
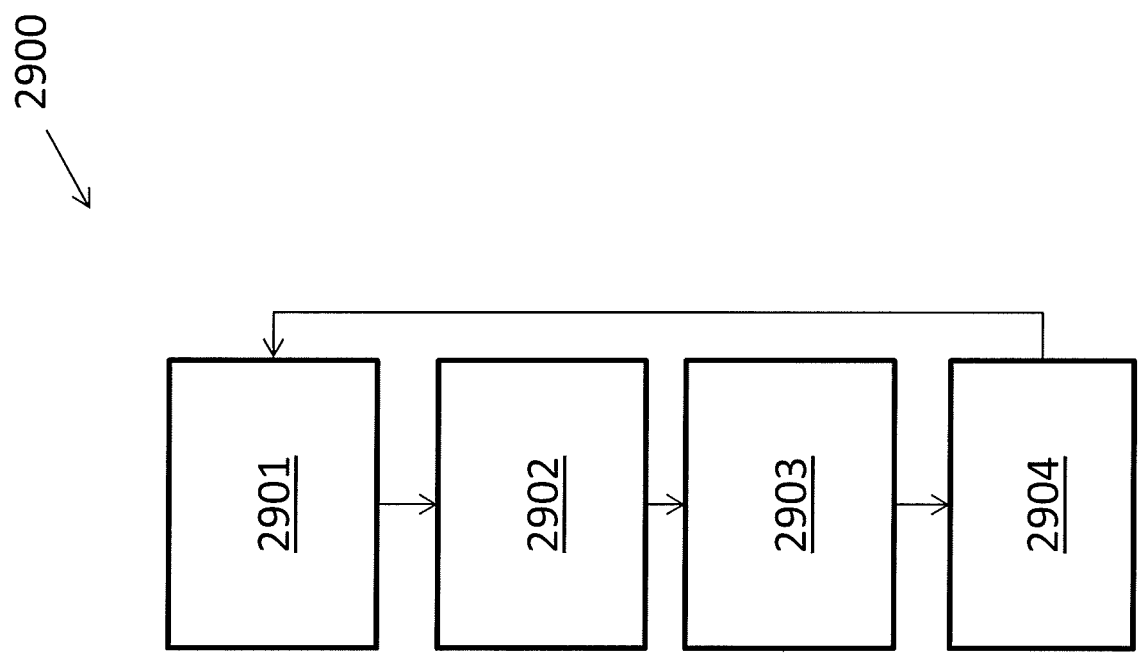
FIG. 29 is a flow diagram of a method for controlling beam steering, in accordance with some embodiments.

FIG. 29 is a flow diagram illustrating a method 2900 for controlling beam steering, in accordance with some embodiments. In describing FIG. 29, reference may be made to elements of the system 2800 of FIG. 28 and rail system described herein. At block 2901, a new finger position from a touchpad is fed into a processor where calibration coefficients, shown in block 2902, are used to obtain a position, shown in block 2903, of a guided rail system. The position 2903 is preferably an xy position (e.g., a point of intersection between an x-axis and a y-axis). Using the new xy position (block 2903) and a previous xy position, the method 2900 can proceed to block 2904, where the direction and amount beam steering can be calculated.

Referring again to FIG. 28, the communication between the touchpad controller 2802 and the beam steering mechanism 2801B can be via a wireless network 2803 in some embodiments. In other embodiments, the communication can be achieved by an Ethernet network, or other wired network where a finger 2806, stylus, or other object generates a signal by touching touchpad screen which is detected by a sensor and transmitted to a beam steering mechanism 2801B for controlling a movement of a light beam generated by a light source 2801C. In some embodiments, the touchpad controller 2802 can include a combination of a beam steering controller 2802A, a beam size controller 2802B, and a dimmer 2802C. A separate touchpad panel can be used as a dimmer for adjusting the light level. A finger position can be interpreted as the light level in this panel. By moving the finger along the panel, the light level can be adjusted. In some embodiments, mobile devices such as a smart phone, electronic notebooks, e.g., Apple iPAD™ devices, and so on can be used to control the beam steering and beam size adjustment. Relevant applications can be written and installed in these devices that perform one or more steps of a process in accordance with some embodiments.

As mentioned previously, beam steering using counter rotating wedge prisms or gimbal is expensive and bulky. To make the steerable light with hand gesture control practical, for example, described in PCT Publication WO2013_169635 and U.S. patent application Ser. No. 14/048,505 incorporated by reference above, the beam steering mechanism may be replaced by a lens light source beam steering mechanism in accordance with one or more embodiments herein. The added benefit is that an illumination beam size can be adjusted. Also, in some embodiments, a control spot for the smart light can be external from the illumination spot, rather than inside the illumination spot.

Figure 30:
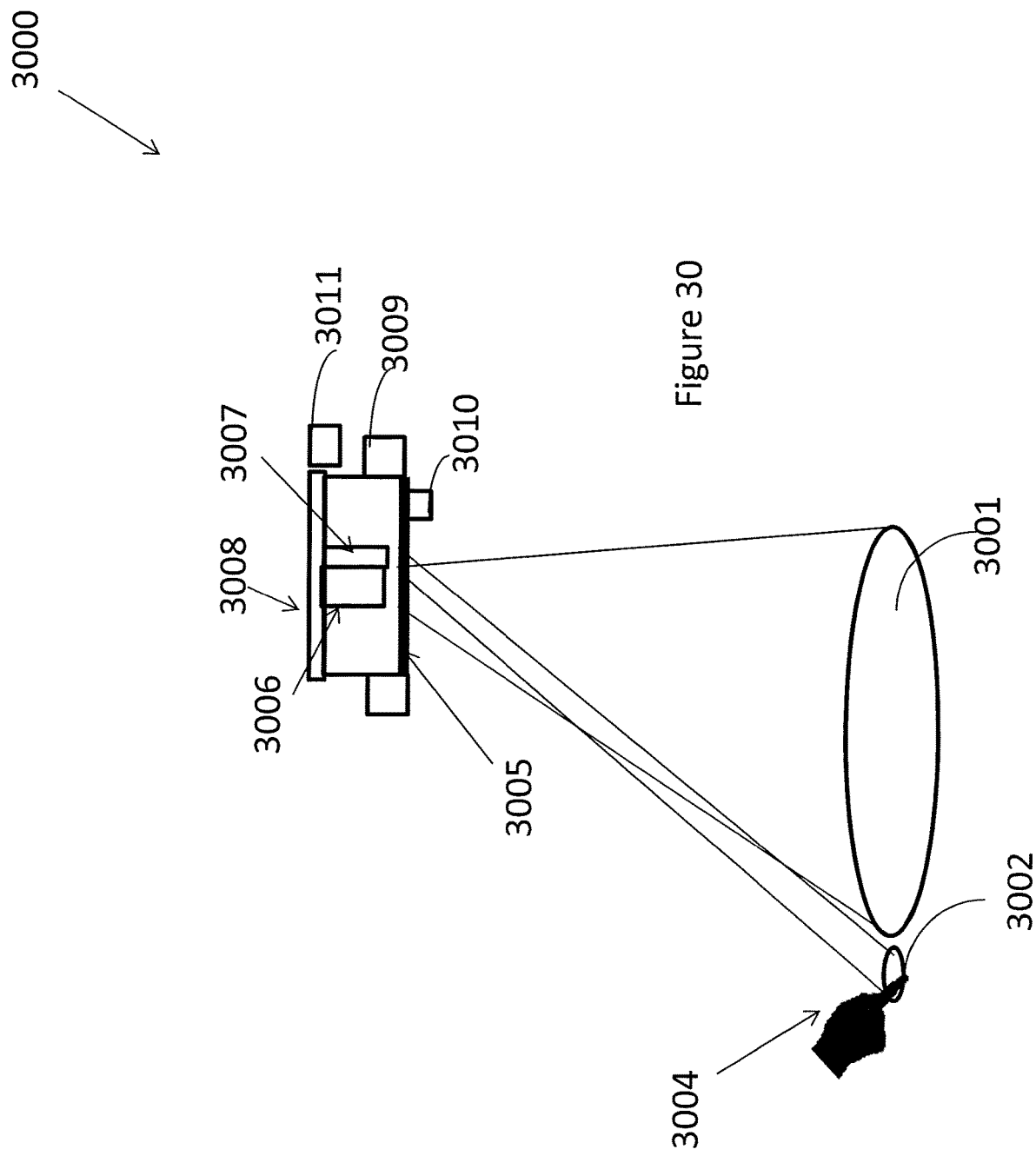
FIG. 30 is a diagram of a light-emitting device control system, in accordance with some embodiments.

FIG. 30 is a diagram of a light-emitting device control system 3000, in accordance with some embodiments. In particular, FIG. 30 illustrates the concept of a steerable light with hand gesture control, where a control spot 3002 is generated to be illuminated on a different surface or different region of a same surface than an illumination spot 3001. In some embodiments, the size, shape, or other characteristic of the illumination spot can be adjusted by the movement of a vertical guided rail on which the light source module is mounted, for example, described in other embodiments herein. Here, a steerable light projects an illumination light spot 3001 and a control color spot 3002 adjacent to it. A hand gesture 3004 can be placed in the control spot which can be sensed by a thermal sensor 3010 and a camera 3009 simultaneously, for example, similar to other embodiments herein. Upon detecting a hand thermal signature, the processor 3011 evaluates the hand gesture image to determine its gesture. A command is generated as a result. If the hand gesture 3004 is provided for dimming the light, the dimming command is sent to the driver. Some elements of the system can be similar or the same as those in other embodiments, for example, the LED lamp illustration in U.S. patent application Ser. No. 14/048,505 incorporated by reference herein. If the command is for moving the light beam, then the beam steering command is sent to a beam steering mechanism 3008, for example, described herein. The illumination spot 3001 is commanded to follow the hand motion 3004, allowing the user to steer the illumination spot 3001 to wherever he/she wishes. If the hand gesture is made for changing the illumination spot size, then the gesture data is converted to a beam size command by the processor 3011 in FIG. 30 or 3107 in FIG. 31, which in turn is sent to the beam steering mechanism.

Figure 31:
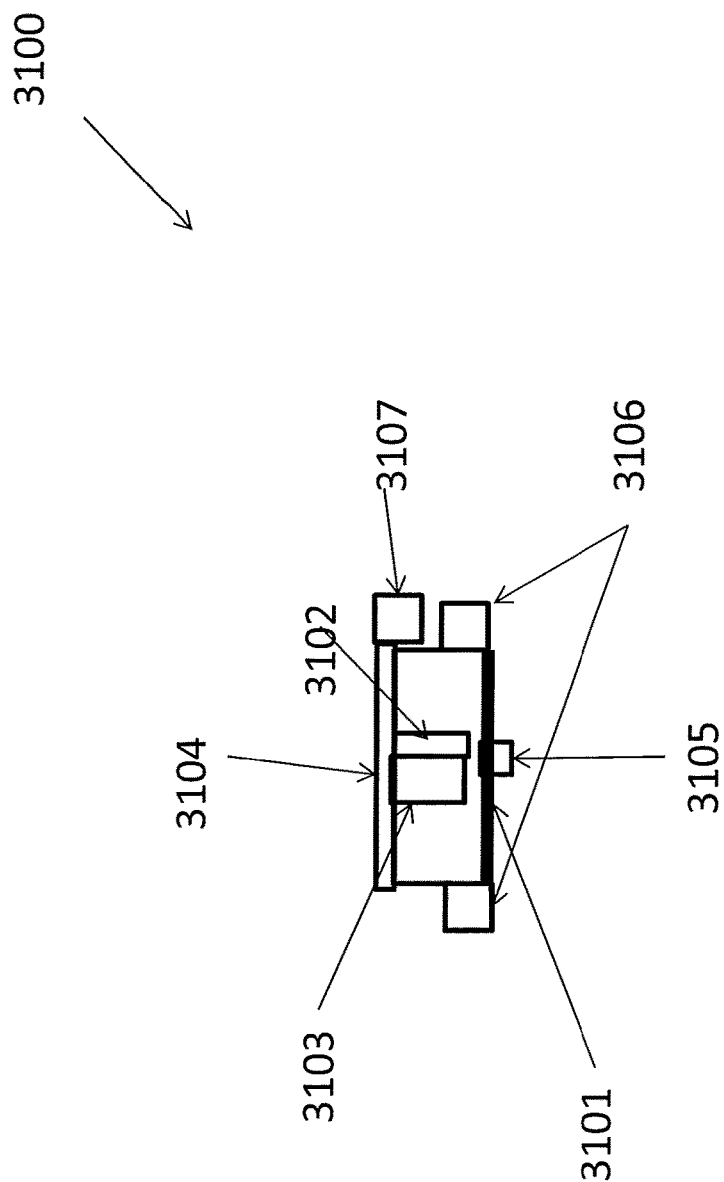
FIG. 31 is a side view of a light-emitting device control system, in accordance with some embodiments.

To form the control spot 3002 outside the illumination spot 3001, a control spot generator light 3102 is adjacent to an illumination light generator 3103 in some embodiments, for example, illustrated in the system 3100 shown in FIG. 31. Both light generators 3102, 3103 are mounted on the vertical guided rail for beam size adjustment, for example, illustrated at FIG. 21. In some embodiments, a light source module of the type similar to that illustrated at least in FIG. 34A can be used as the control spot generator 3102. The control spot 3002 contains both color light and NIR light enabling multispectral imaging of hand gestures. NIR light source 3402A is reflected by the hot mirror to illuminate the hand gesture. Color light source 3404A is transmitted through the hot mirror 3403A to illuminate the hand gesture. A lens 3101 can be placed in front of both lights. A camera system 3106 and a thermal sensor 3105 can be placed outside the light source module. To track the hand motion, the thermal sensor 3105 field of view (FOV) needs to move to track the hand gesture. A beam steering mechanism using an IR Fresnel lens or the like can steer the FOV of the thermal sensor in some embodiments. In other embodiments, a beam steering mechanism of the thermal sensor 3105 can be similar as those illustrated in FIG. 23 and FIG. 24, respectively, without a vertical rail in some embodiments. In some embodiments, the camera FOV is large enough so that it does not require independent beam steering elements.

Figure 34:
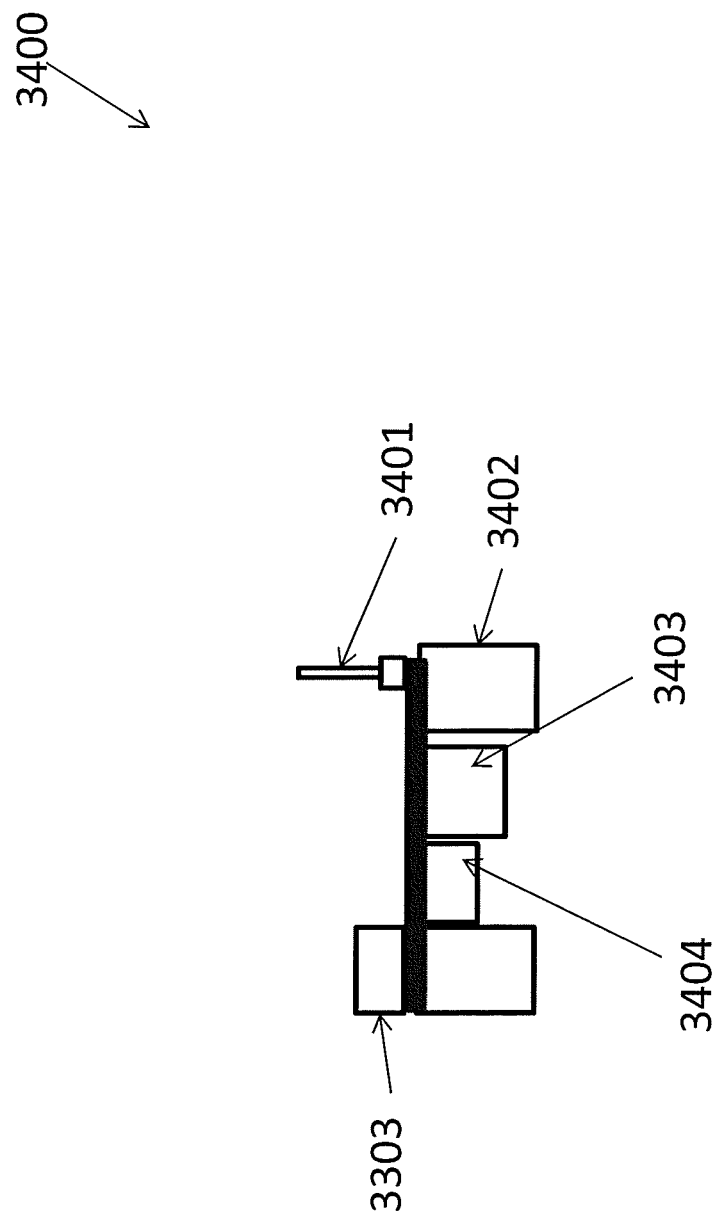
FIGS. 34, 34A, and 34B are views of a hand gesture controller, in accordance with some embodiments.
Figure 34A:
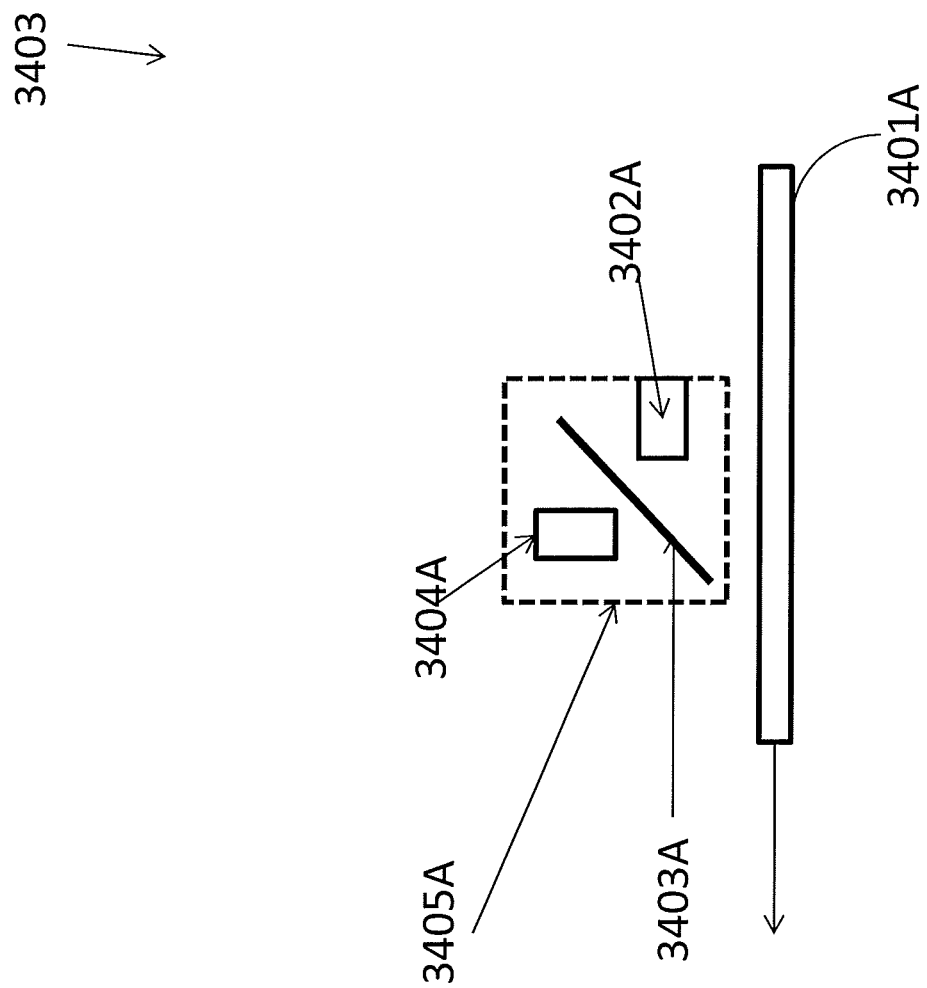
Figure 34B:
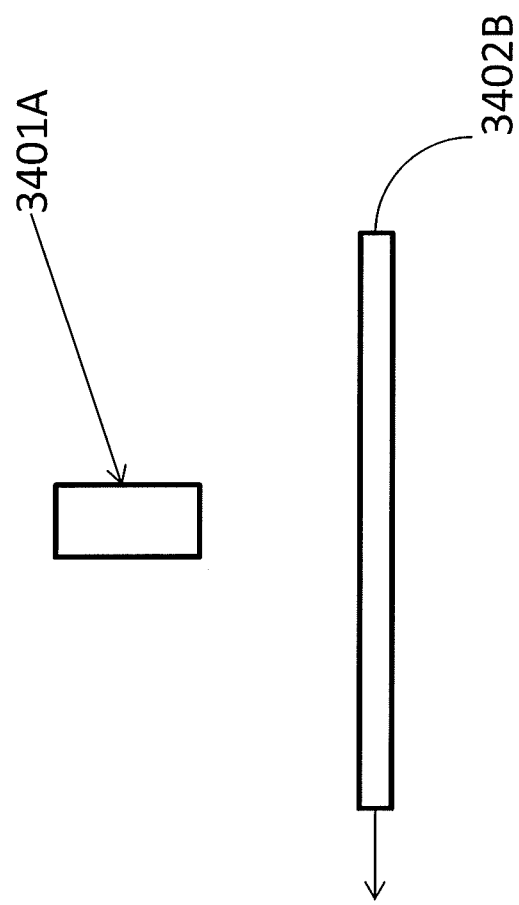
Figure 34C:
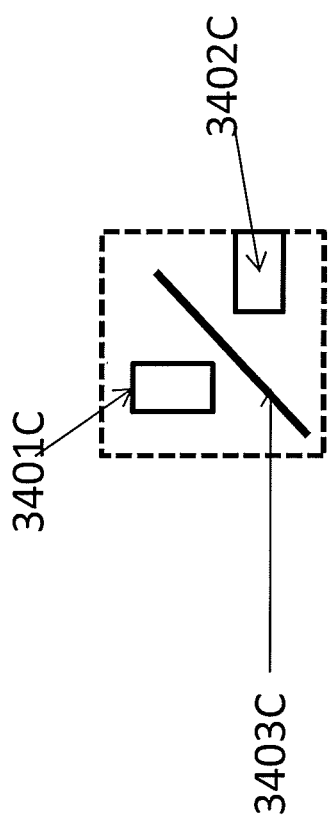
FIG. 34C is a view of a multispectral camera module, in accordance with some embodiments.

In some embodiments, referring to FIG. 34C, a camera module 4302 in FIG. 34C can be used as a multispectral camera 3106 in FIG. 31. The camera module 4302 comprises a hot mirror 4403C that transmits visible light to a visible camera 4301C while it reflects NIR light to an NIR camera 3402C. Visible and NIR of hand gestures can be obtained simultaneously. Additionally, color spot of the control spot shows up only in the visible camera. In some embodiment, a multi-hole pattern can be inserted in front of a light source 3404A to create multiple miniature spots. In some embodiment, a red, green, and blue color light pattern can be inserted in front of a light source 3404A to create RGB multiple miniature spots. This assists the visible camera 3402C to identify the color control spot 3002. Because the color light source does not have any spectral components in the NIR, the NIR image does not have the miniature spots. Therefore, visible camera can be used to locate control spot while NIR camera can be used to obtain hand gesture images.

Figure 32:
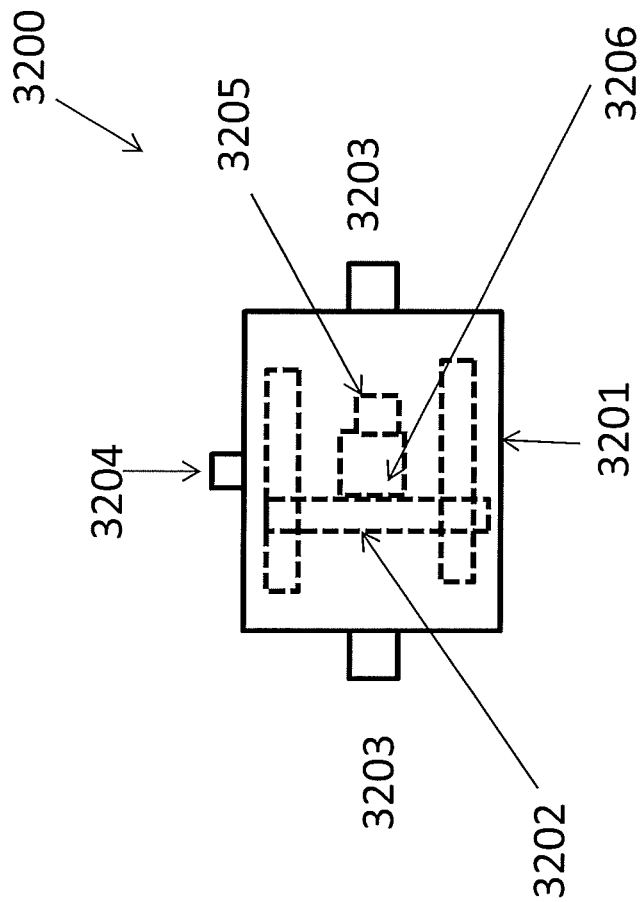
FIG. 32 is a top view of a hand gesture steerable light system, in accordance with some embodiments.

A top view of the hand gesture steerable light system 3200 is shown in FIG. 32. The cameras 3203, the thermal sensor 3204, a projection of other components such as the illumination light sources 3205 and the control spot light source 3206 and the guided 3202 rails onto a lens 3201 plane is illustrated. Thus, the new steerable light not only has more efficient and inexpensive beam steering mechanism, but also the ability to change the size of the illumination spot. In addition, the control spot is outside the illumination spot, which allows the user to easily distinguish the control spot from the illumination spot. A control spot light (not shown) can be formed to be adjacent an illumination light behind the lens 3201, for example, a Fresnel lens.

Figure 33:
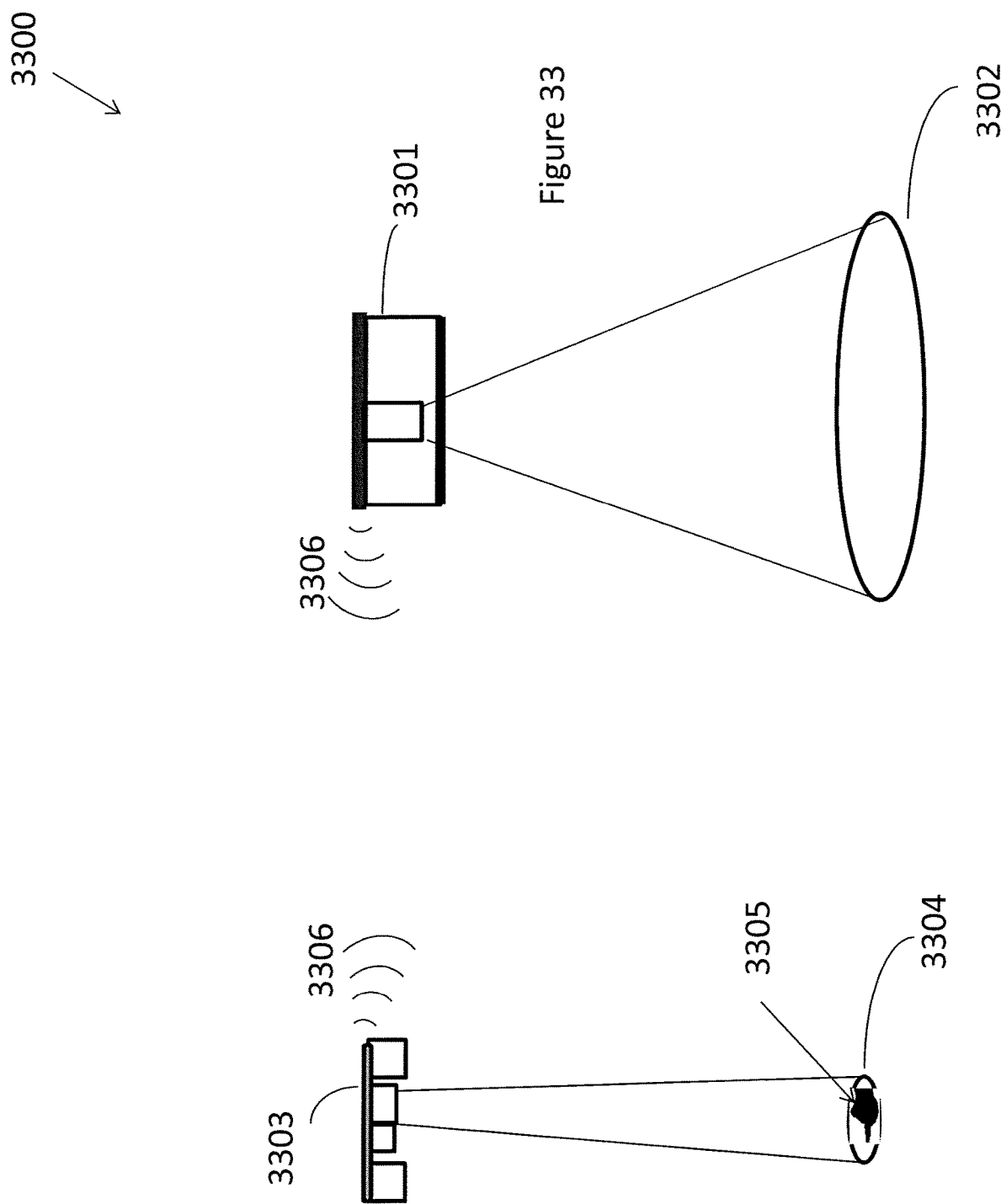
FIG. 33 is a view of a hand gesture steerable light system, in accordance with other embodiments.

FIG. 33 illustrates a system 3300 for another steerable light, which may be the similar to the smart light described in US patent U.S. patent application Ser. No. 14/048,505 incorporated by reference herein, except the beam steering mechanism in FIG. 33 uses a lens beam steering mechanism of embodiments described with reference to FIGS. 21-24. In addition, in FIG. 33, the beam size of the illumination spot can be adjusted. Thus, the new steerable light not only has more efficient and inexpensive beam steering mechanism, but also the ability to change the size of the illumination spot. Here, a hand gesture 3305 can be placed at a control spot 3304 to steer an illumination spot 3302. The communication between the hand gesture controller 3303 and the steerable light 3301 can be via network communication signals 3306, for example, a wireless network, the Internet, or other communication network. In other embodiments, contact controllers can be used, for example, described herein.

FIG. 34 illustrates a hand gesture controller 3400, in accordance with some embodiments. The hand gesture controller 3400 can comprise a control spot generator 3403, a thermal sensor 3404, one or multiple cameras module 3402, a processor 3403, and a wireless transceiver 3401. The control spot generator 3403 projects an illuminate the control spot so that the user knows where the control spot is. The control spot generator also provides illumination light for the cameras 3402. The thermal sensor 3404 detects the presence of a human hand. The cameras 3402 capture hand gestures and send them to the processor 3403 where hand gestures are converted into commands.

FIG. 34A illustrates the control spot generator 3403 of FIG. 34. In some embodiments, the control spot generator 3403 can comprise of a near infrared (NIR) illumination source 3402A for imaging light of the cameras, a color light source 3404A for highlighting the control area, a hot mirror 3403A, a steerable lens 3401A. The hot mirror 3403A transmits the color light while reflecting the NIR light. It is placed at 45° between the NIR light source 3402A and the color light source 3404A. This ensures the overlapping of the FOVs of the NIR light and the color light. The steerable lens 3401A allows the control spot light to be steered or directed according to the user.

FIG. 34B is a thermal sensor with a steerable IR lens. The thermal sensor of FIG. 34B can be similar to thermal sensor 3404 of FIG. 34. In some embodiments, a steerable IR lens 3402B can be used to steer the FOV of the thermal detector's or detectors' 3401A across the FOV of the thermal sensor. The thermal sensor FOV is larger than the detector FOV. The steering of the thermal sensor allows the sensor to track the hand of the user.

Referring again to FIG. 34C, as previously described, the camera module 3402 can comprise a color camera 3401C, a NIR camera or thermal sensor 3402C, and a beam splitter or hot mirror 3403C. This configuration allows multispectral (red, green, blue, and NIR) imaging of the hand gestures. It can track both the control spot color light in the visible and hand gestures in the NIR. Because the control spot light is LED color light, it has no spectral component in the NIR. A multi-hole pattern can be inserted in front of the color light source 3404A in FIG. 34A to generate multiple miniature color spots. The visible camera will be able to identify these spots within the color control spot while the NIR camera will not see the color spot. In some embodiments, the camera module 3402 can comprise a NIR camera 3402C, a thermal sensor 3401C, and a beam splitter 3403C. The beam splitter transmits thermal radiation to the thermal sensor 3401C while reflect NIR light into NIR camera 3402C. This configuration allows the NIR imaging of hand gestures and thermal detection of the hand. In some embodiment, the hot mirror or beam splitter 3403C transmits visible light and reflects thermal radiation. This configuration allows color imaging of hand gestures and thermal detection of the hand.

Figure 35:
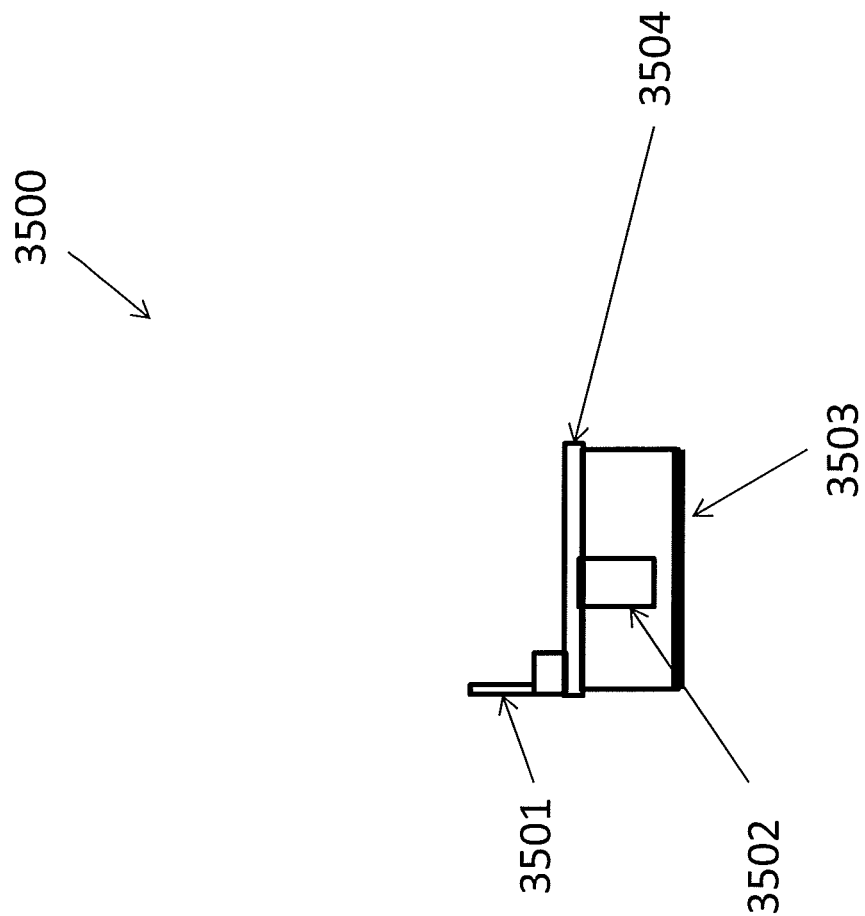
FIG. 35 is a view of a steerable light system, in accordance with some embodiments.

FIG. 35 is a view of a steerable light system 3500. The steerable light system 3500 comprises a lens 3503, a wireless transceiver 3501, and a light source 3502 mounted on a guided rail system, for example, similar to that described in FIGS. 21-24. The light source 3502 is mounted on the vertical guided rail of the guided rail system 3504. By moving the light source toward or away from the focus of the lens, the beam size of the illumination spot can be adjusted. By moving the light source 3502 laterally, the illumination beam can be steered.

Referring again to PCT Publication No. WO2013169635 incorporated by reference above, illumination light can be used as a signal carrier for optical wireless Infrared (IR) light or the like can be used as the data carrier for optical wireless communications and visible light used for illumination. In both instances, the illumination light source and the transmitter light source are mounted on a beam steering mechanism using either gimbals or counter rotation wedge prisms. This allows the user to steer light for both illumination and light fidelity (Li-Fi) communications at a desired location. As mentioned previously, wedge prisms have limited apertures. A large aperture will increase weight and size as well as the price of the system. Gimbals need to be rotationally symmetric. When rotational non-symmetric load such as light source and transmitter are placed on the gimbal, the gimbal moment of inertia must be much larger than that contributed by the load in order to have stable rotation, resulting in a heavy, bulky, and pricy system.

In some embodiments, a Fresnel lens beam steering mechanism can be used to replace gimbals or counter rotation wedge prisms for steering the illumination light and for exchanging data by serving as a communication light as illustrated in FIGS. 36, 36A, 36B, and 36C. Because the lens can be Fresnel lens made of plastic, and the guided rails can be easily fabricated and inexpensive, this type of beam steering mechanism for both Li-Fi communication and illumination is very inexpensive. In addition to the beam steering, the movement of the light source toward or away from the focus of the lens change the size of the steering beam.

Figure 36:
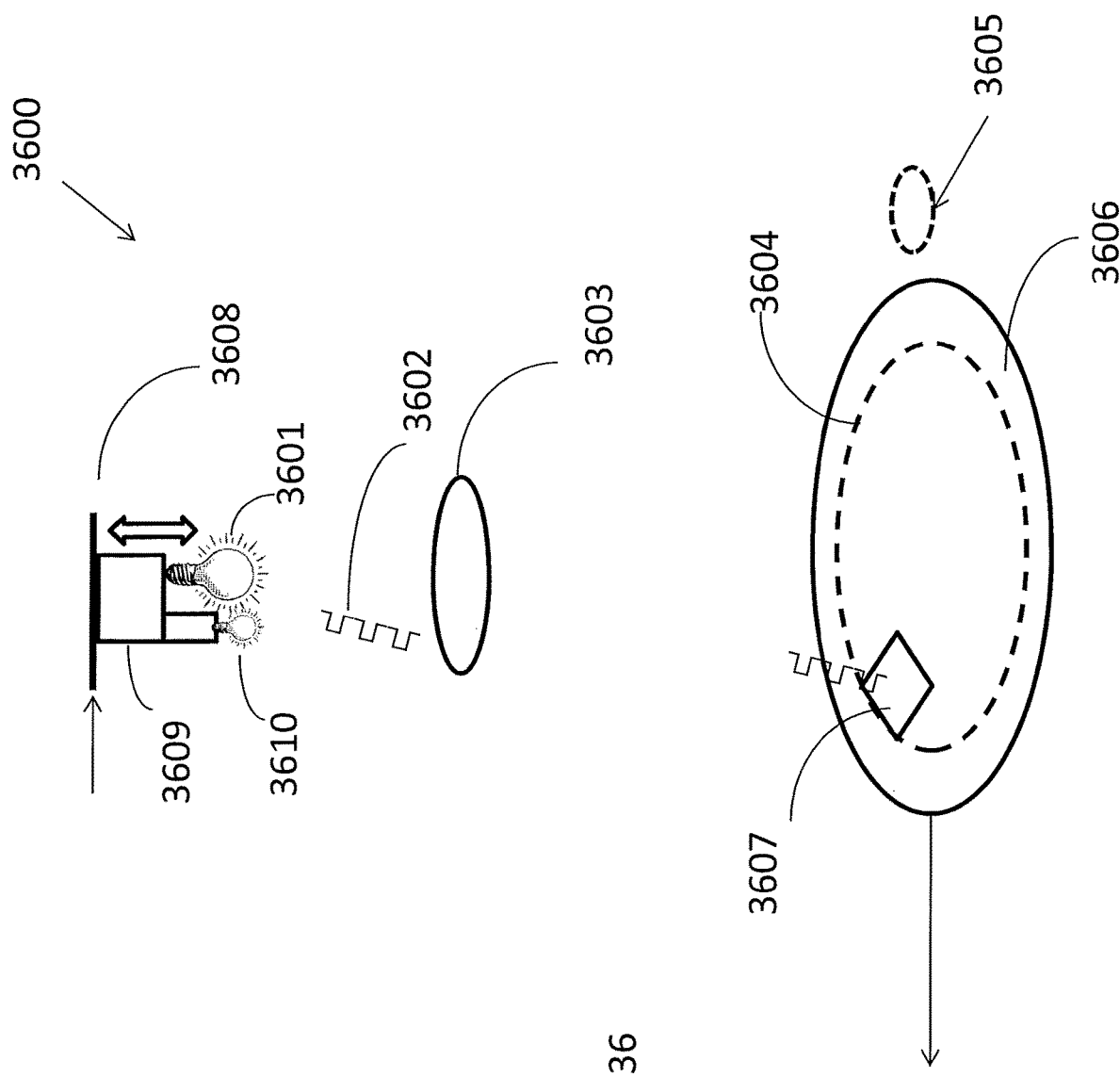
Figure 36B:
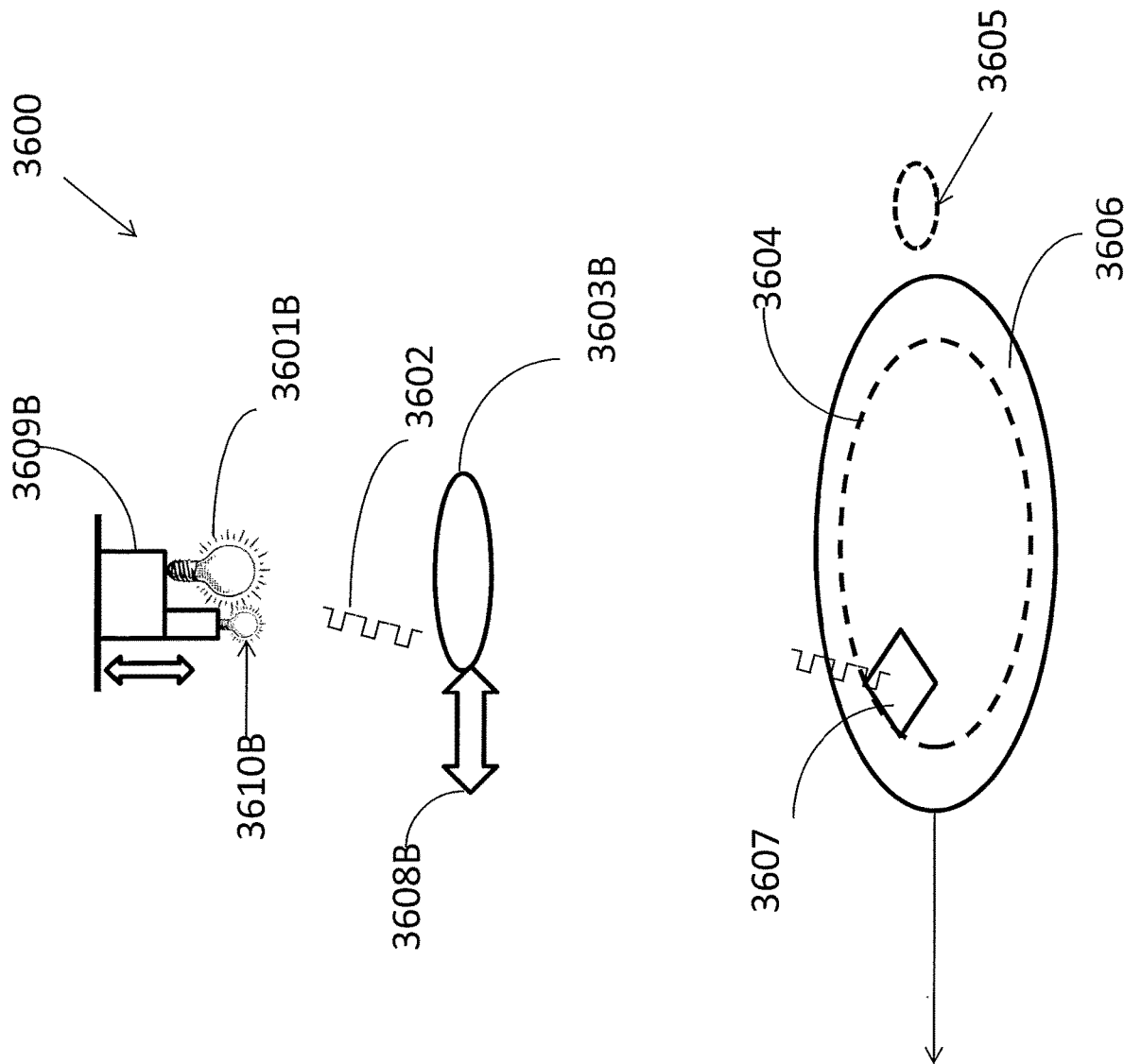

In particular, FIGS. 36, 36A, 36B, and 36C show the concept of a light system 3600 for a steerable illumination/communication light. FIGS. 36 and 36A only show the case whose beam steering mechanism according to the construction illustrated in FIG. 21 and FIG. 22. In some embodiments, the beam steering mechanism in FIG. 36B uses the configuration of FIG. 23 and FIG. 24. In some embodiments, the steerable illumination/communication light system 3600 can comprise an light source module 3601, a control spot light source module 3610, a lens 3603, and a guided rail system composing of a lateral guided rail system 3608 and a vertical rail 3609. In some embodiments, the two light source modules are mounted on the vertical rail 3609 of the guided rail system above the Fresnel lens 3603, for example, according to the construction illustrated in FIG. 21 and FIG. 22. Beam steering is obtained by moving the light source modules 3601 and 3610 laterally, or longitudinally. Beam size adjustment is achieved by moving the light source modules 3601 and 3610 vertically. In some embodiments, for example, shown in FIGS. 36B and 36C, the light source module 3601B and the control spot light source module 3610B are mounted on a vertical rail 3609B above the Fresnel lens 3603B while the Fresnel lens 3603B mounted on the horizontal rail system 3608B according to the construction illustrated in FIG. 23 and FIG. 24 as shown in FIGS. 36B and 36C. Beam steering is obtained by moving the lens 3603B laterally. Beam size adjustment is obtained by moving the light source modules along the vertical rail 3609B.

Figure 37:
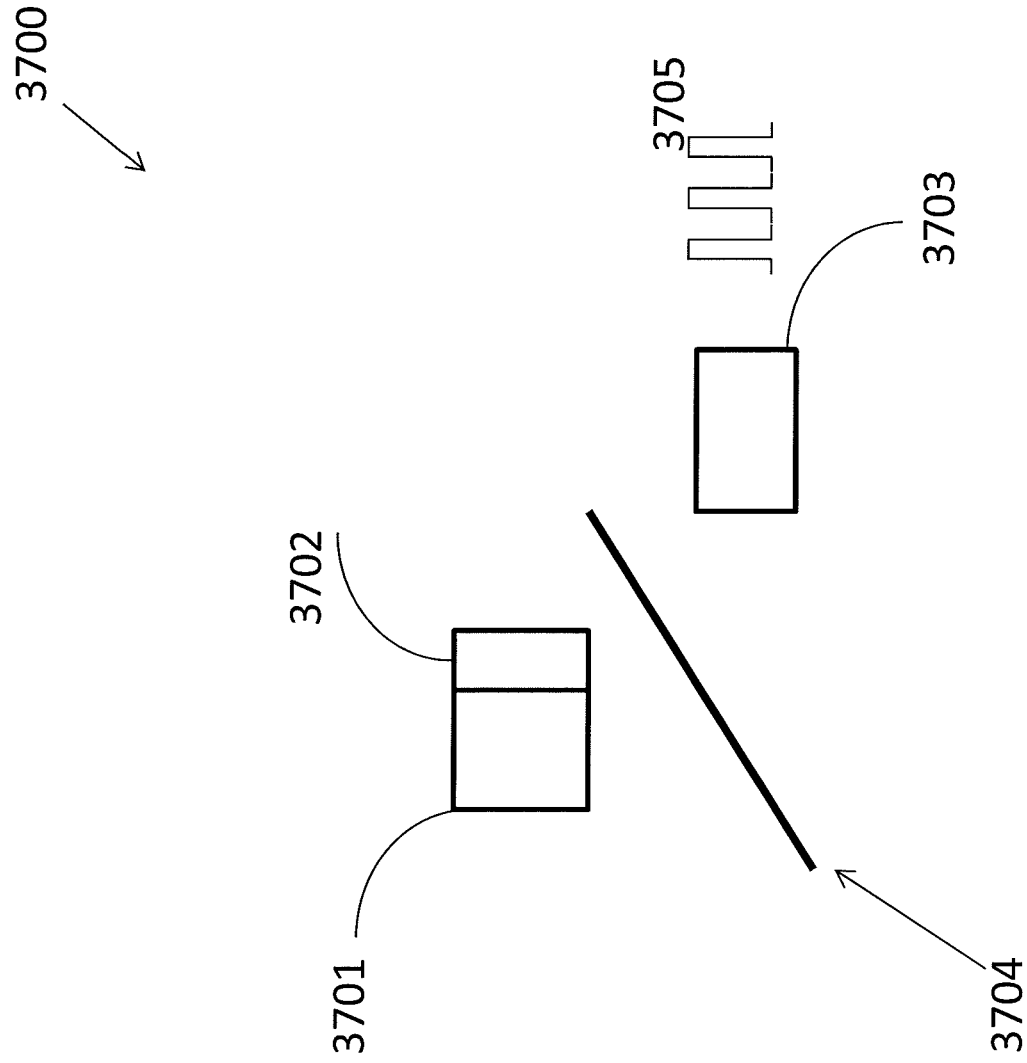
FIG. 37 is a view of an illumination source and transmitter assembly, in accordance with some embodiments.
Figure 38:
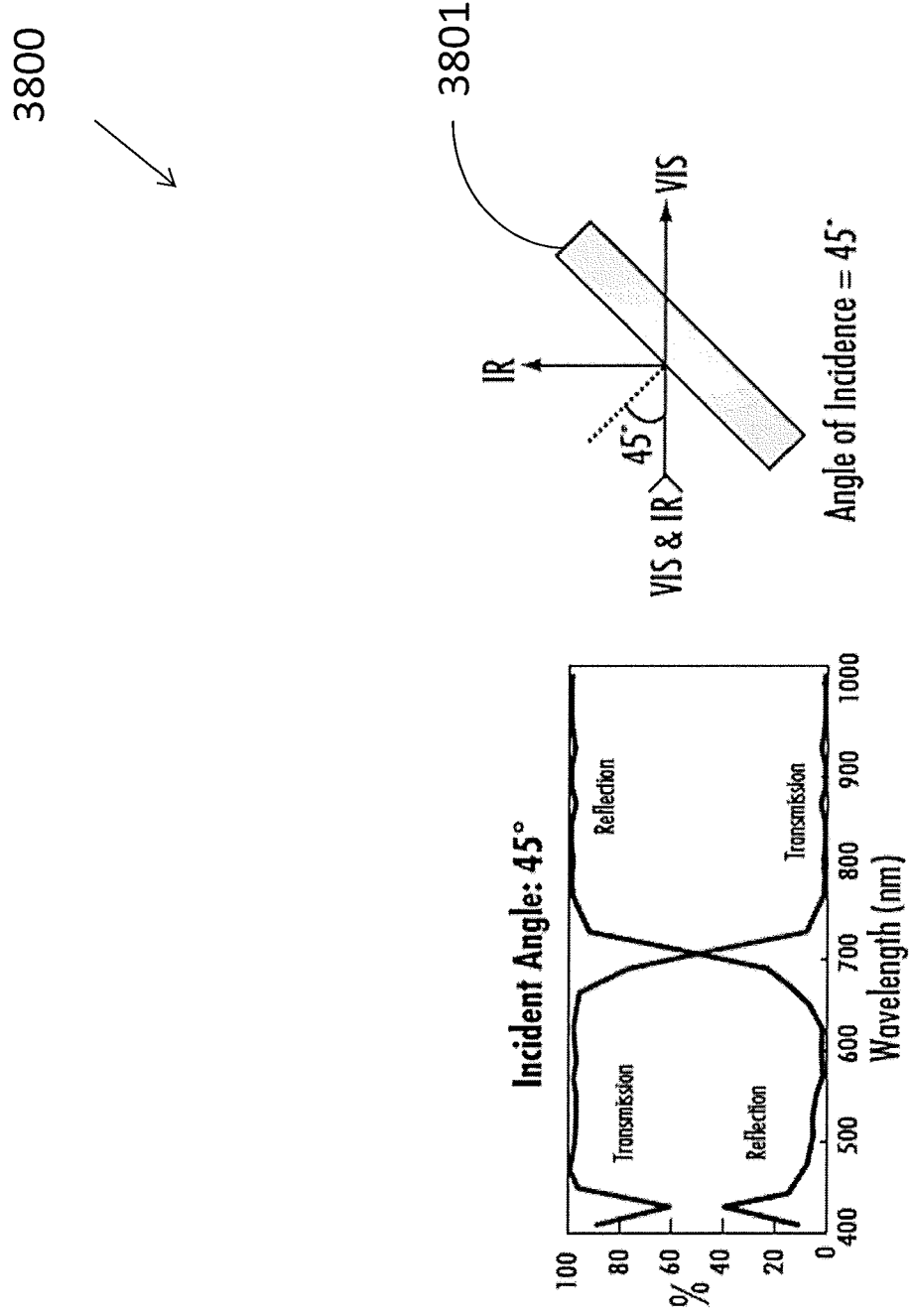
FIG. 38 is a graph and view illustrating a mirror transmitting visible light and reflecting IR light, in accordance with some embodiments.

At the illumination surface, there are three light spots: the transmitter beam spot 3604, the illumination spot 3606, and the control spot 3605. The control spot 3605 is for controlling the illumination and transmitter spots by hand gestures. The transmitter spot 3604 is a region where Li-Fi communication occurs. The illumination spot 3606 provides illumination, for example, on a surface. The transmitter beam spot 3604 and illumination spot 3606 are separated spectrally overlap spatially as shown in FIG. 36. In some embodiments, the light source module 3601 forms the transmitter spot 3604 and the illumination spot 3606. Their sizes can be the same or different from each other. The user can place his/her communication device 3607 in the transmitter beam spot 3604 to access a Li-Fi network or other perform a related communication. The beam size adjustment feature allows the user to change sizes of the illumination 3606A and transmitter beam 3604A spots as illustrated in FIG. 36A. A user can steer the light spots together to a desired location where he can use high quality illumination light and access to ultra-high speed internet from his/her laptop or mobile device. In some embodiments, the user can increase the transmitter beam spot size 3604 to accommodate multiple users to share the Li-Fi network by moving the light source module along the vertical rail. Multiple communication devices 3607A can be placed in the transmitter beam spot 3604A. In some embodiments, the user can decrease the transmitter beam spot size when he/she does not want to share the network. In some embodiments, the control spot light source module 3610 or 3610A or 3610B is not present when the touchpad or mobile controller is used. In this case there is no control spot 3605, Because in the foregoing there is no rotation of optical components in the lens beam steering mechanism, the system offers more flexibility with respect to various shapes and configurations. In particular, rotation is very sensitive to shape of the rotating object. When a car tire is not rotationally symmetric, it needs to balance. When a system does not have rotation, it is not sensitive to shape. The flexibility of the system allows for a complex geometry design for the illumination source and transmitter assembly 3700 as shown in FIG. 37. In some embodiments, a hot mirror 3704 which transmits visible light and reflects infrared light as shown in FIG. 38, can be used to constructed a illumination/transmitter light source module 3700 or 3601 such that the transmitter 3703 and illumination source 3701 and 3702 share the same FOV. 3702 is the control spot light source while 3701 is the illumination light source. The hot mirror 3704 can be similar to a mirror described at http://www.edmundoptics-.com/optics/optical-mirrors/specialty-mirrors/high-performance-hot-mirrors/3150, incorporated by reference herein in its entirety.

In some embodiments, an illumination light beam and LiFi communication light Li-Fi beam are separated in an optical spectrum but co-located spatially in the same spot, the illumination beam is in visible spectrum and LiFi transmitter beam is in NIR spectrum. In some embodiments, when the illumination source 3701 is used for both illumination and LiFi communications, there is only one light beam in the spot.

The Li-Fi transmitter beam spot 3604 and the illumination spot 3606 (FIG. 36) may overlap or intersect. If illumination light is used for communication, then the transmitter beam spot 3604 and the illumination spot 3606 are the same or similar. If infrared light is used for transmitter signal and visible light used for illumination, then two light spots are formed. In some embodiments, the light source module can comprise of a white LED lamp 3701 and a color control spot generator light source 3702 if the illumination light is also used for Li-Fi communications. In some embodiments, the light source module can comprise of an illumination light source 3701, a color control spot generator light source 3702, an IR transmitter source 3703, and hot mirror 3704. The hot mirror transmits visible light while reflects IR light as illustrated in FIG. 38. The hot mirror 3704 is placed at 45° to both illumination light source 3701 and the transmitter 3703. This guarantees the transmitted illumination light and the reflected IR transmitter light share the same FOV. Using IR light as transmitter light in this manner, the user can turn on or off the illumination light without interrupting his/her optical wireless communications network. In some embodiments, the IR transmitter light can be LED light. In other embodiments, the IR transmitter light can be laser light, or generated in a different but related frequency spectrum such as the laser light from an optical communication fiber.

An electric heater is well known for heating an object by thermal radiation. When directing heat energy at a human recipient or user, it must aim at the user in order to deliver most of the heat to the user. This restricts the user's mobility. Since an IR Fresnel lens transmits thermal radiation, a steerable heater can be constructed by using an IR Fresnel lens and a heater in some embodiment.

Figure 39:
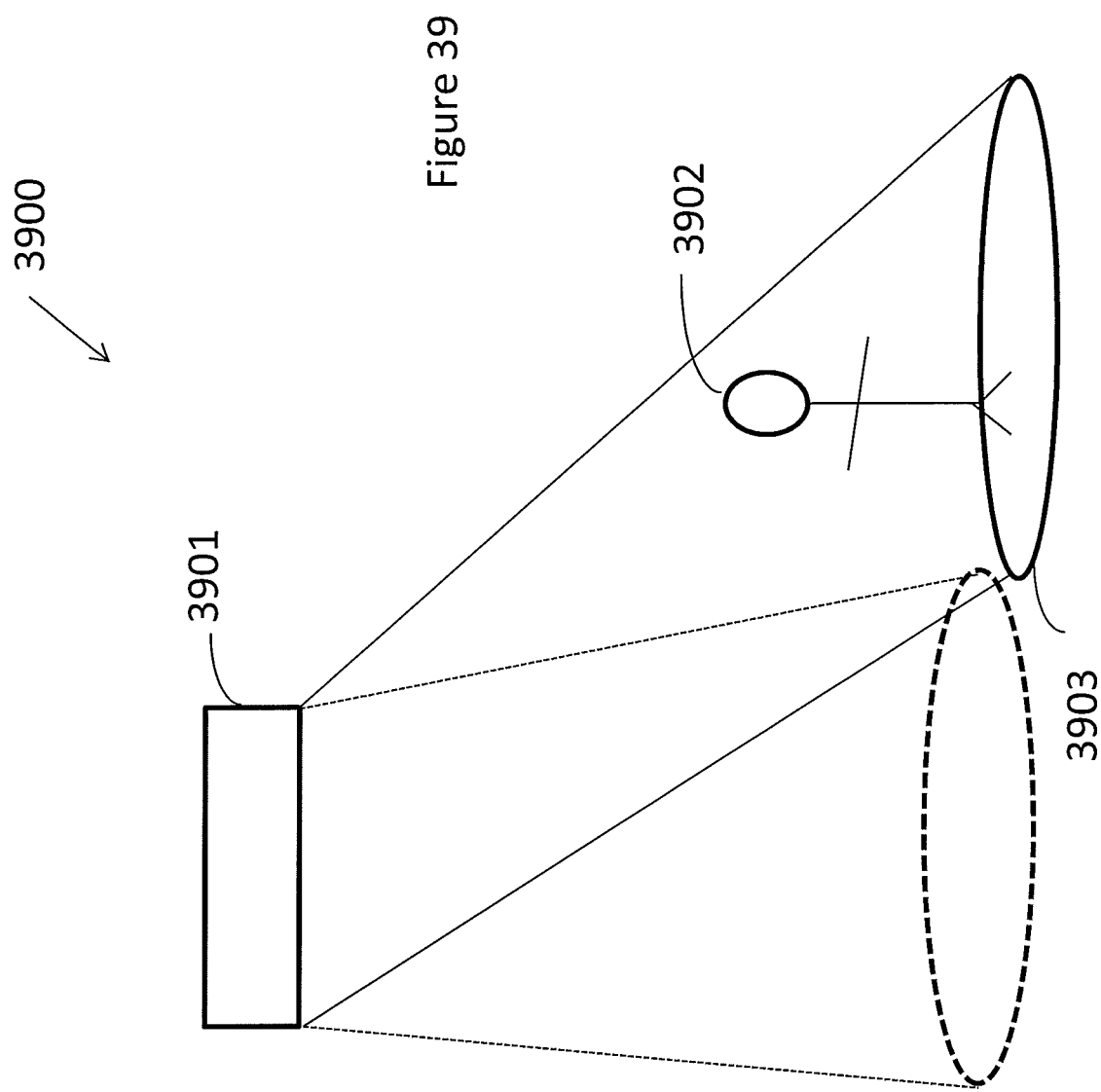
FIG. 39 is a view of an operation of a steerable heater, in accordance with some embodiments.

As shown in FIG. 39, a beam steering mechanism 3900 can be used to steer heat or thermal light in some embodiments. Heat from a steerable heater 3901 is steered from a nadir position to an off track position 3903 where the user 3902 is at. In some embodiments, the beam steering controller can be a hand gesture controller described in U.S. patent application Ser. No. 14/048,505 incorporated by reference herein. In other embodiments, it can be a contact controller such as touchpad 2802 in FIG. 28 or mouse controller 606 in FIG. 6.

Figure 40:
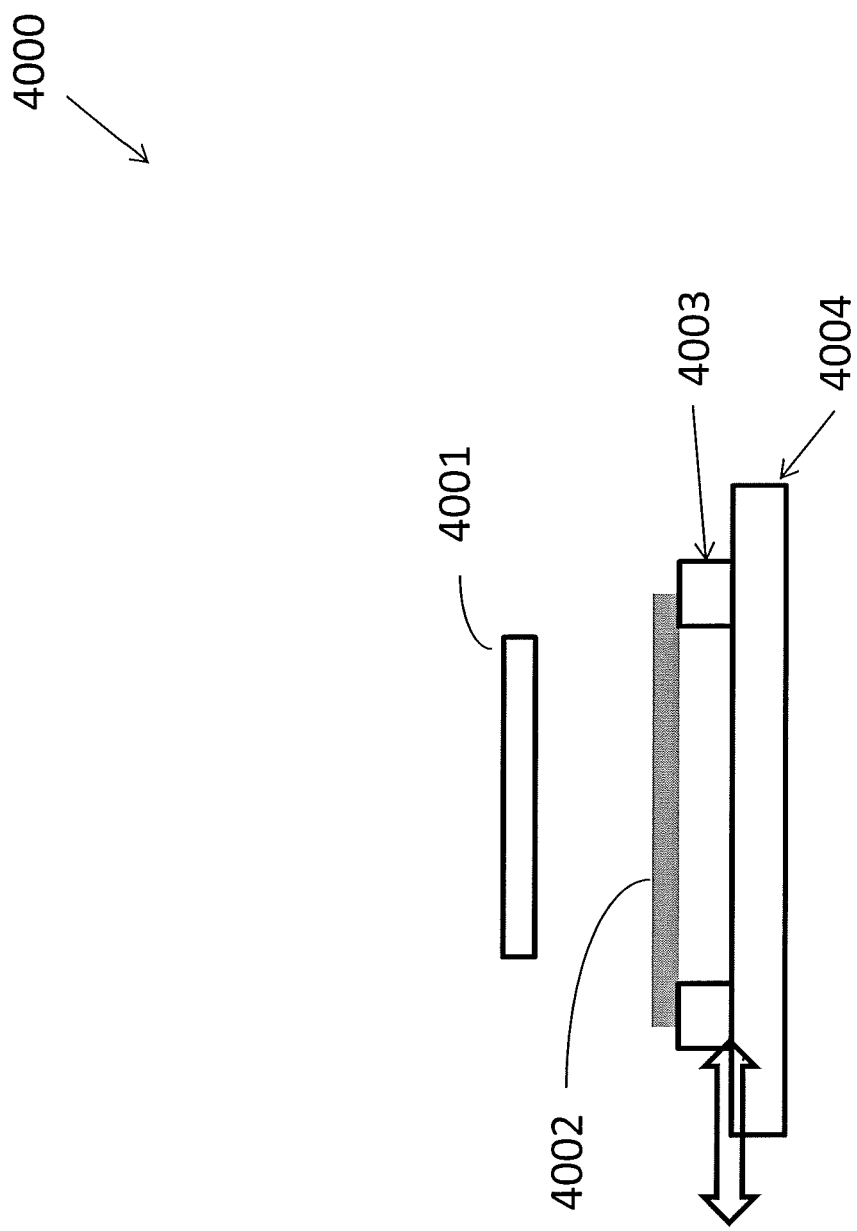
FIG. 40 is a side view of the steerable heater of FIG. 39.

FIG. 40 shows the side view of a steerable heating system 4000, in accordance with some embodiments, which may be implemented in the operation shown in FIG. 39. The heating system 4000 comprises a heater 4001, a thermal lens such as infrared (IR) Fresnel lens 4002, a guided rail system 4003 and 4004, which can be the same as or similar to comparable elements described in FIGS. 21-24 in some embodiments. The heater 4001 can be mounted to a vertical guided rail allowing the heating area to be adjusted. Since the spectral transmission of the IR Fresnel lens in the thermal region is less than 60%, it absorbs heat. A fan can be used to create some convection to prevent heat from building up on the IR Fresnel lens 4002.

Figure 41:
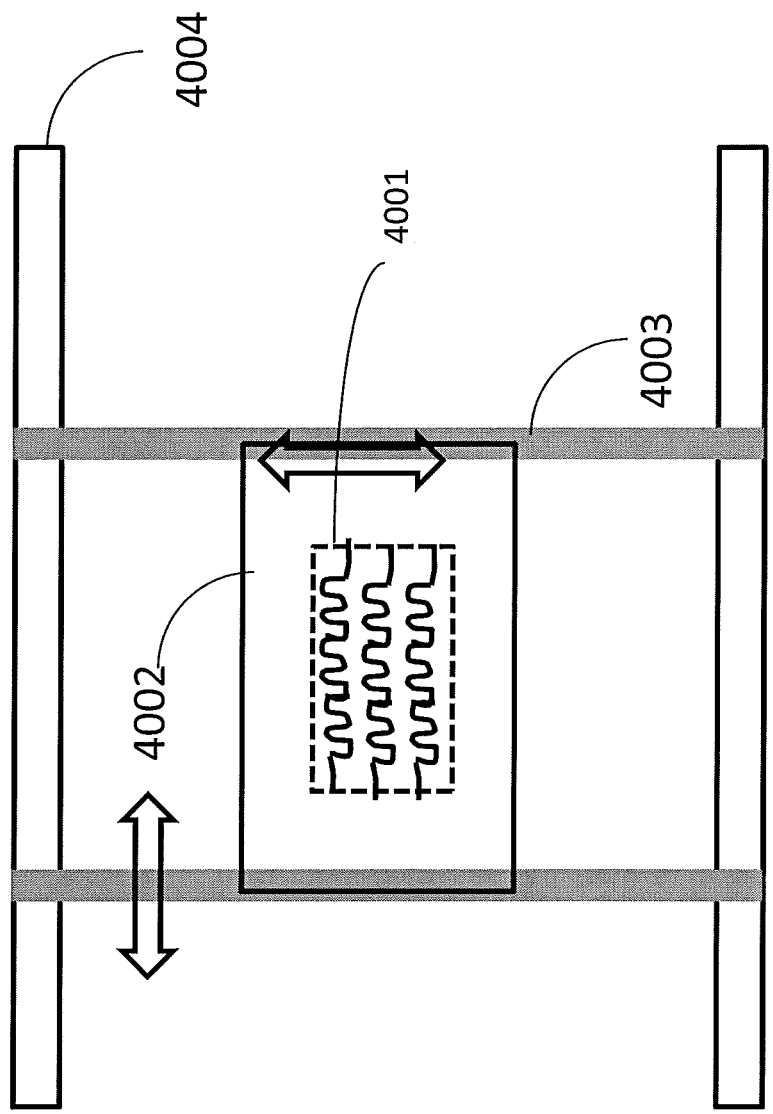
FIG. 41 is a top view of the steerable heater of FIGS. 39 and 40.

FIG. 41 is the top view of the steerable heater 4000 of FIGS. 39 and 40. The lens 4002 is mounted on the guided rail system 4003, 4004. The projection of the heater 4001 is on the lens 4002 is also shown. The lens is moved by the guided rail system 4003, 4004 while the heater 4001 remains stationary.

Figure 42:
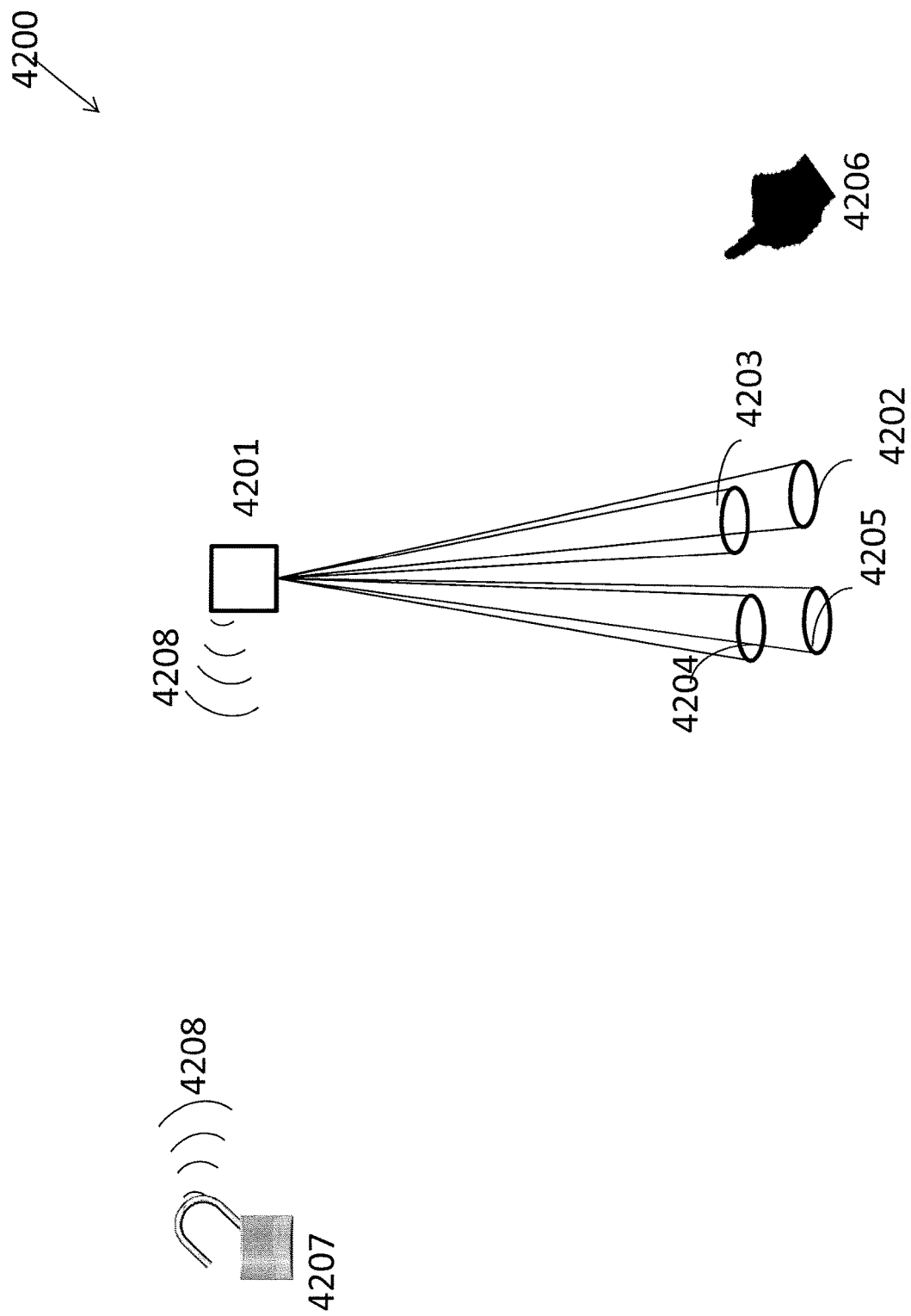
FIG. 42 is a view of a non-contact switch for a combination lock, in accordance with some embodiments.
Figure 43:
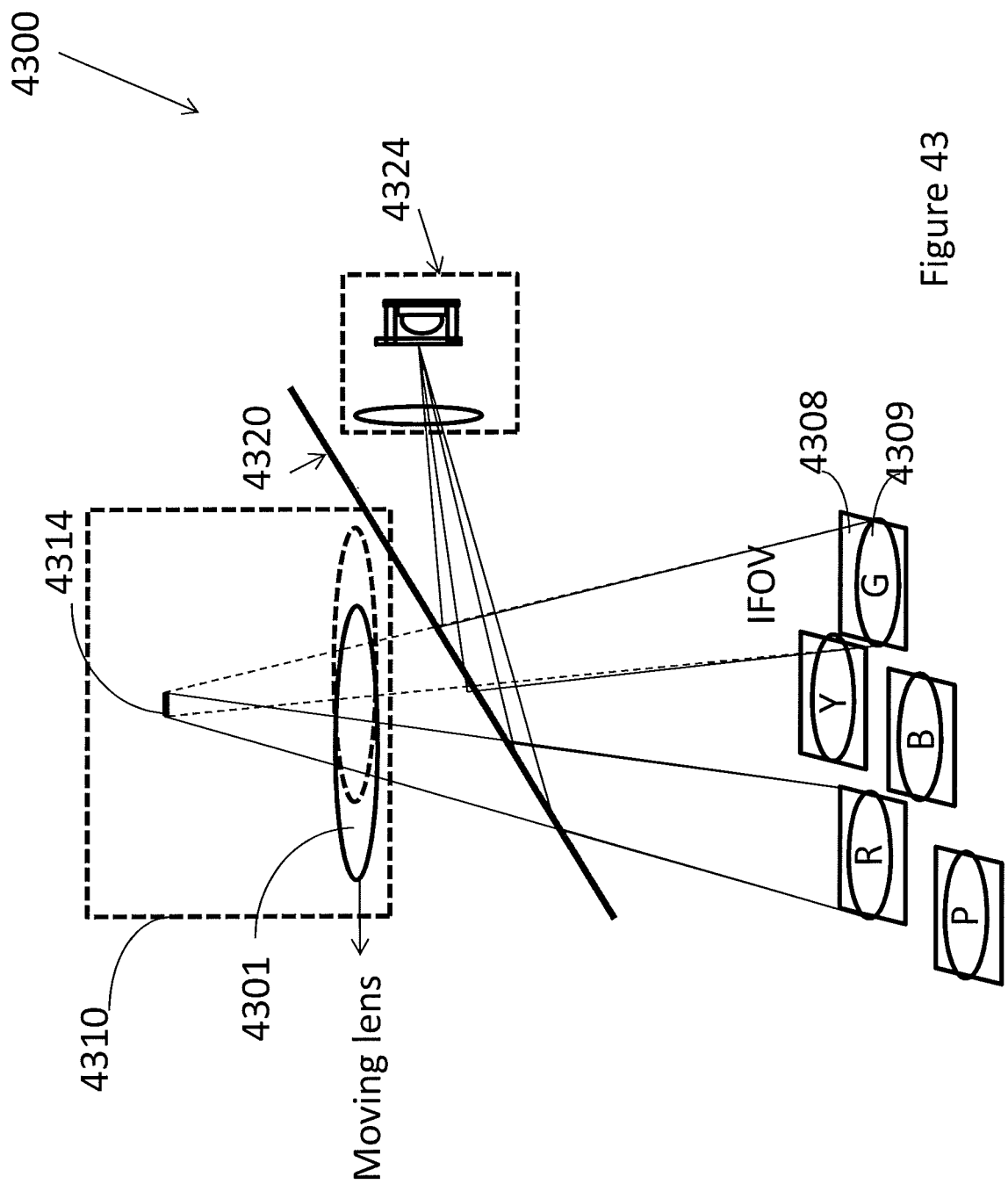
FIG. 43 is a view of a lens steering system, in accordance with some embodiments.

Combination locks typically use a number combination as a secret code for opening a lock. FIG. 42 shows the concept of a non-contact switch 4200 using colors for a combination lock, in accordance with some embodiments. Instead of using a number combination for lock code, a color combination can be used for the lock code in some embodiments. For example, a 3 digit code can be replaced by a 3 color code out of 4 available colors for a lock for example. This is extremely useful in the hospital environment where sterilization is critical. Furthermore, the non-contact feature make the device last longer than a contact device. As illustrated in FIG. 42, a control spot generator in the switch module 4201 outputs 4 color light spots, i.e., red 4202, green 4203, blue 4204, and yellow 4205, on a surface. The thermal sensor continuously monitors the 4 color spots for a heat signature. If a human body part like a hand 4206 is inserted into the FOV of one of the color spots, it will be treated it as a signal. If the secret color code is yellow, red, green, then the user may insert his/her hand in the three color spots in the right sequence. An imbedded processor in the switch module will send out a command via a wireless network 4208 or other types of communication network to the lock module to unlock the lock 4207 in some embodiment. A detail description of switch module can be found in U.S. patent application Ser. No. 14/318,019 incorporated by reference herein. Here, a non-contact switch is used to switch on/off light and other devices. It is also used to control other devices. In some embodiments, a color code comprising of combination of colors used in the non-contact switch can be used to lock and unlock devices such as lock in some embodiment. A MEMS mirror is used to scan the FOV of the thermal sensor used to generate non-contact function keys for a non-contact switch/controller. However, the packaging and optical alignment of the MEMS mirror to the thermal detector can be a challenge. Beam steering technique offers a simpler solution. In some embodiment, this scanning system of the thermal sensor 4310 can be replaced by a lens steering system 4300 as shown in FIG. 43. In some embodiments, the lens 4301 can be moved by guided rails or like system as described in FIGS. 23 and 24. In some embodiments, other motion mechanisms can be used to translate the lens 4301. By laterally translating the lens 4301, the instantaneous field of view (IFOV) of the thermal detector 4314 scans through the field of view (FOV) of the thermal sensor 4310. The resulting output of the thermal detector is an image of the target scene. The control spot generator 4324 outputs color spots 4309 on the target surface. The thermal sensor does not see the color spots. Certain number of instantaneous field of views (IFOVs) of the detector align with the IFOVs of the color cones generated by the control spot generator 4324 by pre-calibration described in U.S. application Ser. No. 14/318,019 in some embodiments. The beam splitter 4320 which transmits thermal light and reflects visible light makes the alignment possible. These IFOVs are the assigned function keys in some embodiment. The footprints 4308 of these thermal detector IFOVs coincide with the color spots 4309 on the target surface. By inserting a hand into the IFOV of a color cone, the user touches a non-contact function key in some embodiment. These function key IFOVs are associated with the coordinates of moving lens in some embodiment. An example of non-contact function keys in image space is illustrated in U.S. application Ser. No. 14/318,019 incorporated by reference. These imaged pixels have a corresponding coordinate map for the lens motions. By selecting a shortest path that goes through the coordinates of all the non-contact function keys, one can obtain a partial image, for example illustrated in U.S. application Ser. No. 14/318,019 incorporated by reference. In doing so, the beam steering by the lens is more efficient.

As described herein, counter rotating wedge prisms can be used to perform beam steering. However, wedge prisms may be thick and bulky for large aperture in lighting applications. In some embodiment as illustrated in FIG. 44, Fresnel prisms are provided, which are made of thin plastics. Because they are thin, large aperture for lighting applications is possible. This will make the beam steering assembly compact and light. Fresnel prisms have limited beam steering range. For lighting applications with small beam steering range, counter rotating Fresnel lens is ideal. FIGS. 44A and B shows the concept of counter rotating Fresnel prisms to steer light. A beam of light from a light source 4401 goes through a pair of Fresnel prisms 4402. By counter rotation 4403 of the two Fresnel wedge prisms 4402, the light beam direction is deviated from the optical axis 4405 in some embodiment. By co-rotation 4404 of the two Fresnel wedge prisms, the light beam can rotate in the azimuth direction in some embodiment. The two rotations θ and φ allows the user to steer the light beam in any direction.

Referring again to FIGS. 21 to 24, an individual steerable light can operate by implementing beam steering mechanism including a lens and a light source on a guided rail system. In some embodiments, an array of steerable lights can be put together for illuminating a large area or for allowing multiple users to access the steerable lights or, in some applications, illuminating multiple merchandise in a retail store.

Figure 45:
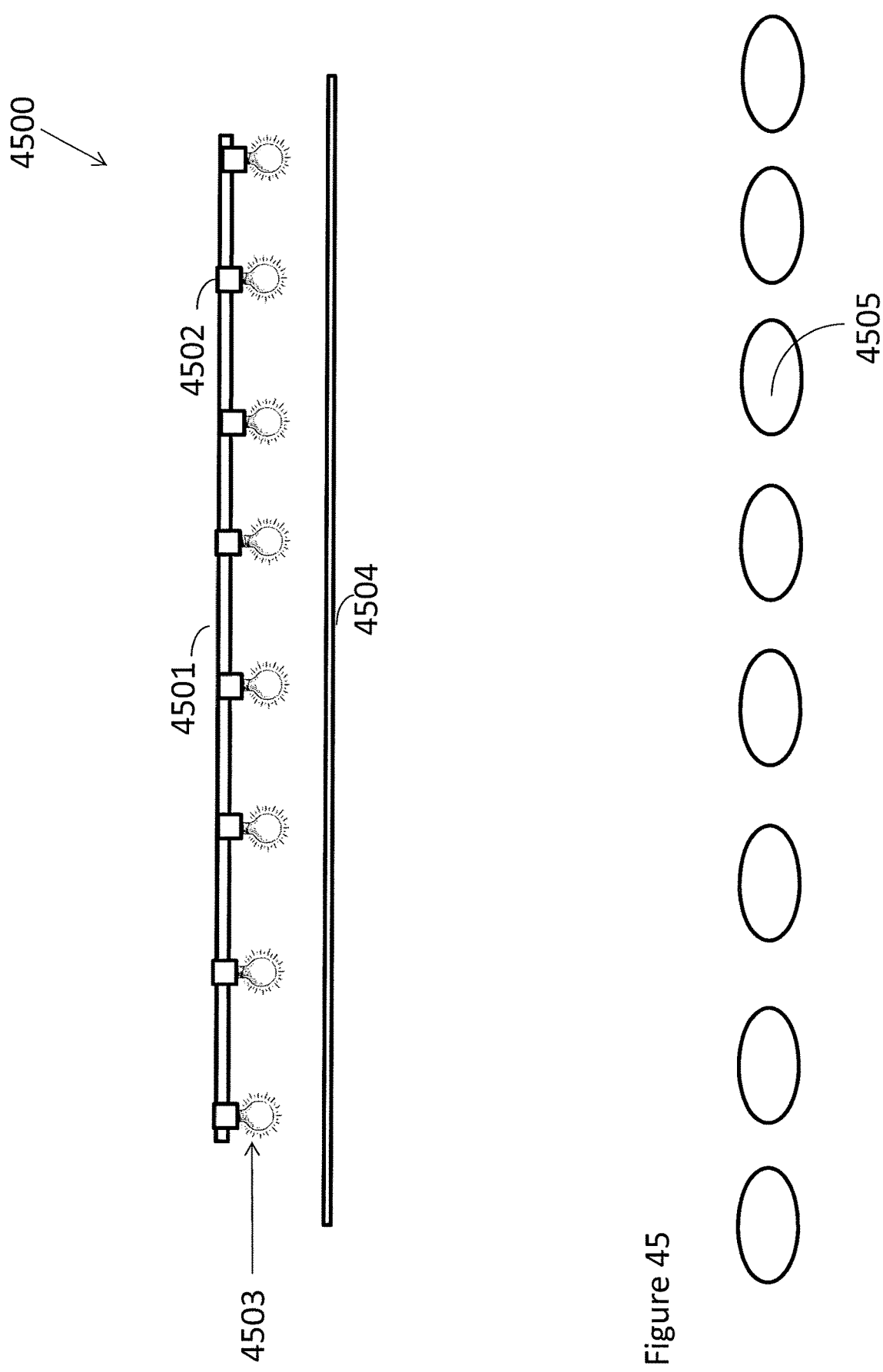
FIG. 45 is a view of a track steerable light system, in accordance with some embodiments.

In some embodiments, as shown in FIG. 45, a track steerable light system 4500 can comprise of a Fresnel lens array 4504, a light source array 4503, an array of guided rail systems 4502 mount, and a single track rail 4501. The light sources 4503 are mounted on the guided rail systems 4502 (which can move in a direction in and out of the page), which in turn mounted on track rail 4501. The track rail 4501 can be mounted on the ceiling or other surface. The assembly including the light source array 4503, guided rail systems 4502, and track rail 4501 may be placed behind the Fresnel lens array 4504. The illumination spots 4505 are projected onto an illumination surface.

Figure 46:
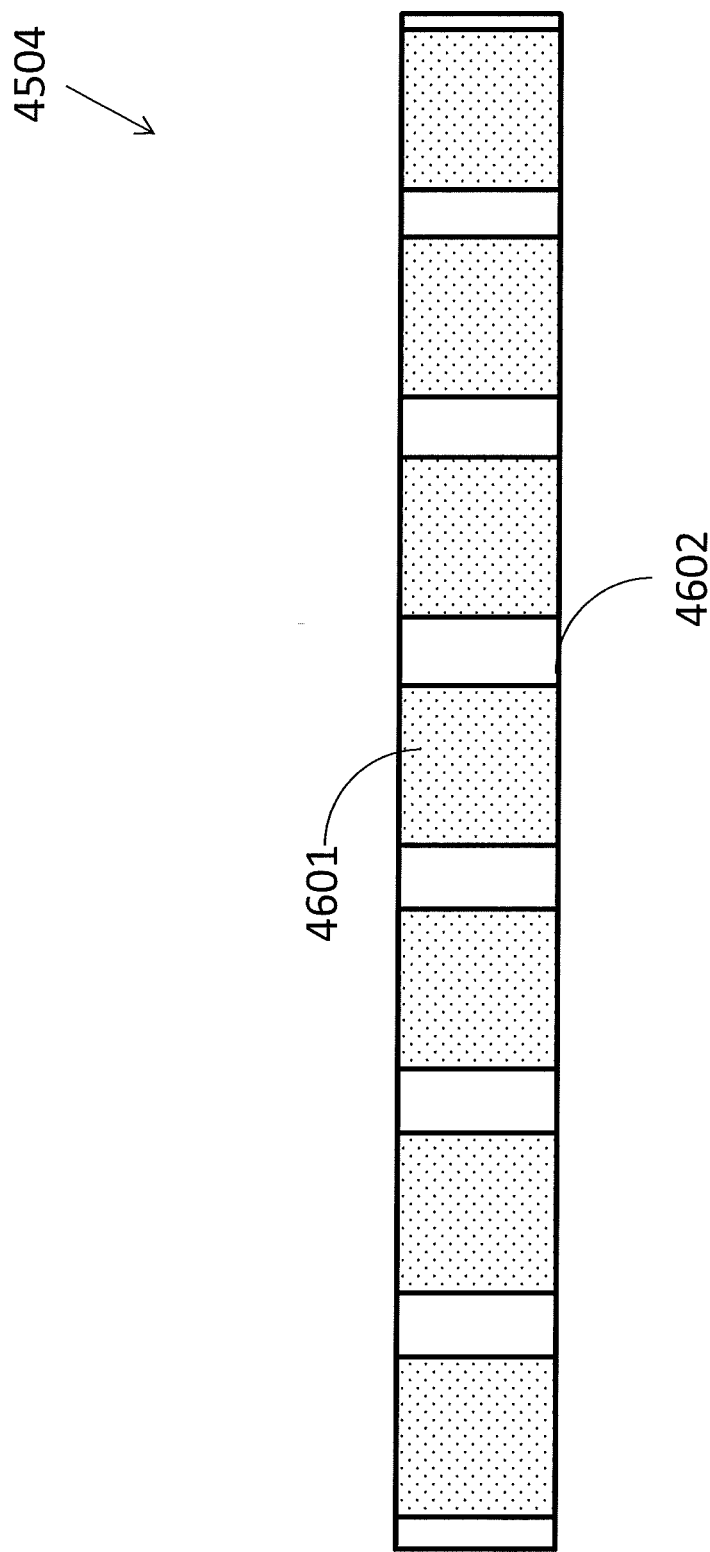
FIG. 46 is a view of a lens array, in accordance with some embodiments.

As shown in FIG. 46, in some embodiments the Fresnel lens array 4504 can comprise one or more Fresnel lenses 4601 and a frame 4602 that holds the lenses 4601 together.

Figure 47:
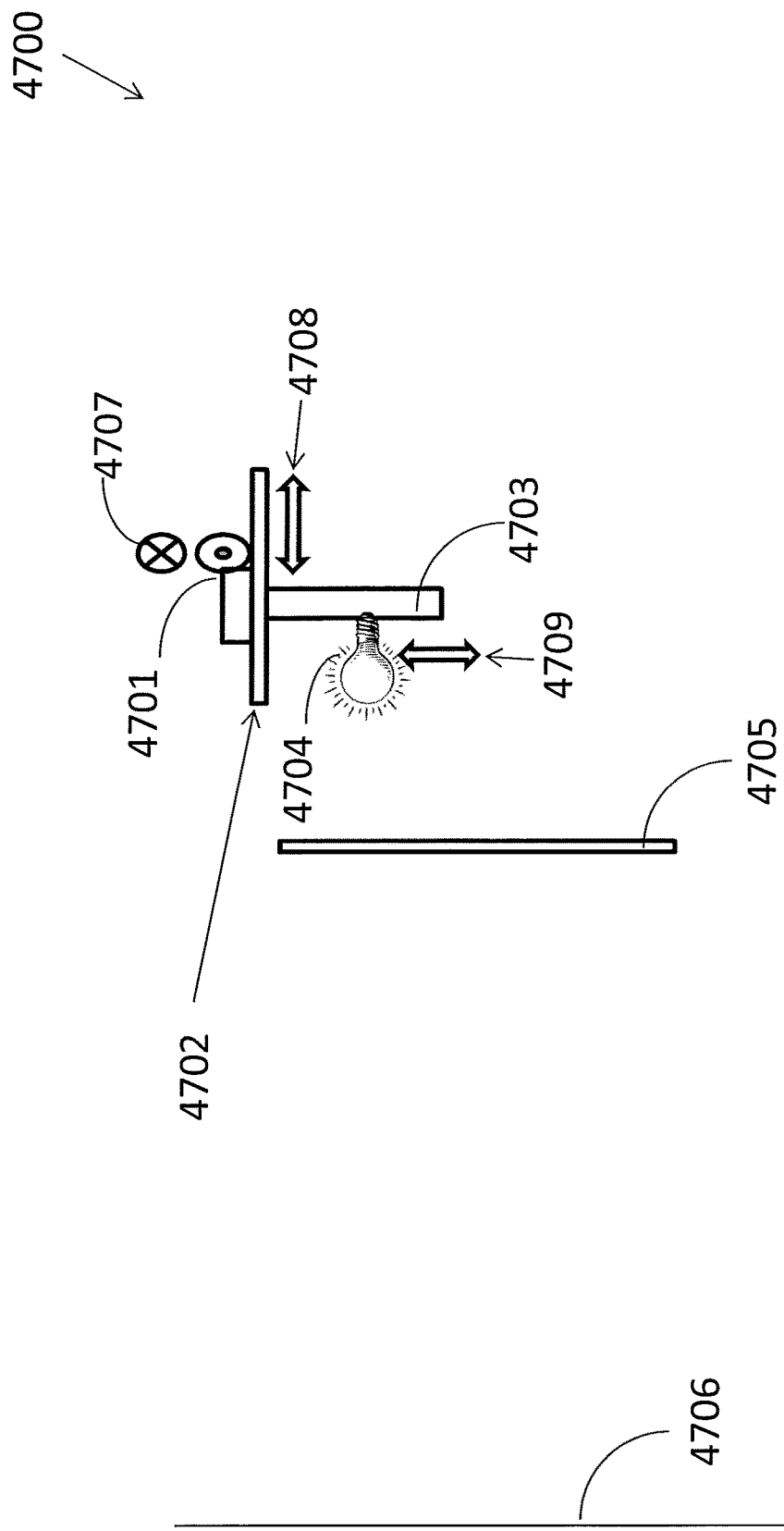
FIG. 47 is view of a steerable light system assembly, in accordance with some embodiments.

As shown in FIG. 47, in some embodiments, an individual steerable light system assembly 4700 can be constructed by mounting a light source 4704 on to a vertical rail 4703 which is mounted to a Z rail 4702 which is mounted on a track rail 4701. The Z rail 4702 is perpendicular to a Fresnel lens 4705 which is placed in front of the light source 4704 of the assembly 4700. Light can be output from the assembly 4700 and form a steerable illumination spot (not shown) which is projected onto a surface 4706, for example, a wall. The steering motion resulted from combination of vertical motion 4709 and track motion 4707 (in and out of the page) of the light source can be controlled by the vertical rail 4703 and the track rail 4701 in some embodiments. The beam size adjustment can be controlled by a horizontal motion 4708 of Z rail 4702 in some embodiments. The steerable track light 4 system array 4700 can therefore be used for side illumination applications such as merchandises in retail stores and paintings in museums in some embodiments.

Figure 48:
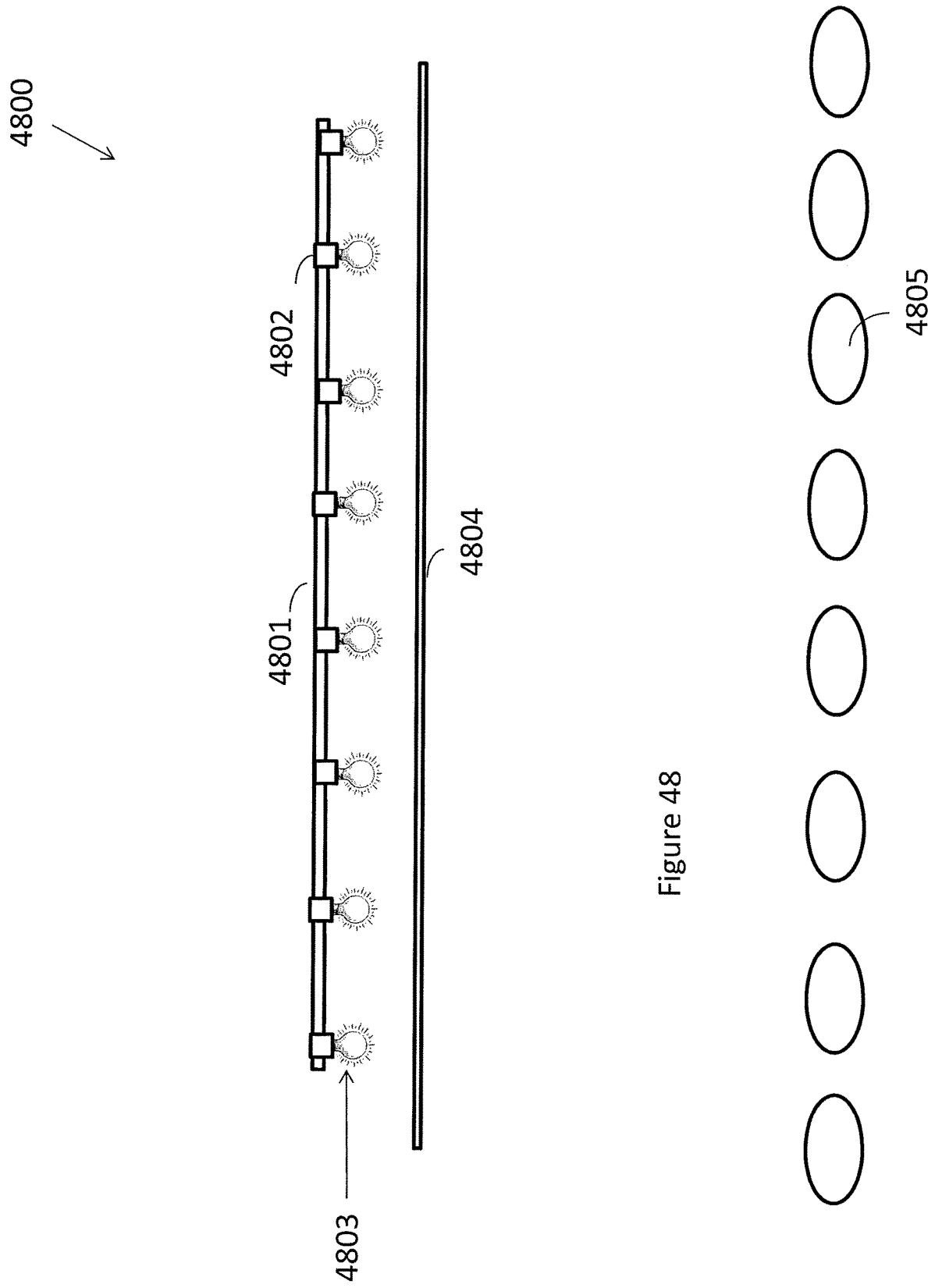
FIG. 48 is a view of a track steerable light system, in accordance with some embodiments.
Figure 49:
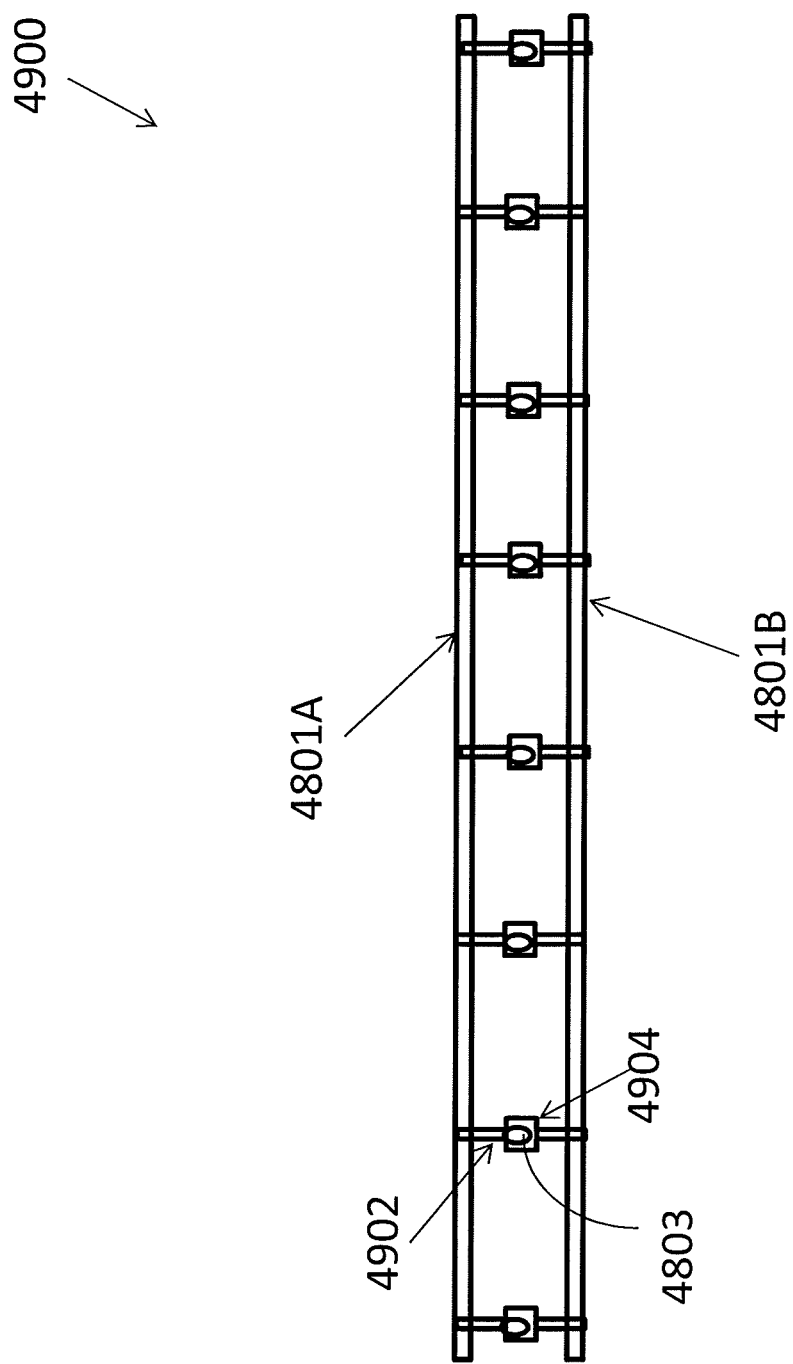
FIG. 49 is a view of a guided rail system, in accordance with some embodiments.
Figure 50:
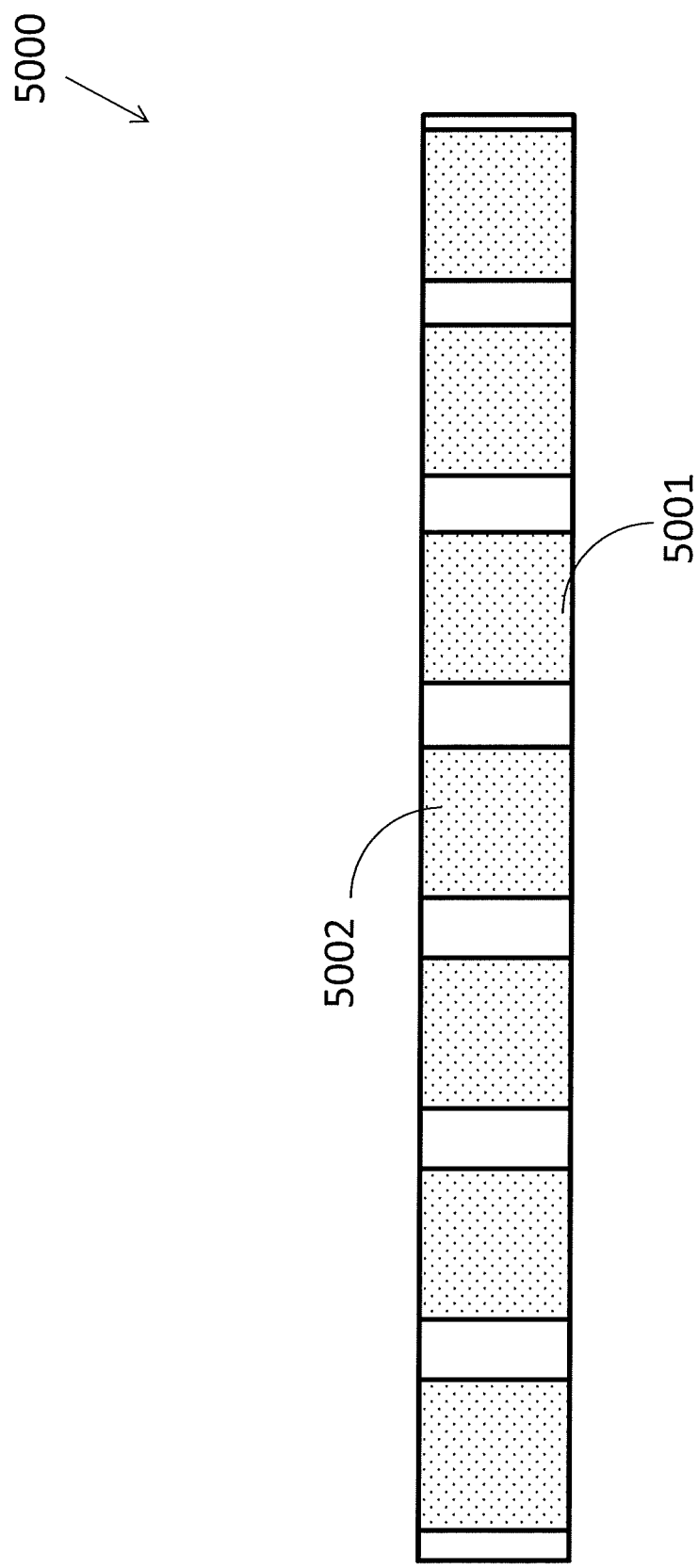
FIG. 50 is a view of a lens array, in accordance with some embodiments.
Figure 51:
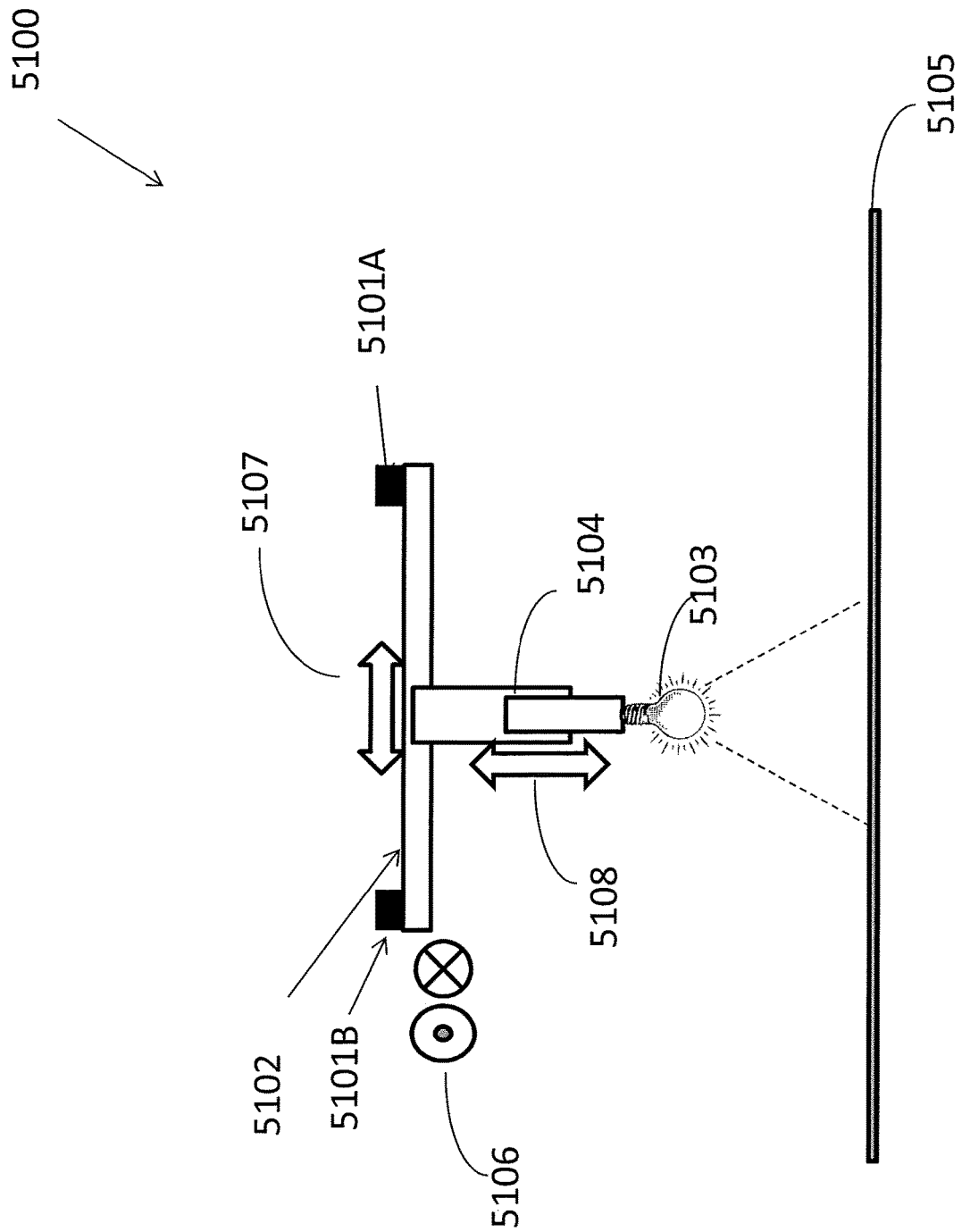
FIG. 51 is a view of a single steerable light system, in accordance with some embodiments.

In some embodiments, a vertical surface such as a floor surface or like can be illuminated by a steerable track light system 4800 illustrated in FIG. 48. The light source 4803 and Fresnel arrangement 4804 may be the same as that of track light 4500 of FIG. 45. However, the guided rail systems 4801, 4802 shown by example in FIG. 48 are slightly different than the rails 4501, 4502 of FIG. 45. As in FIG. 4500, track light 4800 of FIG. 48 can comprise a light source array 4803, an array of guided rail systems comprising cross rails 4902 and vertical rails 4904, a Fresnel lens array 4804, and two track rails 4801A, 4801B. In some embodiments, two track rails can be used as illustrated in FIG. 49. In other embodiment, different number of track rails can be used. Referring to FIGS. 49-51, the light sources 4803 or 5103 can be mounted to vertical rails 4904 or 5104. The vertical rails 4904 or 5104 are mounted to the cross rails 4902 or 5102. The cross rails 4902 or 5102 can be mounted to the two track rails 4801A and 4801B or 5101A and 5101B. The Fresnel lens array 5000 in FIG. 50 is the same as the Fresnel lens array 4504 in FIG. 46. Also, in FIG. 49, a direction indicator such as a compass can be mounted on one of the horizontal rail 4901, 5101 so that a direction of the beam steering mechanism can be established.

FIG. 51 illustrates an embodiment of a configuration of a single steerable light system 5100. A rail system includes abovementioned rails 5102, 5104, and 5101A, B. In addition, beam steering can be obtained by combination of cross rail motion 5107 and the track rail motion 5106 in some embodiments. The beam size adjustment can be obtained by a vertical rail motion 5108 in some embodiments. The steerable illumination spot array is projected onto a surface 5105.

Multiple steerable track lights can form various geometric patterns in some embodiments. For example, in FIG. 52, four steerable track lights, 5201 5202, 5203, and 5204 of a type similar to or the same as those described in FIGS. 48 to 51 can be used to construct a rectangle steerable track light system in some embodiments. In some embodiments, other geometric patterns of steerable track lights can be constructed. In some embodiments, other types of steerable track lights can be used to construct various geometric patterns.

Figure 52:
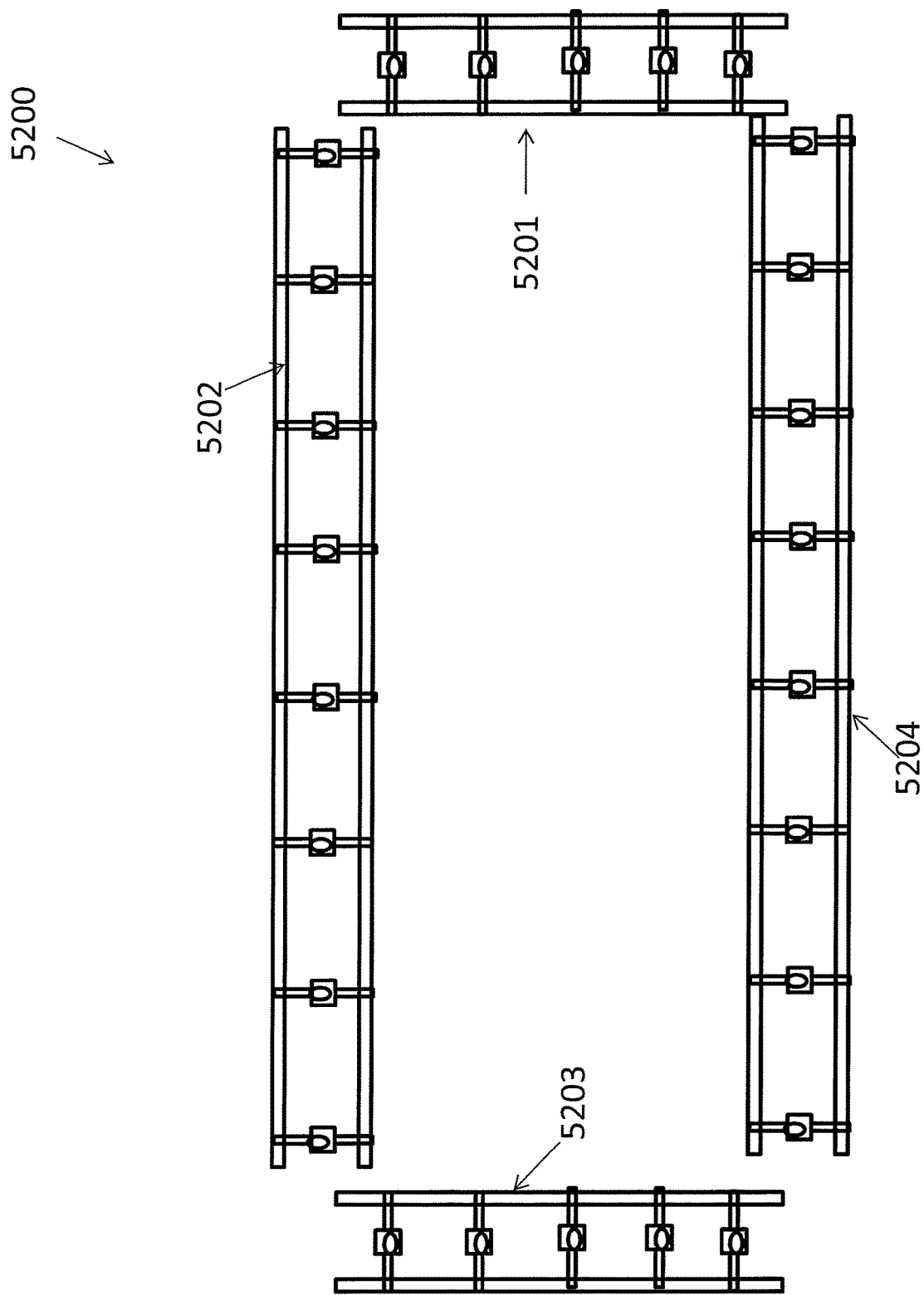
FIG. 52 is a view of multiple steerable track lights, in accordance with some embodiments.

FIG. 52 only shows the bottom view of a rectangle steerable track light system 5200. It can be formed by four steerable track lights of either the configuration in FIG. 45-47 or the configuration in FIG. 48-51 on each side of the rectangle steerable track light. A representative configuration in FIG. 48-51 is shown, but is not limited thereto. The system 5200 includes Fresnel lens arrays (not shown) that overlay some or all four sides of the rectangle steerable track lights 5201-5204 of the system 5200. Other geometric shapes such as concentric rings of lights can also be constructed in some embodiment.

In some embodiments as shown in FIGS. 45 to 52, a steerable track light moves one or more light sources, while a Fresnel lens array is stationary relative to the movable light sources. However, in other embodiments, the steerable track lights can also move a Fresnel lens while the light sources are stationary.

In the steerable track lights of FIGS. 45 to 52 the rails are motorized. Each direction of motion has a motor assembly to move the rail or rails. In some applications such as retail stores, the lights need to steer only once a day. In some embodiments, the rails 5303, 5304, and 5305 of the steerable track light 5300A of the system 5300 in FIG. 53 do not have motors. In particular rail 5305 is the vertical rail, rail is a cross rail 5304, and rails 5303 are track rails. A light source 5306 is mounted on the vertical rail 5305. A docking port 5408 made of magnetic material shown in FIG. 54 can be attached to the vertical rail 5305.

Figure 53:
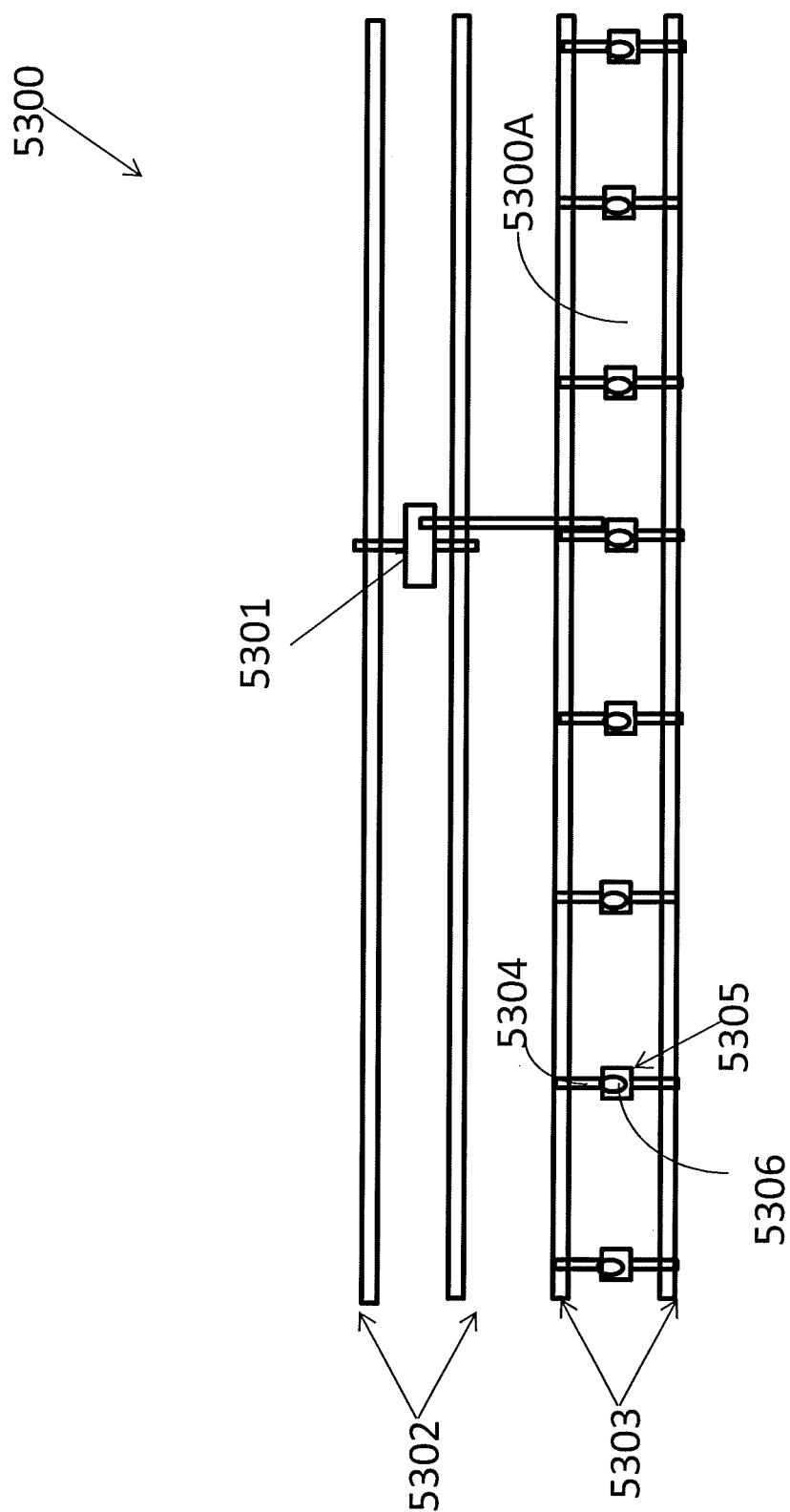
FIG. 53 is a view of a steerable track light system, in accordance with some embodiments.
Figure 54:
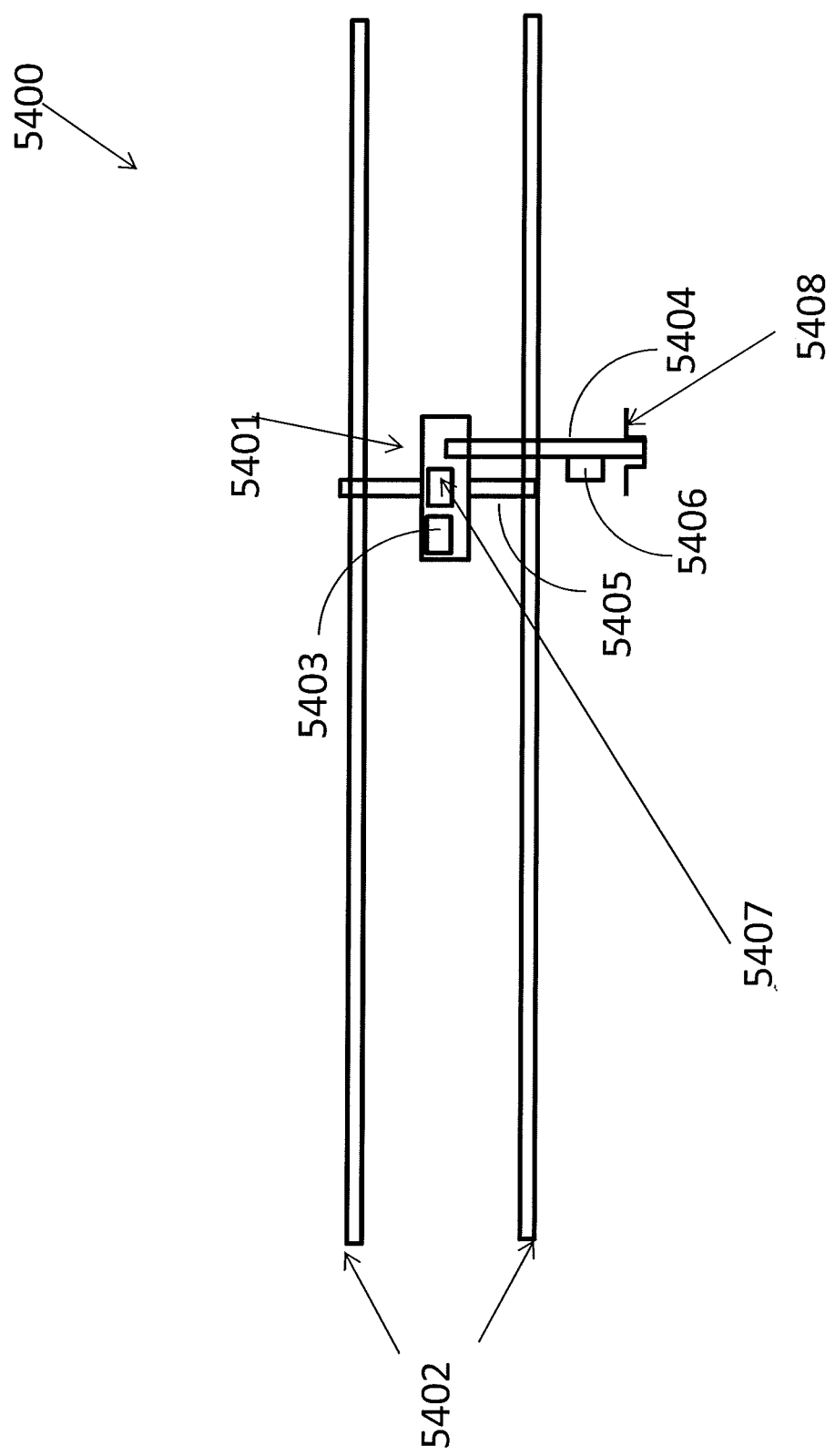
FIG. 54 is a view of a steerable track light system, in accordance with some embodiments.

In some embodiments, a motorized steering car 5301 moves along track rails 5302 adjacent to the non-motorized steerable track light array 5300A, and parallel track rails 5303, and can steer an individual steerable light of the track light array 5300A. In some embodiments, the car 5301 has an electromagnetic arm which allows it to grab an individual steerable light of the steerable track light 5300A by its docking port and steer it until the illumination spot is at the desired position. In FIG. 54, the system 5400 includes a car 5401 or 5301 on a motorized cross rail 5405 and motorized track rails 5402. The car 5401 comprises an electromagnetic arm 5404 with on and off switch, a motorized vertical rail (not shown) on which the electromagnetic arm is mounted, a camera 5406 for locating the docking port on a steerable light, a processor 5407 for processing images of the camera and controlling the motion of the car, a wireless (WiFi) or Bluetooth transceiver 5403 to communicate with a remote controller which can be either a touchpad type or mobile device type as well as other type of controller. The car is power by a power supply (not shown) which draws power from a power line (not shown) along the track rails. The electromagnetic arm 5404 can comprise a coil magnet. The principal of the electromagnetic arm is the same as that of the electromagnetic crane. As shown in FIG. 54, a car 5401 can travel along a motorized cross rail 5405 and the motorized track rails 5402 to steer individual lights. The motorized vertical rail (not shown) on the car moves the electromagnetic arm 5404 up and down the rail to adjust size of the illumination spot. Once the beam steering and beam size adjustment are finished, the magnetic field of the arm can be turned off and disengage. This allows the arm to move away and the car to move to the next steerable light. In FIGS. 53 and 54, the car 5301, 5401 moves the light source of individual steerable lights while the Fresnel lens is stationary. In some embodiments, the car can move the Fresnel lens of the individual steerable light while the light source is kept stationary.

In sum, as shown in FIGS. 53 and 54, embodiments include light sources of a non-motorized steerable track light system that are mounted on non-motorized rail systems. A car steers individual lights by using an electromagnetic arm to move the light source along its non-motorized rails. The Fresnel lenses are stationary. In some embodiments, the Fresnel lenses of the non-motorized steerable track light can be mounted on non-motorized guided rail systems. The light sources of non-motorized steerable track light can be kept stationary. Individual non-motorized steerable lights can be steered by moving the Fresnel lens along the rails by the motorized car one at a time.

While the present inventive concepts have been particularly shown and described above with reference to exemplary embodiments thereof, it will be understood by those of ordinary skill in the art, that various changes in form and detail can be made without departing from the spirit and scope of the present inventive concepts.

What is claimed is:

1. A beam steering mechanism, comprising:
   a lens;
   a light source module positioned in a focal plane of the lens; and
   a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam,
   wherein the light source module is mounted on the vertical rail, which moves the light source module toward or away from the lens to adjust the size of the illumination spot, wherein the vertical rail and the light source are mounted on the at least one inner rail, and move together along the at least one inner rail.

2. The beam steering mechanism of claim 1, wherein the at least one inner rail is mounted on two outer rails, and the light source module, the vertical rail, and the inner rail move along the two outer rails.

3. A beam steering mechanism, comprising:
   a lens;
   a light source module positioned in a focal plane of the lens; and
   a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam,
   wherein the light source module is mounted on the vertical rail, and moves vertically, and wherein the lens is mounted on the at least one inner rail which moves the lens in a direction orthogonal to the vertical direction.

4. A beam steering mechanism, comprising:
   a lens;
   a light source module positioned in a focal plane of the lens; and
   a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam,
   wherein the inner rail and the lens are mounted on two outer rails which move the lens and the inner rails along the two outer rails in a horizontal direction.

5. A beam steering mechanism, comprising:
   a lens;
   a light source module positioned in a focal plane of the lens; and
   a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam, and
   further comprising a contact controller or hand gesture controller that controls at least one of the light source module and the guided rail system, and
   wherein the contact controller has a beam steering controller for controlling the beam steering of the light, a dimmer for controlling the light level, and a beam size controller for adjusting the size of the beam.

6. A beam steering mechanism, comprising:
   a lens;
   a light source module positioned in a focal plane of the lens; and
   a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam,
   wherein the lens is a Fresnel lens, and the light source module is mounted on the guided rail system above the Fresnel lens.

7. A beam steering mechanism, comprising:
   a lens;
   a light source module positioned in a focal plane of the lens; and
   a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam,
   wherein a transmitter beam spot, the illumination spot, and a control spot are formed at the surface, wherein the control spot controls the illumination and transmitter spots by hand gestures or contact controllers.

8. The beam steering mechanism of claim 7, wherein the light source module includes an illumination light source and a light-fidelity (Li-Fi) transmitter light source for generating beams of light that form both the illumination spot and the transmitter beam spot.

9. The beam steering mechanism of claim 8, wherein the transmitter light beam includes a LiFi communication light beam and wherein the illumination light beam and LiFi communication light beam are separated in an optical spectrum but co-located spatially in the same spot, wherein the illumination beam is in visible spectrum and the LiFi communication light beam is in an IR spectrum, wherein when the illumination light source is used for both illumination and LiFi communications, there is only one light beam in the spot.

10. The beam steering mechanism of claim 8, wherein a size of the transmitter beam spot is increased to accommodate multiple users to share a same Li-Fi network by moving the light source module along the vertical rail.

11. A beam steering mechanism, comprising:
    a lens;
    a light source module positioned in a focal plane of the lens; and
    a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam, wherein the lens includes a Fresnel lens array, the guided rail system comprises an array of guided rail systems and track rails, and the light source module comprises a plurality of light sources mounted on the guide rail systems, which in turn are mounted on the track rails.

12. A beam steering mechanism, comprising:
a lens;
a light source module positioned in a focal plane of the lens; and
a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam, and
further comprising a compass on a rail of the guided rail system to obtain an absolute beam steering direction.

13. A beam steering mechanism, comprising:
a lens;
a light source module positioned in a focal plane of the lens; and
a guided rail system, comprising a vertical rail, at least one inner rail, and at least one outer rail, wherein one of the lens and the light source module is mounted to the guided rail system, wherein the light source outputs a light beam at the lens which forms an illumination spot on a surface from the light beam,
wherein the beam steering mechanism is constructed and arranged for a track light system, comprising:
a non-motorized track light array comprising a plurality of light sources positioned on the guided rail system;
at least one motorized track rail of the guided rail system adjacent the non-motorized track light array; and
a steering car that moves along the at least one motorized track rail for steering individual light sources of the track light array.

14. A light-emitting device control system for vehicle light beam steering, comprising:
a light source;
a beam steering mechanism that directs a light beam from the light source at a surface;
an input device controller that receives external inputs for beam steering control;
a potentiometer for adjusting a light level; and
a processor that performs a calculation to determine the amount of beam steering is needed and sends a signal to the beam steering mechanism to perform a beam steering motion according to the calculation.

* * * * *